United States Patent [19]
Tautges et al.

[11] Patent Number: 5,768,156
[45] Date of Patent: Jun. 16, 1998

[54] CONNECTIVITY-BASED, ALL-HEXAHEDRAL MESH GENERATION METHOD AND APPARATUS

[75] Inventors: Timothy James Tautges; Scott A. Mitchell, both of Albuquerque, N. Mex.; Ted D. Blacker, Green Oaks, Ill.; Peter Murdoch, Salt Lake City, Utah

[73] Assignee: Sandia Corporation, Albuquerque, N. Mex.

[21] Appl. No.: 548,286

[22] Filed: Oct. 25, 1995

[51] Int. Cl.$^6$ .......................... G06T 17/20; G06F 17/00
[52] U.S. Cl. .................................................. 364/578
[58] Field of Search ........................... 364/578, 488; 495/119, 123, 141

[56] References Cited

U.S. PATENT DOCUMENTS

| | | | |
|---|---|---|---|
| 4,912,664 | 3/1990 | Weiss et al. | 395/141 |
| 4,933,889 | 6/1990 | Meshkat et al. | 364/578 |
| 5,125,038 | 6/1992 | Meshkat et al. | 364/578 |
| 5,214,752 | 5/1993 | Meshkat et al. | 395/123 |
| 5,315,537 | 5/1994 | Blacker | 364/570 |
| 5,497,451 | 3/1996 | Holmes | 395/142 |
| 5,553,009 | 9/1996 | Meshkat et al. | 364/578 |
| 5,553,206 | 9/1996 | Meshkat | 395/123 |
| 5,581,489 | 12/1996 | Groothuis et al. | 364/578 |

OTHER PUBLICATIONS

W. A. Cook & W. R. Oaks, Mapping Methods for Generating Three–Dimensional Meshes, Computers in Mechanical Engineering, *CIME*, pp. 67–72 (Aug. 1982).

M. B. Stephenson & T. D. Blacker, Using Conjoint Meshing Primitives to Gnerate Quadrilateral and Hexahedral Elements in Irregular Regions, Proc. ASME Computations in Engineering Conference (1989). Sand88–3089C.

T.K.H. Tam & C. G. Armstrong, Finite Element Mesh Control by Integer Programming, *Int. J. Numer. Methods Eng.*, 36:2581–2605 (1993).

Ted D. Blacker, M. B. Stephenson, J. L. Mitchner, L. R. Philips, & Y. T. Lin, Automated Quadrilateral Mesh Generation: A knowledge–Based System Approach, ASME Paper No. 88–WA/CIE–4 (1988).

A. P. Gilkey & Gregory D. Sjaardema, GEN3D: A Genesis Database 2D to 3D Transformation Program, SAND89–0485, Sandia National Laboratories, Albuquerque, New Mexico (Mar. 1989).

Ted. D. Blacker & M. B. Stephenson, Paving: A New Approach to Automated Quadrilateral Mesh Generation, *International Journal of Numerical Methods in Engineering*, 32:811–847 (1991).

M. S. Shephard & M. K. Georges, Automatic Three–Dimensional Mesh gneration by the Finite Octree Technique, *International Journal for Numerical Methods in Engineering*, 32:709–749 (1991).

(List continued on next page.)

*Primary Examiner*—Vincent N. Trans

[57] ABSTRACT

The present invention is a computer-based method and apparatus for constructing all-hexahedral finite element meshes for finite element analysis. The present invention begins with a three-dimensional geometry and an all-quadrilateral surface mesh, then constructs hexahedral element connectivity from the outer boundary inward, and then resolves invalid connectivity. The result of the present invention is a complete representation of hex mesh connectivity only; actual mesh node locations are determined later. The basic method of the present invention comprises the step of forming hexahedral elements by making crossings of entities referred to as "whisker chords." This step, combined with a seaming operation in space, is shown to be sufficient for meshing simple block problems. Entities that appear when meshing more complex geometries, namely blind chords, merged sheets, and self-intersecting chords, are described. A method for detecting invalid connectivity in space, based on repeated edges, is also described, along with its application to various cases of invalid connectivity introduced and resolved by the method.

7 Claims, 40 Drawing Sheets

OTHER PUBLICATIONS

M. B. Stephenson, S. A. Canann, Ted D. Blacker & R. J. Meyers, Platering Progress Report I, SAND89-2192, Sandia National Laboratories, Albuquerque, New Mexico (1992).

F. P. Preparata & M. I. Shamos, Computional Geometry and Introduction, Springer-Verlag, New York, 1985, at pp. M24-26 (1985).

Peter Murdoch, Ph. D. Dissertation, The Spatial Twist Continuum: A Dual Representation of the All-Hexahedral Finite Element Mesh, Brigham Young University (1995)(defended on Jun. 28, 1995, at Brigham Young University).

Ted D. Blacker and R. J. Meyers, Seams and Wedges in Plastering: a 3-D Hexahedral Mesh Generation Algorithm, *Engineering with Computers*, 9:83-93 (1993).

Larry A. Schoof & Victor R. Yarberry, Exodus II: A Finite Element Data Model, SAND92-2137, Sandia National Laboratories,Albuquerque, New Mexico (Sep. 1994).

Gregory D. Sjaardema, Numbers: A Collection of Utilities for Pre-and Post-processing Two-and Three-Dimensional Exodus Finite Element Models, SAND88-0737, Sandia National Laboratories, Albuquerque, New Mexico (Mar. 1989).

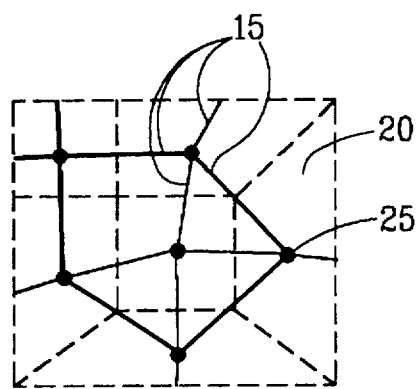
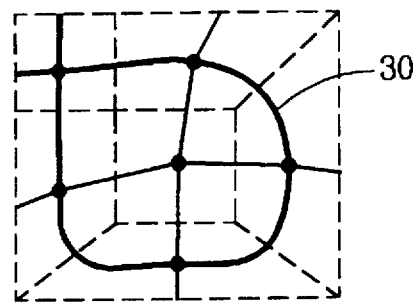
FIG. 3a  FIG. 3b
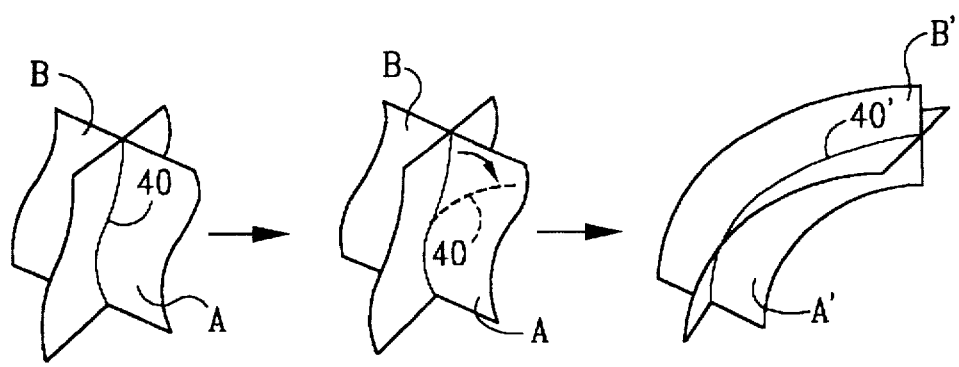
FIG. 4

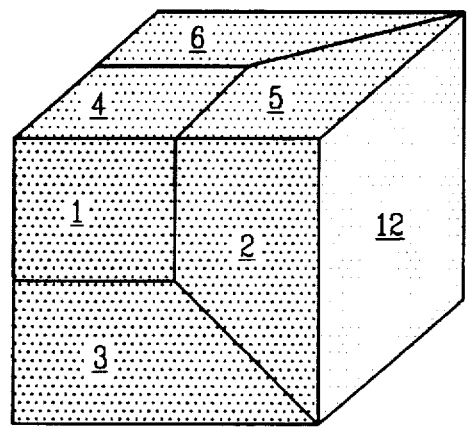
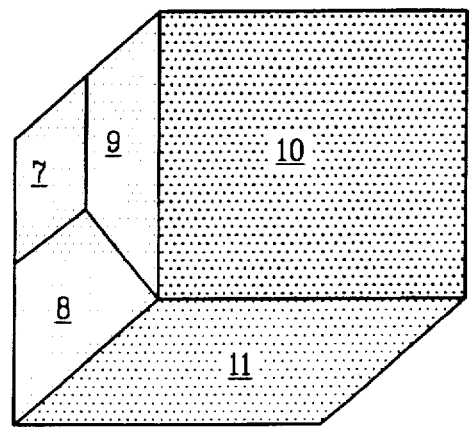
FIG. 12a                    FIG. 12b
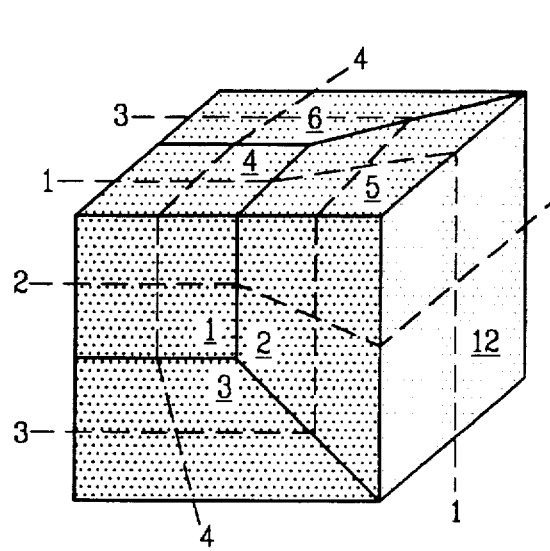
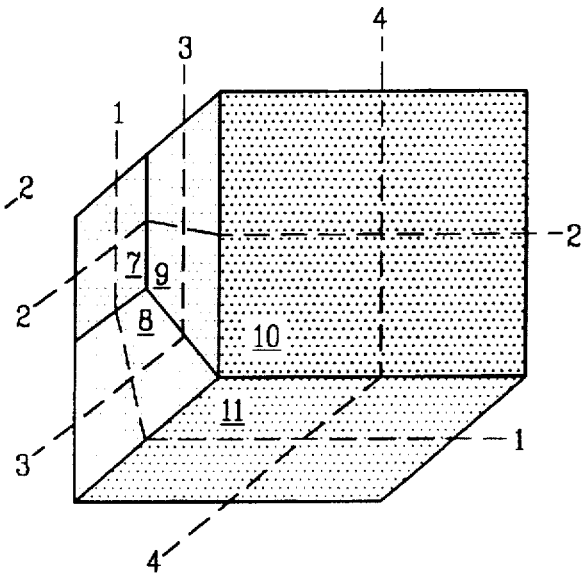
FIG. 13a                    FIG. 13b

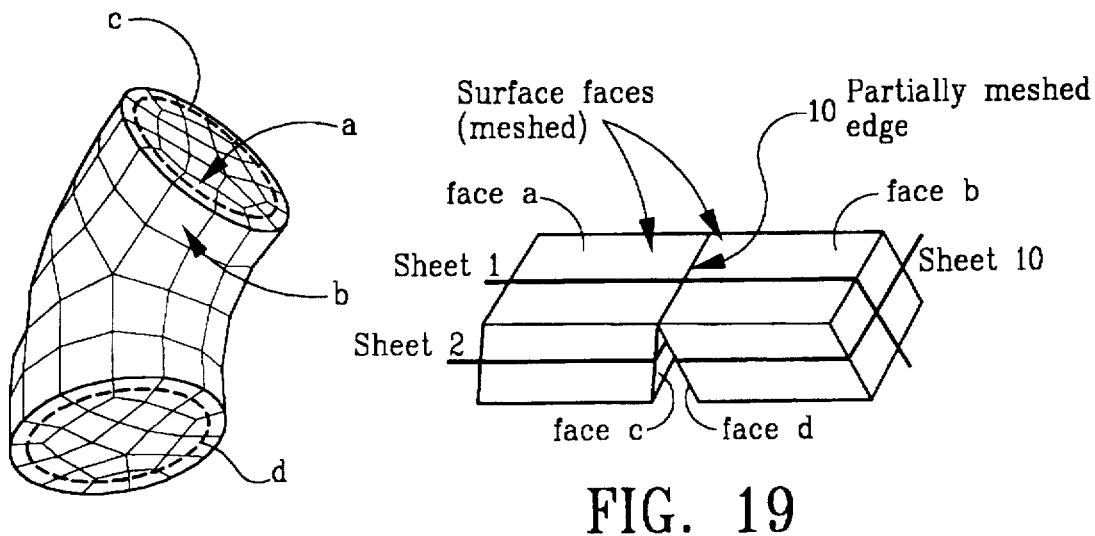
FIG. 18
FIG. 19
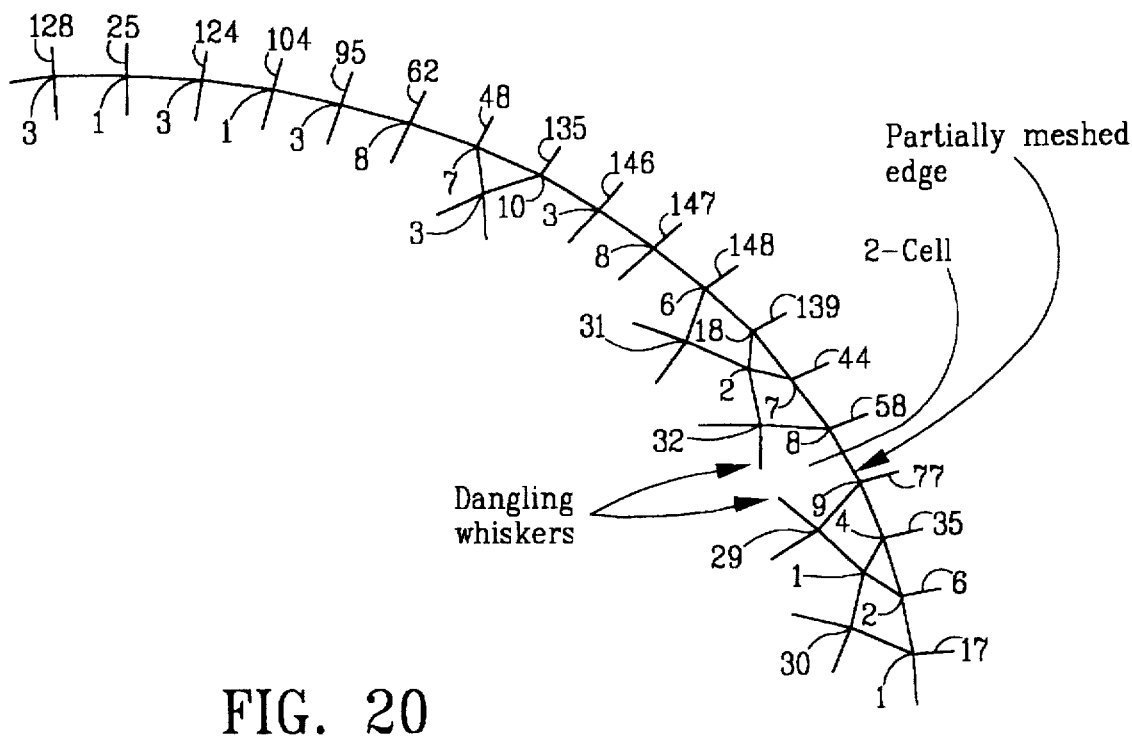
FIG. 20

In 2D after pillowing both doublet faces

CONNECTIVITY-BASED, ALL-HEXAHEDRAL MESH GENERATION METHOD AND APPARATUS

GOVERNMENT RIGHTS

This invention was made with United States Government support under Contract No. DE-AC04-76DP00789 awarded by the U.S. Department of Energy. The Government has certain rights in this invention.

A portion of the disclosure of this patent document contains material that is subject to copyright protection. The owner thereof has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

A. Technical Field of the Invention

The present invention relates to methods and an apparatus for automated volume (hexahedral) discretization of a geometric object. More specifically, the present invention is directed to an automated volume (hexahedral) mesh generation methods and apparatus using a technique referred to herein as Whisker Weaving™, which automatically generates a mesh of hexahedral elements (with a very limited number of non-hexahedral elements) without decomposition of the geometric objects and which is particularly useful in mesh generation for finite element analysis.

B. Discussion of Related Art

Finite element analysis ("FEA") is a powerful numerical method that solves mathematical problems in engineering and physics for determining the physical behavior of a geometric object or region. Finite element analysis is used in approximating any continuous physical characteristic or behavior, such as structural mechanics, temperature, pressure, heat, or an electric field by a discrete model of a set of piece-wise continuous functions. The system is broken into discrete elements interconnected at discrete node points. Typically, finite element analysis is performed on a computer in a three-step procedure comprising the steps of pre-processing, processing, and post-processing. In the pre-processing step, geometric boundary data representing the geometric region to be analyzed is taken, and a mesh of geometrical elements covering the domain of the geometric region is generated. In the processing step, the element data is taken and mathematical equations are applied to solve for the characteristic of interest across the domain through use of matrix equations. For example, a stimulus is applied to the mesh data and the reaction of the mesh data thereto is analyzed. In the post-processing step, the results of this finite element analysis are output, for example, in a graphical representation of the characteristic of interest.

The pre-processing step of the mesh generation is presently the most time-consuming step of finite element analysis. Conventional mesh generation methods may take from hours to days and require the user to select nodes of the geometric region to form regions in which elements will be generated. In conventional mesh generation methods and systems, the user must decompose or dissect the original geometry into substantially "rectangular-shaped" regions for meshing. Depending on the original geometry and the skill of the analyst, the resulting quadrilateral mesh often contains elements that are skewed (internal angles that are much greater or smaller than 90°) or have poor aspect ratios (the length of the longest side of an element being much greater than the shorter side of the element). Elements that are skewed or have poor aspect ratios often introduce serious errors in the analysis. For accurate analyses, the analyst must often iterate, adapting the mesh to more correctly capture the physical phenomenon being modeled.

FIG. 1 illustrates the conventional finite element analysis steps where the geometric region is input at step 1001, and a mesh is generated for the region at step 1003 during the pre-processing step. Next, a stimulus is applied to the generated mesh at step 1005, the stimulated mesh is analyzed by mathematical equations (analysis is performed on the finite elements) at step 1007 and analysis data is produced at step 1009 during the processing step of the finite element analysis. Finally, the analysis data is displayed or used to determine the physical behavior of the geometric region at step 1011 during the post-processing step. This use could be by displaying the data for the operator or in any automated process such as use to redesign a geometric region representative of a machine element through use of computer-controlled optimization techniques.

Finite element analysis is used to model physical phenomena in a wide variety of disciplines, including structural mechanics and dynamics, heat transfer, and computational fluid dynamics ("CFD"). However, the majority of finite element analysis is directed to formulating and solving a system of mathematical equations describing linear elastic static and dynamic continuum problems. In stress analysis, for example, the finite element analysis must accurately describe the displacements or stresses anticipated for a structure under a specific load condition or stimulus.

To perform any of these analyses, the problem domain must first be discretized into a mesh of regular one-, two- or three-dimensional elements. Traditionally, generating a mesh for a given problem has been very tedious, time consuming, and error prone. Furthermore, increasing computer speeds have made the non-automated mesh generation process even more of a bottleneck in the design and analysis process. Automated meshing techniques reduce this bottleneck and free the analyst to concentrate on more important design and analysis issues.

Although finite element analysis is the most common environment for using mesh generation, the mesh generation used in finite element analysis may be used in any method or apparatus requiring automatic surface or volume discretization of a geometric object or region. For example, the surface discretization methods and apparatus may be used in computer graphics for calculating shading, reflections, etc., of a geometric object or region.

In short, mesh generation is an enabling technology for the finite element, finite difference, and finite volume analysis methods. Automated meshing techniques have the potential to significantly simplify the pre-processing step, and as such, their development is of significant interest to the finite element community. Increased computer hardware speeds and improved finite element analysis and modeling software now make it possible to analyze larger problems than in the past. Meshing performed using conventional techniques takes a large fraction of the total solution time and can become a serious impediment. Because conventional mesh generation techniques are tedious and error prone, automation of the mesh generation task is highly desirable.

Automated meshing techniques for general three-dimensional volumes are capable of yielding tetrahedral- or hexahedral-shaped elements, or a combination of the two elements. A fundamental difficulty of automated meshing is that a mesh is constrained in terms of the manner in which elements are able to share subfacets with each other. This problem is much less constrained for tetrahedral or mixed element meshes, and therefore, easier to solve. Hence, tetrahedral and mixed element meshing techniques have received the most attention in the past. However, for applications in non-linear structural mechanics and incompressible CFD, there is a growing demand for all-hexahedral meshing techniques due to various analysis and design benefits associated with hexahedral meshes.

Unfortunately, previous all-hexahedral meshing techniques have suffered shortcomings in the principal areas of lack of automation, boundary insensitivity (i.e., placing poorly-shaped elements close to geometric boundaries), orientation sensitivity, and mesh size (i.e., number of elements). Additionally, the conventional volume meshing techniques have all been either decomposition-based or have attempted to mesh from the inside boundary outward, connecting up with the surface mesh in a careful manner. A number of techniques have been developed that are successful in meshing simple geometries. [See, e.g., W. A. Cook & W. R. Oakes, *Mapping Methods for Generating Three-Dimensional Meshes*, Computers in Mechanical Engineering, at pp. 67–72 (August 1982); M. B. Stephenson & T. D. Blacker, *Using Conjoint Meshing Primitives to Generate Quadrilateral and Hexahedral Elements in Irregular Regions*, Proc. ASME Computations in Engineering Conference (1989); T. K. H. Tam & C. G. Armstrong, *Finite Element Mesh Control by Integer Programming*, Int. J. Numer. Methods Eng., 36:2581–2605 (1993); Ted D. Blacker, M. B. Stephenson, J. L. Mitchner, L. R. Philips, & Y. T. Lin, *Automated Quadrilateral Mesh Generation: A Knowledge-Based System Approach*, ASME Paper No. 88-WA/CIE-4 (1988); A. P. Gilkey & Gregory D. Sjaardema, *GEN3D: A GENESIS Database 2D to 3D Transformation Program*, SAND89-0485, Sandia National Laboratories, Albuquerque, N. Mex. (March 1989).] These type of techniques work by interpreting the input geometry in some global manner. These techniques, however, are not successful when the input geometry is complicated, in part, because interpreting the global geometry is difficult. A robust method based only on the local geometry is to overlay a regular grid and trim to the surface, but poorly-shaped elements result near the geometric boundary.

Boundary sensitivity provides mesh contours that closely follow the contours of the boundary of the object and is important because well-shaped elements are desired near the boundary of the object; poorly-shaped elements are desired away from the boundary of the object instead of close to it. Orientation insensitivity prevents the resulting mesh topology from changing when the geometry of an object is rotated or translated; if the object is rotated in space and re-meshed, then the resulting mesh remains the same. In other words, the generated mesh in a transformed geometry is equivalent to the original mesh before being transformed.

In two-dimensional space, an interior mesh node is considered to be irregular unless four elements are connected to the node. In three-dimensional space, eight hexes share a regular node. The number of elements sharing a node is a critical mesh topology feature which controls the final shape of the elements. Thereby, a mesh with few irregular nodes is desired with an emphasis on preventing irregular nodes near the boundary of the object where the element shape is critical.

Perhaps, the oldest (computer-based) method used for generating all-hexahedral meshes is isoparametric (ijk) mapping. [See W. A. Cook & W. R. Oakes, *Mapping Methods for Generating Three-Dimensional Meshes*, Computers in Mechanical Engineering, August 1982, at pp. 67–72.] Although this technique is very robust for block-type geometries, refinements required in a particular area propagate along all three principal directions of the map resulting in an unnecessarily large number of elements, which increases analysis time. Another disadvantage is that the volume must first be decomposed into mappable subregions, which is difficult to automate for general three-dimensional geometries. [See T. Tam & C. G. Armstrong, *2D Finite Element Mesh Generation by Medial Axis Subdivision*, Advances in Eng. Soft., Vol. 13, 5/6, September/November 1991, at pp. 312–324; T. D. Blacker, Y. T. Lin, J. L. Mitchiner, L. R. Philips, & M. B. Stephenson, *Automated Quadrilateral Mesh Generation: A Knowledge-Based System Approach*, ASME Paper No. 88-WA/CIE-4 (1988).] The isoparametric mapping method is presently available in most mesh generation tools. [See A. P. Gilkey & G. D. Sjaardema, *GEN3D: A GENESIS Database 2D to 3D Transformation Program*, SAND89-0485, Sandia National Laboratories, Albuquerque, N. Mex., March 1989; PDA Engineering, *PATRAN Plus Users' Manual*, Release 2.4, January 1990.]

An automatic quadrilateral surface discretization method and apparatus for automatically discretizing a geometric region without decomposing the region is disclosed and claimed by Blacker. [See Blacker, *Automated Quadrilateral Surface Discretization Method and Apparatus Usable to Generate Mesh in a Finite Element Analysis System*, U.S. Pat. No. 5,315,537; T. D. Blacker & M. B. Stephenson, *Paving: A New Approach to Automated Quadrilateral Mesh Generation*, Int. J. Numer. Methods Eng., 32:811–847 (1991).] The automated quadrilateral surface discretization method and apparatus is generally known as Paving™. The automated quadrilateral surface discretization method and apparatus automatically generates a mesh of all quadrilateral elements, which is particularly useful in finite element analysis. The generated mesh of all-quadrilateral elements is boundary sensitive, orientation insensitive, and has few irregular nodes on the boundary. A permanent boundary of the geometric region is input and rows are iteratively layered toward the interior of the geometric region. Also, an exterior permanent boundary and an interior permanent boundary for a geometric region may be input and the rows are iteratively layered inward from the exterior boundary in a first counter clockwise direction while the rows are iteratively layered from the interior permanent boundary toward the exterior of the region in a second clockwise direction. As a result, a high quality mesh for an arbitrary geometry may be generated with a technique that is robust and fast for complex geometric regions and extreme mesh gradations.

Another well-known meshing technique is based on the finite octree approach. [See M. S. Shephard & M. K. Georges, *Automatic Three-Dimensional Mesh Generation by the Finite Octree Technique*, Int. J. Numer. Methods Eng., 32:709–749 (1991).] Octrees have been widely used to generate tetrahedral meshes and are now being used to generate all-hexahedral meshes. Boundary fitting techniques are challenged with numerous special cases, contributing to a lack of robustness and often result in poorly-shaped elements on the boundary. Octree-based techniques are also orientation sensitive, meaning that a different mesh is generated if the volume is rotated and re-meshed.

Another technique, known as Plastering™ [See M. B. Stephenson, S. A. Canann, T. D. Blacker, & R. J. Meyers, *Plastering Progress Report 1*, SAND89-2192, Sandia National Laboratories, Albuquerque, N. Mex., 1992.], is the three-dimensional analogue of the invention of U.S. Pat. No.

5,315,537 discussed supra. It is an advancing-front type of technique that takes a local approach to the geometry and shows promise for complicated inputs. Plastering™ builds an all-hexahedral mesh by starting with an all-quadrilateral surface mesh and then projecting mesh faces into the un-meshed volume to create hexahedra. Plastering™ is orientation insensitive. However, the major difficulty with an advancing-front approach is ensuring that hexahedra share faces, edges, and nodes in the correct way when fronts contract or are merged. Combining fronts can be quite difficult since hexahedra can share faces in only a very constrained way. This problem is more difficult for hexahedral meshes than for tetrahedral meshes: the global connectivity of the hexahedral mesh behind the front constrains the manner in which hexahedra on merging fronts may share faces, edges, and nodes.

A technique referred to herein as the Spatial Twist Continuum ("STC") is a powerful extension of the dual representation of a hexahedral mesh, discussed in more detail infra. [See Peter Murdoch, Ph. D. Dissertation, *The Spatial Twist Continuum: A Dual Representation of the All Hexahedral Finite Element Mesh*, Brigham Young University (1995) (defended on Jun. 28, 1995, at Brigham Young University.] A quadrilateral mesh can be uniquely described by its dual. [See F. P. Preparata, M. I. Shamos, Computational Geometry an Introduction, Springer-Verlag, New York, 1985, at pp. 24–26.] The STC quantifies or captures the global connectivity constraints inherent in hexahedral meshes, which provides numerous insights into the manner in which to generate meshes.

The power of the STC is displayed in the three-dimensional representation, where continuous surfaces referred to herein as "whisker sheets" or "twist planes" pass through layers of hexahedra. The STC is represented by a geometric arrangement of two-dimensional surfaces referred to as "whisker sheets" or "twist planes." These planes "twist" through the space of the three-dimensional continuum being meshed, thus, the name Spatial Twist Continuum. Triples of whisker sheets transversely intersect at the centroids of hexahedra; the intersection of three whisker sheets defines a hexahedral element of the mesh. The STC representation of a quadrilateral mesh is an arrangement of curves referred to herein as "chords." Pairs of whisker sheets intersect to form chords that pass through opposite faces of hexahedra. Chords pass through opposite quadrilateral edges and intersect at quadrilateral centroids. The continuity of the whisker sheets and chords, and the method in which whisker sheets and chords twist through space in tandem, are the basis of the dual. In essence, STC captures the connectivity of a mesh, which is a significant advancement in the field.

The present invention presents an advancing-front method and apparatus, referred to herein as Whisker Weaving™, which is based on mesh dual information encapsulated in the STC representation—a logical arrangement of surfaces, curve intersections, and vertices intersection— wherein mesh node positions are computed. The present invention constructs the STC starting from the geometric boundaries and moving inward. The method of the present invention facilitates a valid connectivity as the front advances. The present invention builds the STC representation of an all-hexahedral mesh using an advancing-front method and apparatus, starting with a given geometry and an all-quadrilateral surface mesh. The present invention simplifies the all-hexahedral meshing problem by first determining the connectivity of an all-hexahedral mesh without regard to its geometric embedding; thus, the most constrained part of the problem is solved first. An actual hexahedral mesh can be constructed from the STC by dualizing the STC into the connectivity of the hexahedral mesh, and then iteratively smoothing to generate the geometric position of the mesh nodes. (The present invention is the volume (hexahedral) meshing analogy to the surface (quadrilateral) meshing invention of U.S. Pat. No. 5,315,537 (Paving™).)

SUMMARY OF THE INVENTION

The principal object of the present invention is to provide an advancing-front method and apparatus for automating hexahedral volume meshing of a geometric object by beginning from the outer boundary of a geometric object and working inward.

It is also an object of the present invention to provide a method and apparatus for automating hexahedral volume meshing of a geometric object that is boundary sensitive.

It is another object of the present invention to provide a method and apparatus for automating hexahedral volume meshing of a geometric object that is orientation insensitive.

It is yet another object of the present invention to require less computer memory storage and less geometric computations resulting in a computationally more efficient volume meshing technique.

It is still another object of the present invention to utilize the automated hexahedral meshing method and apparatus in a more fully-automated hexahedral mesh finite element analysis system.

Additional objects, advantages, and novel features will become apparent to those of ordinary skill in the art upon examination of the following detailed description of the invention or may be learned by practice of the present invention. The objects and advantages of the present invention may be realized and attained by means of the instrumentalities and combinations particularly pointed out in the appended claims.

Accordingly, the present invention accomplishes the foregoing objects by providing methods and apparatus for automatically generating a mesh of all hexahedral elements without decomposition of the geometric object while providing boundary sensitivity and orientation insensitivity. The present invention, given a surface mesh, incrementally "weaves the whiskers" (intersects the chords) of a logical arrangement of sheets (planes), i.e., advancing front adding hexahedral elements. The objects of the present invention are fulfilled by providing methods and an apparatus for automatically generating a mesh of all-hexahedral elements for finite element analysis of a geometric object comprising the steps of constructing a plurality of initial loops, sheets, chords, and sheetchords; iteratively locating at least three pair-wise adjacent chords; iteratively constructing a whisker hex by crossing the three pair-wise adjacent chords; and iteratively checking for invalid connectivity on all sheets involved in the whisker hex. Further steps include constructing the primal and resolving various connectivity issues.

First, given an arbitrary solid, an arbitrary quadrilateral mesh of its surface is created. This quadrilateral mesh is then sorted into two-dimensional surface loops. Each loop contains/stores information about which other loops it crosses on the surface. These crossings indicate the beginning/ending locations of chords on the (STC) whisker sheet containing the loop. These crossings, or "whiskers," are then extended and intersected locally (i.e., woven). Chords are also joined; a joined chord is complete in the sense that it starts and ends on the surface mesh or forms a closed loop within the solid. Eventually, every whisker of every loop is complete, and the method terminates with a valid, three-dimensional STC entity. One of the main advantages of the present invention is that the three-dimensional meshing problem is reduced to a series of local problems on interdependent two-dimensional sheets; alternatively, whisker sheets are flattened/projected into a two-dimensional space.

The methods and apparatus of the present invention provides automated hexahedral volume discretization of a geometric object that is boundary sensitive and orientation insensitive. By iteratively layering the boundaries of the geometric object with a series of interdependent steps, well-formed hexahedral elements are positioned along the boundary of the geometric object while poorly-shaped hexahedral elements are positioned in the interior of the geometric object. An object of the automated hexahedral volume discretization method and apparatus presented herein is that it be robust and operate at high speeds for complex geometric objects and extreme volume discretization gradations.

Further scope of applicability of the present invention will become apparent from the detailed description of the invention provided hereinafter. It should be understood, however, that the detailed description of the invention and the specific examples presented, while indicating preferred embodiments of the present invention, are provided for illustration purposes only because various changes and modifications within the spirit and scope of the invention will become apparent to those of ordinary skill in the art from the detailed description of the invention and claims that follow.

BRIEF DESCRIPTION OF THE DRAWINGS

The accompanying figures, which are incorporated in and form part of the specification, further illustrate the present invention and, together with the detailed description of the invention, serve to explain the principles of the present invention.

FIGS. 3a and 3b illustrate the dual of a quadrilateral mesh and a chord of the STC, respectively.

FIG. 4 illustrate the manner in which the whisker sheets twist as a chord changes position.

FIGS. 12a and 12b illustrate a geometry and surface mesh for a small corner hex example.

FIG. 13a and 13b illustrates whisker sheet loops for the small corner hex example.

FIG. 18 illustrates the geometry and surface mesh for the macaroni problem, where meshing results in blind chords.

FIG. 19 illustrates hex connectivity resulting in a sheet merge.

FIG. 20 illustrates a whisker sheet diagram indicating the need for a sheet merge.

FIG. 23a illustrates the first hex formed.

FIG. 25a illustrates a sheet diagram showing three STC edges (a, b, c) forming two pairs of repeated STC edges; FIG. 25b illustrates a sheet diagram showing the joining of two STC edges (a, b) to complete a chord; and FIG. 25c illustrates a sheet diagram showing the resolution of third STC edge by merging sheets and joining with its other sheetchord c—c.

FIG. 29a is depicted in hex space while

The technique is retried after progress is made elsewhere in the mesh. In any event, the technique can be made robust by merely taking a smaller shrink set.

Figure 52:
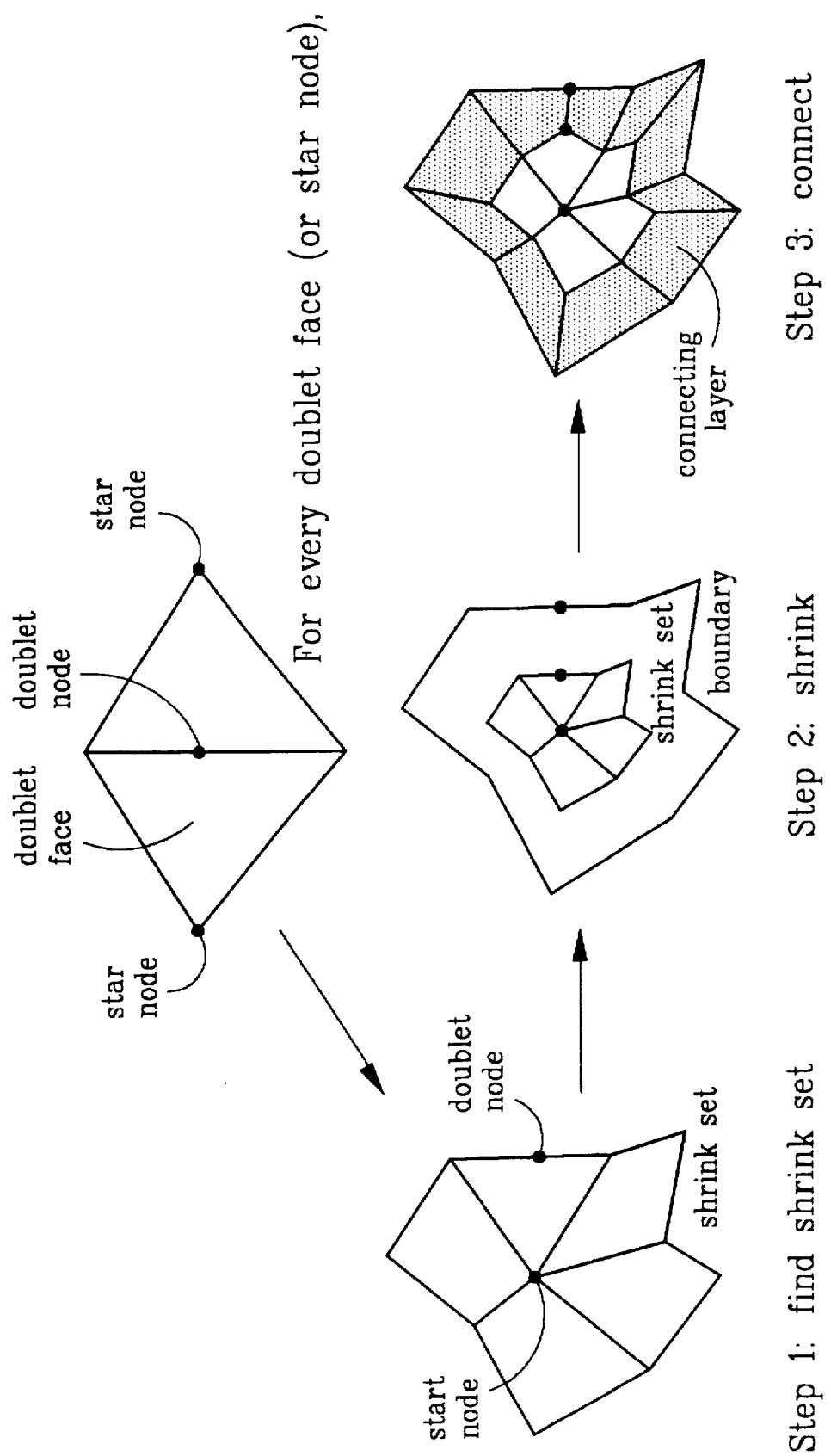
FIG. 52 illustrates the technique of pillowing a doublet in a quadrilateral mesh.
Figure 55:
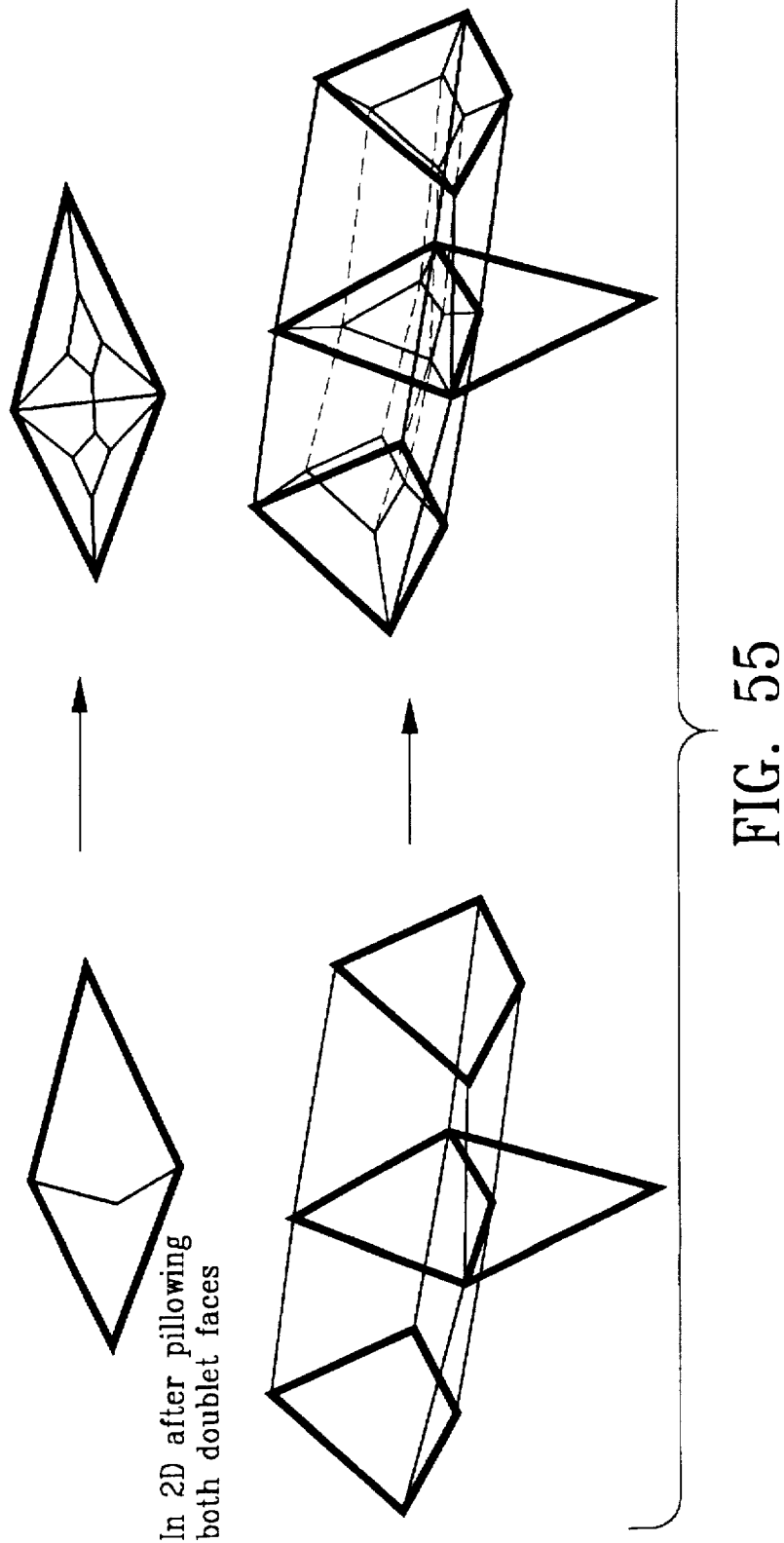

FIG. 55 illustrates that these shrink sets are always possible and always lead to the removal of the doublet, but element quality could be better by taking larger, rounder shrink sets as in FIG. 52.

Figure 56:
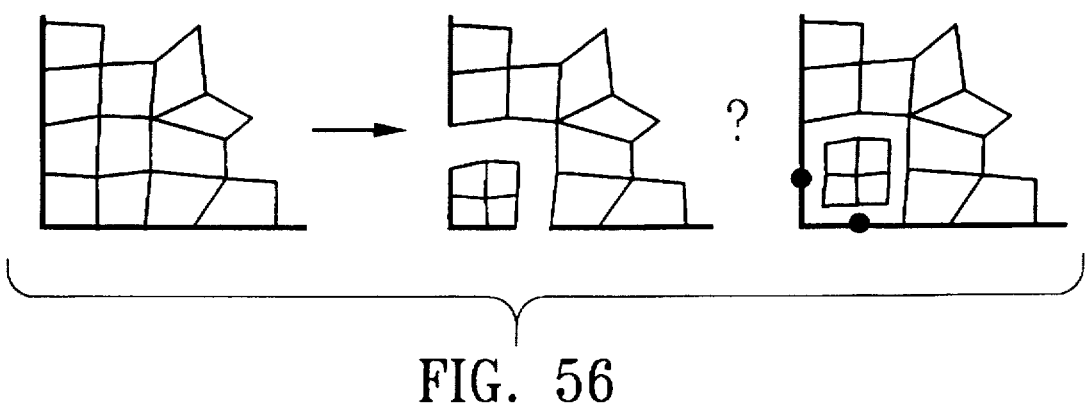

FIG. 56 illustrates a consideration on whether edges on the boundary of the object be considered to be in the interior of the shrink set (center), or on its boundary (right). In three dimensions, if a doublet face lies on the boundary of the meshed object, then we must consider it to be in the interior of the shrink set.

Figure 57:
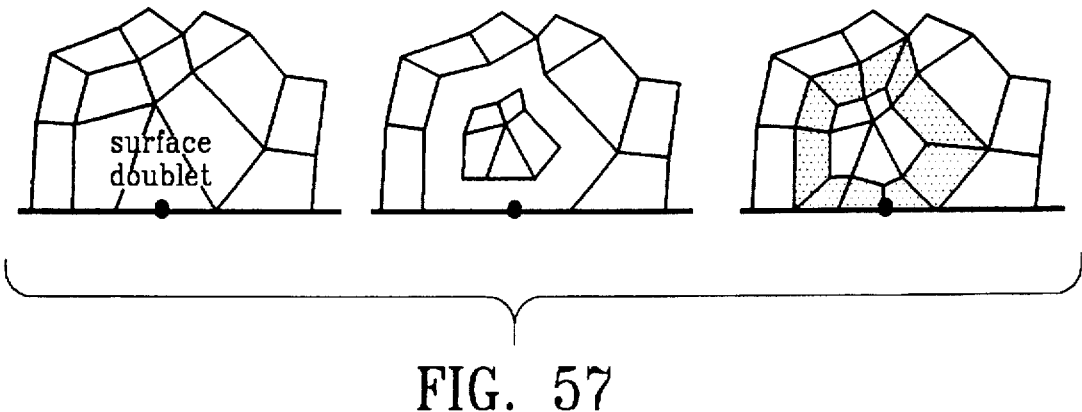

FIG. 57 illustrates the process of pillowing a "surface doublet." Here, the edges on the boundary of the meshed object must be considered to be on the boundary of the shrink set.

Figure 58:
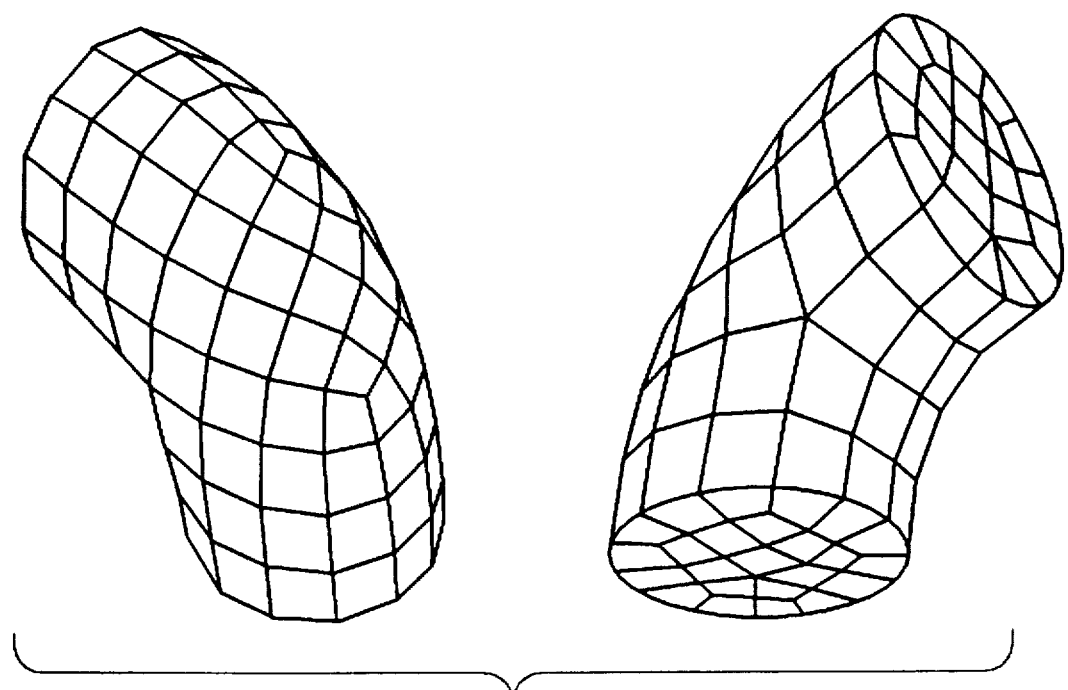

FIG. 58 illustrates the geometry and surface mesh for the macaroni (¼ torus) example.

Figure 59:
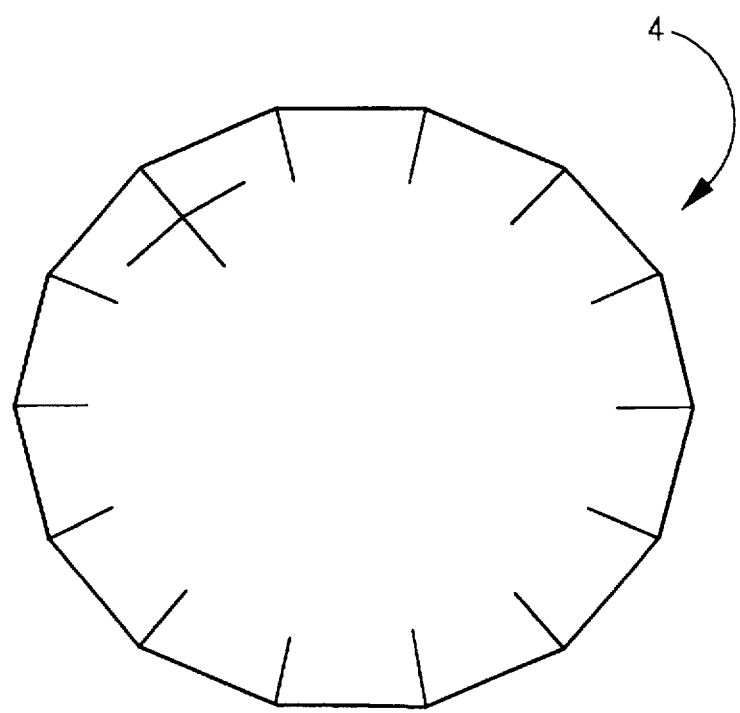

FIG. 59 illustrates loop and sheet diagrams for sheet 4 of the macaroni example.

Figure 60:
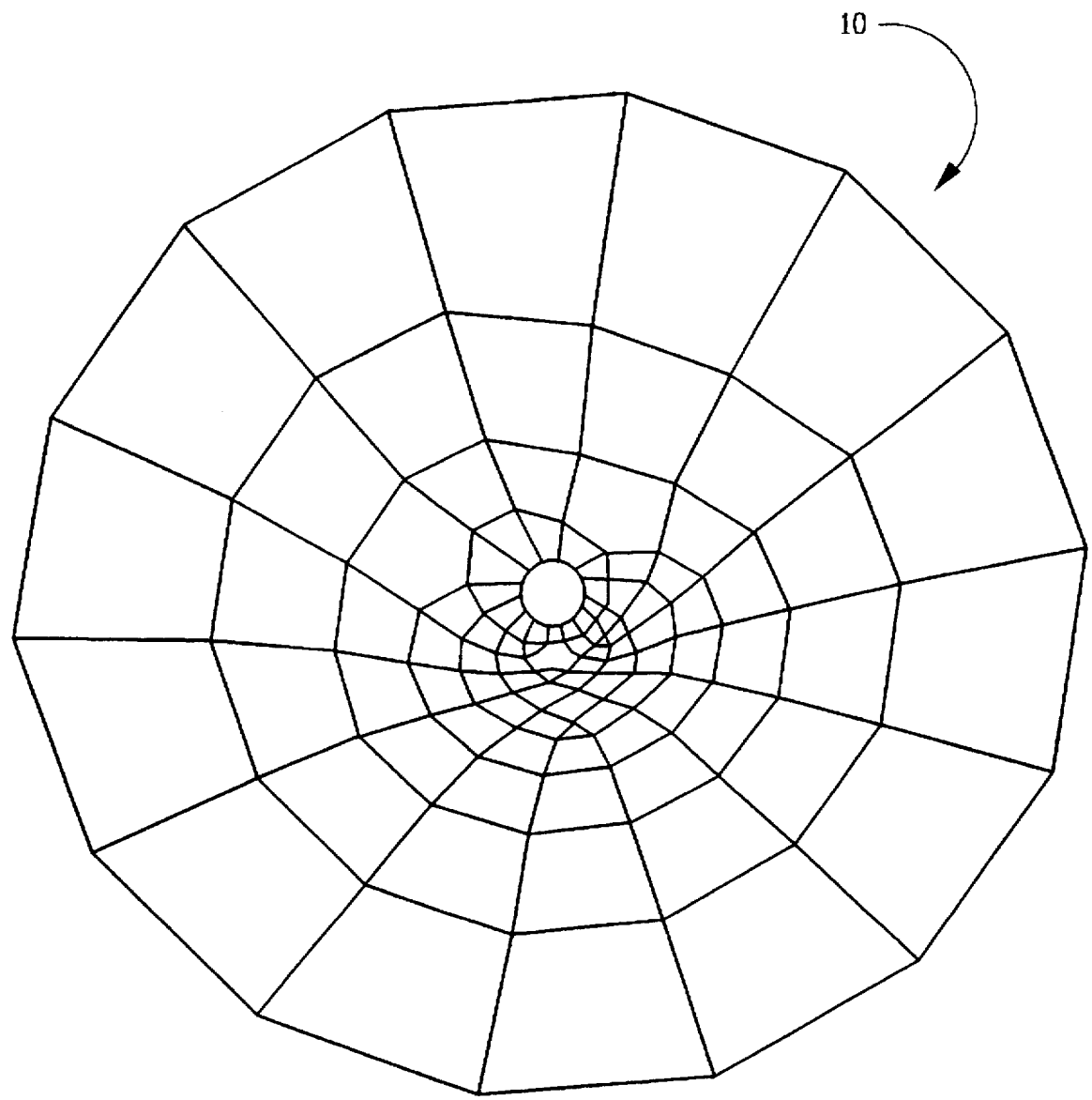

FIG. 60 illustrates the final sheet diagram for sheet 10 of the macaroni example.

Figure 61:
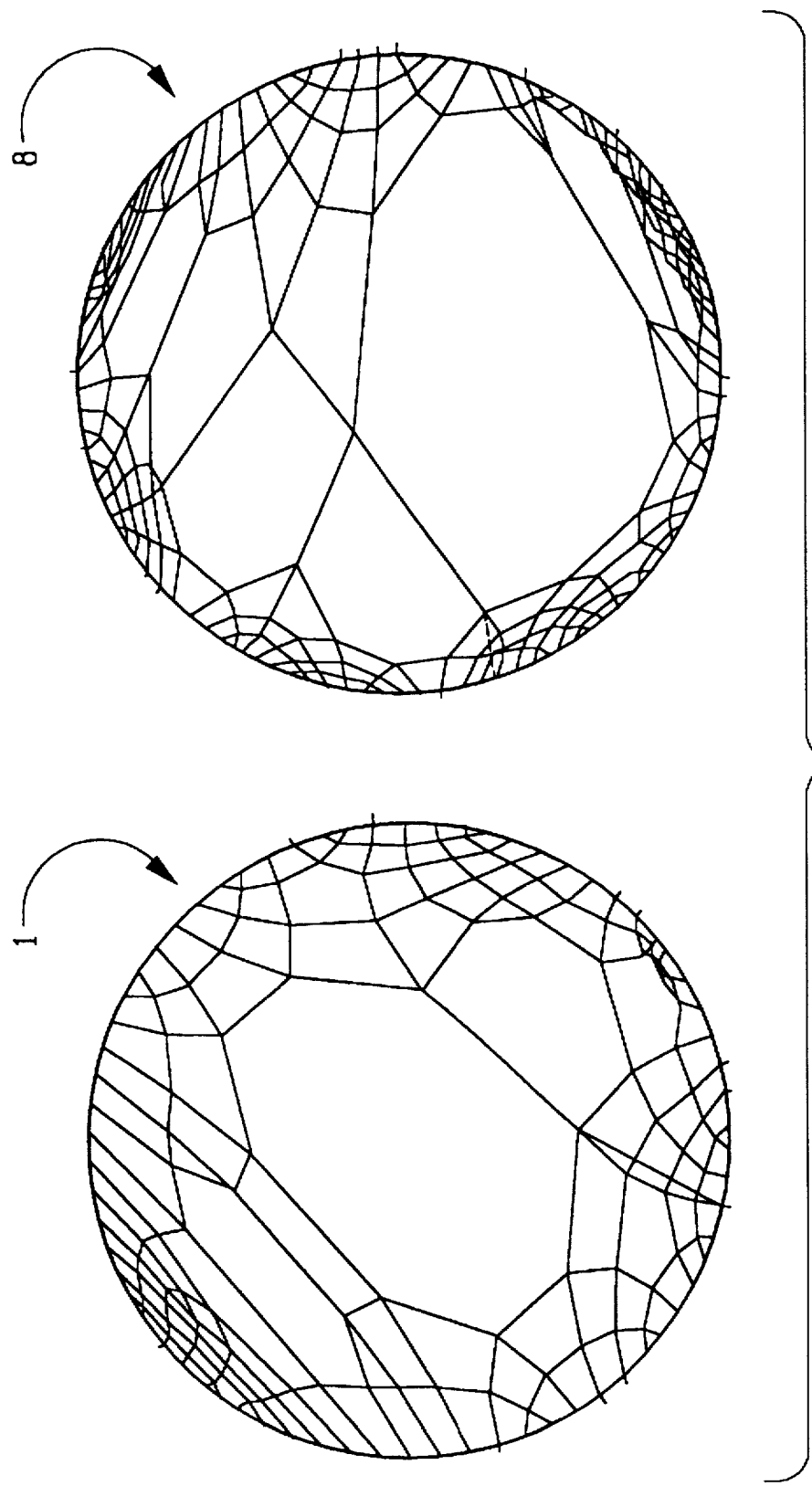

FIG. 61 illustrates the final sheet diagram for sheets 1 and 3 of the macaroni example.

Figure 62:
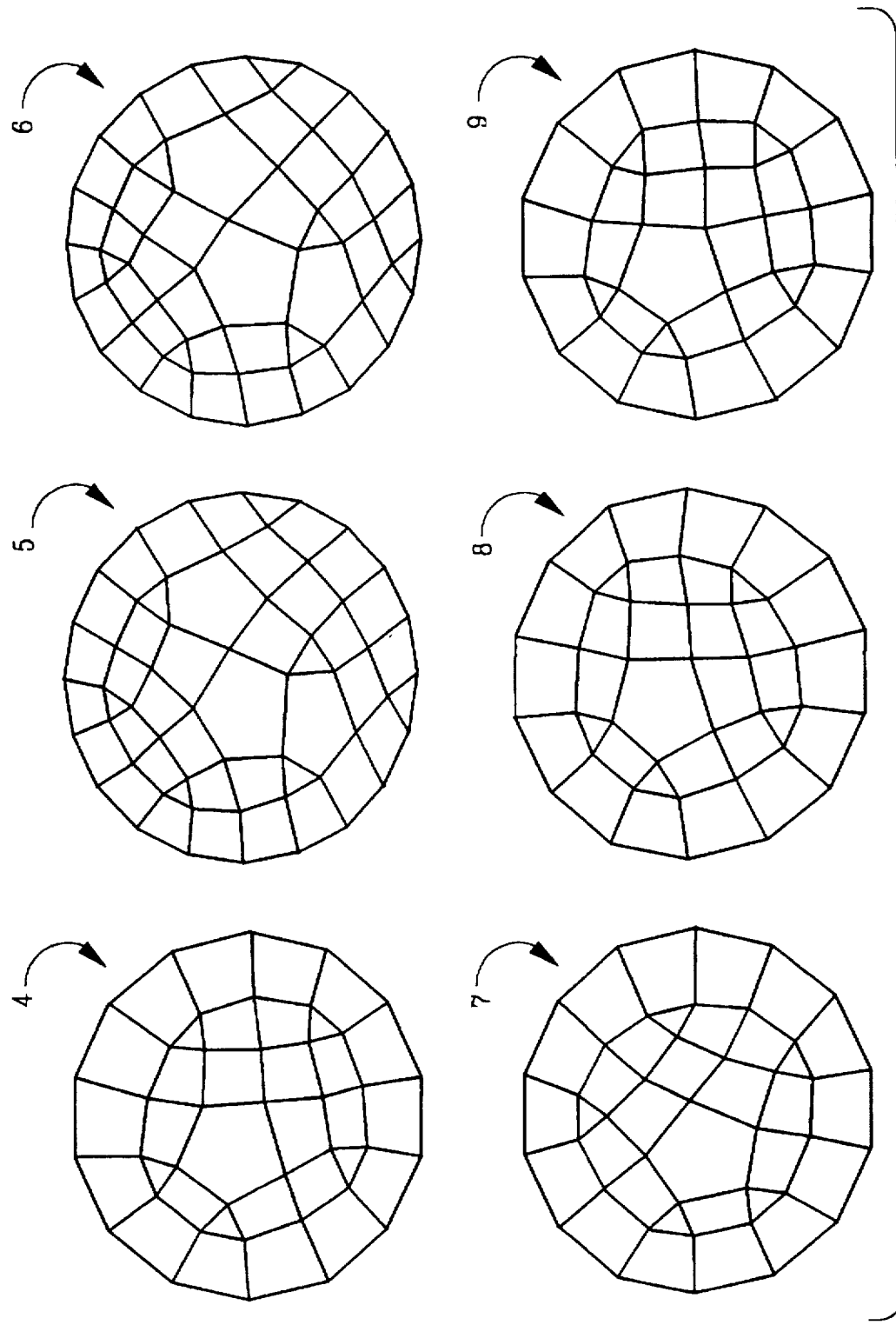

FIG. 62 illustrates sheet diagrams for sheets 4–6 (top) and 7–9 (bottom) for the macaroni example.

DETAILED DESCRIPTION OF THE INVENTION

A. Introduction—The "Spatial Twist Continuum"

In order to provide a better understanding of the specific features and advantages of the present invention, it is believed that a discussion of the Spatial Twist Continuum ("STC") technique that lays the foundation for the present invention would be advantageous. The method of the present invention, referred to herein as Whisker Weaving™, builds upon the work of Peter Murdoch, namely, the mesh dual information encapsulated in the STC representation. The STC is the fundamental structure used by the present invention. The present invention is discussed in detail infra under Section V.B.—Whisker Weaving™.

As discussed earlier, a fundamental difficulty of automated meshing is that a mesh is constrained in terms of the manner in which elements can share subfacets with each other. This problem is much more difficult and highly constrained for all-hexahedral meshes than it is for all-tetrahedral or mixed-element meshes. These constraints are encapsulated for all-hexahedral meshes by viewing the geometric dual of the mesh as an arrangement of surfaces; this arrangement is referred to herein as the Spatial Twist Continuum ("STC"). [See Peter Murdoch, Ph. D. Dissertation, *The Spatial Twist Continuum: A Dual Representation of the All-Hexahedral Finite Element Mesh*, Brigham Young University (1995) (defended on Jun. 28, 1995, at Brigham Young University).]

1. Dual of a Quadrilateral Mesh

The following discussion introduces the STC using the dual of a two-dimensional quadrilateral mesh. A quadrilateral mesh can be uniquely described by its dual in STC space [F. P. Preparata & M. I. Shamos, *Computational Geometry an Introduction*, Springer-Verlag, New York, 1985, at pp. 24–26 (1985).] The definition used for the mesh dual is slightly different from the standard in terms of the manner in which it deals with vertices outside the input region, which is described below.

Figure 1:
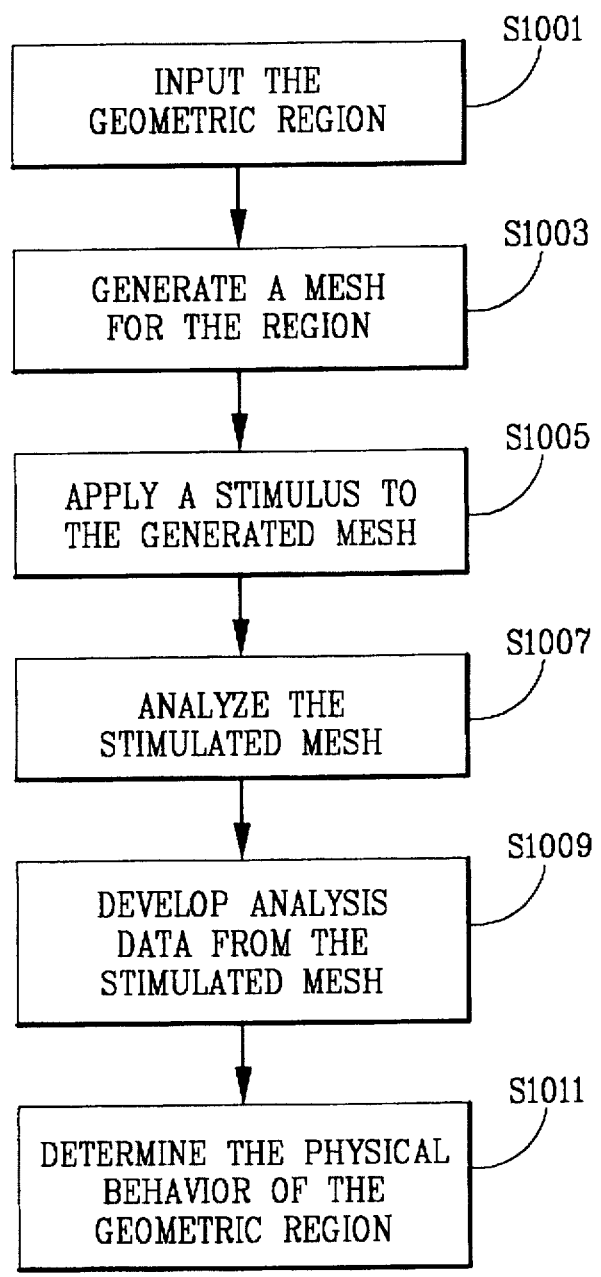
FIG. 1 illustrates a flow diagram for finite element analysis.
Figure 2:
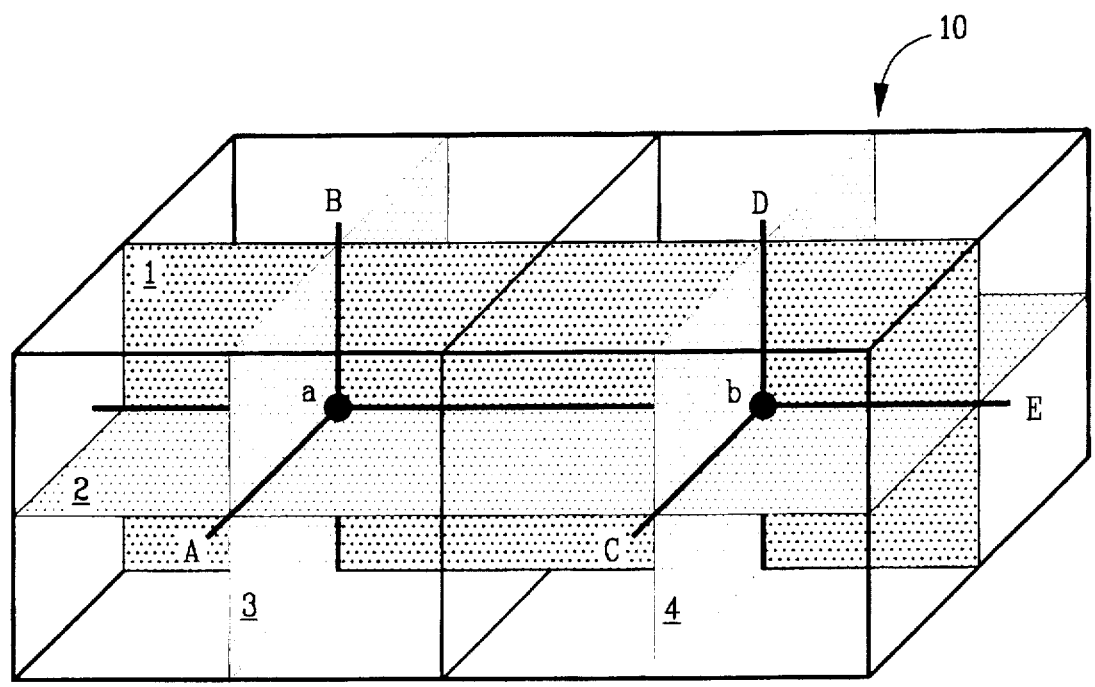
FIG. 2 illustrates an arrangement of surfaces in a mesh representing a solid composed of two hexahedra, showing whisker sheets (1–4), whisker chords (A–E), and STC vertices (a–b).

Referring to FIG. 2, there is shown an arrangement of surfaces in accordance with the STC representation in a mesh 10 composed of two hexahedral elements, a and b. In FIG. 2, there are three planes shown bisecting each of the two hexahedral elements; these planes are referred to herein as "whisker sheets" or simply, sheets (or planes). Whisker sheets can be envisioned as general three-dimensional surfaces that propagate through a hexahedral mesh, bisecting each hexahedron between pairs of faces. The mesh shown in FIG. 2 comprises four sheets, numbered 1–4.

Figure 2A:
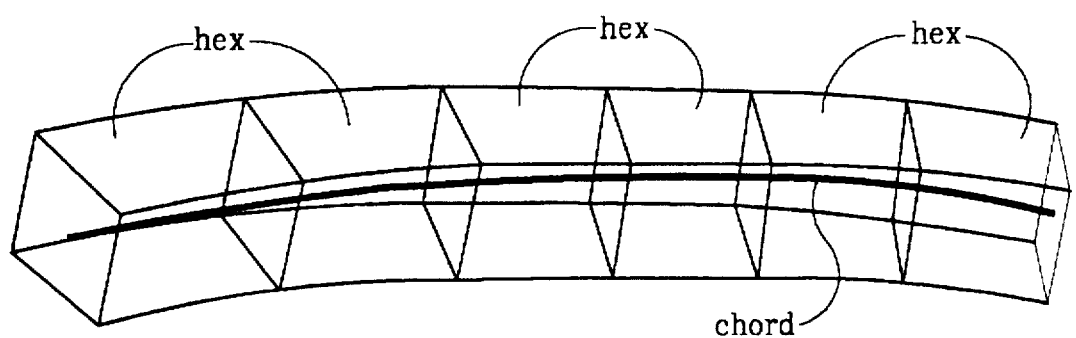
FIG. 2a illustrates a chord in the three-dimensional STC representing a column of hexahedra.

The line formed by the intersection of two sheets is referred to herein as a "whisker chord," or simply, a chord. There are five chords shown in FIG. 2 with reference letters A–E. Chord A is formed by the intersection of sheet 2 and sheet 3; Chord B is formed by the intersection of sheet 1 and sheet 3; Chord C is formed by the intersection of sheet 2 and sheet 4; Chord D is formed by the intersection of sheet 1 and sheet 4; and Chord E is formed by the intersection of sheet 1 and sheet 2. Chords propagate through a hexahedral mesh and define a column of elements as shown in FIG. 2a. For example, chord E in FIG. 2 defines a column of elements formed by the two hexahedra elements a and b in this mesh 10. Each hexahedral element, a and b, is represented by the intersection of three sheets, or alternatively, the intersection of three chords. Thus, referring to FIG. 2, hex element a is formed by the intersection of sheets 1, 2, and 3, and the intersection of chords A, B and E; hex element b is formed by the intersection of sheets 1, 2, and 4, and chords C, D and E.

FIG. 3a illustrates the dual for a simple quadrilateral mesh. The dual entities of dimension 0, 1, and 2 are referred to as STC centroids or vertices, STC edges, and STC 2-cells, respectively. Only the connectivity of the dual is important here; the geometric position of the centroids is taken to be somewhat arbitrary. The important aspects are which centroids are connected to each other by STC edges, the clockwise order of the STC edges around a centroid and that STC edges do not cross each other. STC edges may be embedded as curves.

The connectivity of the dual can be constructed by first placing a STC centroid or vertex in each quadrilateral. There are six quadrilaterals shown in FIG. 3a (shown in dotted lines) with one quadrilateral 20 referenced (as an example). Accordingly, there are six centroids located on each of the six quadrilateral faces, with one centroid 25 referenced. Next, wherever two quadrilaterals share a mesh edge, a STC edge is added to join the corresponding centroids. (Four STC edges 15 are marked on FIG. 3a as exemplary.) To simplify the description of the two-dimensional chords below, the usual dual centroid located at infinity, and the dual centroids for input region holes, are not included in the definition of the mesh dual used herein. However, STC edges that are dual to quadrilateral edges on the boundary of the input are constructed. One vertex of such a STC edge is a centroid, and the other vertex is a point on the input boundary. This construction is shown in FIG. 3b, which shows a chord 30 of the STC.

Each centroid has four STC edges corresponding to each quadrilateral having four sides. A 2-cell is the dual of a mesh node. The boundary of the 2-cell is the "polygon" of STC edges which are dual to the mesh edges containing the given mesh node, possibly together with a portion of the input boundary. Because the embedding is not important, the polygon may have curved sides, etc. The number of STC edges bounding a 2-cell is equal to the number of mesh edges attached to the corresponding node.

Note that a mesh entity of dimension d corresponds to a dual STC entity of dimension 2-d as shown in Table 1. For example, a mesh face (dimension 2) corresponds to a STC centroid (dimension 0).

TABLE 1

Correspondence of STC dual entities to mesh entities.

| STC Entity | Dimension | Mesh Entity | Dimension |
|---|---|---|---|
| Centroid/Vertex | 0 | Face | 2 |
| Edge | 1 | Edge | 1 |
| 2-cell | 2 | Node | 0 | a. Two-dimensional Chords

Any type of mesh admits a dual [See F. P. Preparata & M. I. Shamos, *Computational Geometry an Introduction*, Springer-Verlag, New York, 1985, at pp. 24–26 (1985).], but an all-quadrilateral mesh dual has a unique property. Namely, portions of the dual can be logically grouped, allowing a higher-level interpretation of the mesh and the global connectivity of its elements. The dual of a quadrilateral or hexahedral mesh has a special structure that allows it to be represented as an arrangement of continuous curves (chords) or surfaces (sheets or whisker sheets). Dual edges that correspond to opposite sides of a quadrilateral are grouped into a continuous curve referred to as a chord. FIG. 3b highlights one chord 30 resulting from the mesh in FIG. 3a. A chord actually represents a one-dimensional stack of elements (see FIG. 2a). In effect, the quadrilateral mesh can be viewed as an intertwining of chords (or rows of elements) rather than as a collection of individual elements. The crossings formed by these intertwined chords are the elements, and the manner in which the chords intertwine dictates the validity and gross quality of the actual mesh. With this perspective in mind, the following properties of chords in a valid mesh are identified:

Property 1. Chords that begin on the boundary of the input region must terminate on the boundary of the input region, which is equivalent to the fact that quadrilateral meshes must have an even number of edges around their boundaries.

Property 2. Chords that do not begin on the boundary must be closed curves.

Property 3. Chords may cross each other multiple times, but such crossings may not be consecutive (i.e., if two chords cross at centroids 1 and 2, then at least one of the chords centroids 1 and 2 must be non-consecutive). Property 3 forbids two quadrilaterals that share two edges.

Property 4. A chord is allowed to cross itself, but not in a local sense (i.e., between the first and second time a chord passes through a given centroid, there must be at least four other centroids).

Property 5. Each centroid is passed through exactly twice, either by two distinct chords or by one chord twice (e.g., three chords being coincident is forbidden). Also, chords are not tangent anywhere.

Property 6. Each chord has at least one centroid.

In addition, the STC has the following properties regarding 2-cell.

Property 7. The portion of the object's boundary touched by a STC 2-cell is a connected set. Furthermore, a STC 2-cell touches at most one boundary node to ensure that the object's boundary is correctly captured by the mesh.

Property 8. Two STC 2-cell have at most one STC edge in common, which prevents two mesh nodes from sharing two edges.

Any non-empty arrangement of curves inside an input region satisfying these conditions defines a valid quadrilateral mesh. Pathological connectivity is ruled out, but beyond that there is no guarantee that the mesh will have well-shaped elements, even after smoothing. The chord and centroid representation provides a simple, but powerful, dual method for defining the basic connectivity rules for all-quadrilateral meshes.

2. Hexahedral Meshes and the Three-dimensional STC

The following discussion demonstrates the power of the STC in the full three-dimensional case, and also, notes the important role that the two-dimensional STC of a surface mesh plays in determining the possible meshes of the interior volume. Analogous to the two-dimensional case there are base entities and associated constructs that make up the STC for a three-dimensional, all-hexahedral mesh. A hexahedral element has six quadrilateral faces and eight three-edged corners. The connectivity of an all hexahedral mesh requires that neighboring hexahedra share common faces. Thus, by the very nature of the hexahedral element and based solely on its requirement to share faces with neighboring elements, there exists a well-defined connectivity construction. As in the quadrilateral mesh case, this construction, represented by the STC, is defined using a logical grouping of portions of the dual of the hexahedral mesh. First, the hexahedral mesh dual is examined and then the chords and whisker sheet constructs, which define the Spatial Twist Continuum, are defined.

A hexahedral mesh is uniquely described by the STC entities introduced supra (i.e., STC centroids, edges, and 2-cell) and a three-dimensional entity referred to as a STC 3-cell. By duality, there is a one-to-one correspondence between STC entities and mesh entities, which is shown in Table 2. By definition, in three dimensions, a mesh entity of dimension d corresponds to a dual entity of dimension 3-d (see Table 2).

TABLE 2

Correspondence of three-dimensional STC dual entities to hex mesh entities.

| STC Entity | Dimension | Mesh Entity | Dimension |
|---|---|---|---|
| Centroid/Vertex | 0 | Hex | 3 |
| Edge | 1 | Face | 2 |
| 2-cell | 2 | Edge | 1 |
| 3-cell | 3 | Node | 0 |

This dual can be constructed for an existing mesh similar to the two-dimensional case. A centroid is placed in each hexahedron. A STC dual edge is constructed by joining the centroids of elements that share a face. Thus, six edges emanate from each centroid. A 2-cell is the "polygon" of STC edges that are dual to the mesh faces containing a given mesh edge, possibly together with part of the input boundary. As in the two-dimensional case, the 2-cell could have any number of sides, equal to the number of faces sharing the edge. Likewise, a 3-cell is the "polyhedron" of STC 2-cell dual to the mesh edges containing a given mesh node, possibly together with part of the input boundary. The 3-cell could have any number of 2-cell facets, equal to the number of edges sharing the node. FIG. 2 shows a simple hexahedral mesh composed of two elements and its dual, with 2-cell shown as shaded surfaces. In this example, the 3-cells all resemble cubes. As with the two-dimensional quadrilateral mesh, any three-dimensional mesh admits a dual, but a hexahedral mesh dual has some unique properties and constructs defined infra.

a. Three-dimensional Chords

One such construct for the three-dimensional STC is a chord. As in the two-dimensional case, a three-dimensional chord is a one-dimensional curve. A chord for a hexahedron is constructed by grouping the two STC edges that are dual to opposing faces. FIG. 2 labels the chords A–E as discussed earlier. A hexahedron may be defined as the intersection of three chords, since the chords are continuous through the element. A chord also extends into the surrounding mesh as follows: if two hexahedra share a face, then the chords through that face are grouped together. Thus, a chord represents a continuous stack of hexahedral elements. This stack either starts and stops on the input boundary, or closes on itself. In FIG. 2, chord E passes through the two hex elements a and b and stops where the input boundary is met, i.e., the surface.

b. Whisker Sheets

The primary advantage of the STC can be appreciated through the two-dimensional construct referred to as a "whisker sheet" (or sheet or twist plane). A whisker sheet is formed by grouping the 2-cells that are logically perpendicular to a chord, as shown in FIG. 2. Thus, a whisker sheet within a single hexahedron will cut four faces, which form a cycle. Each hexahedron contains three such whisker sheets, and the STC centroid is actually the intersection of these three whisker sheets as shown in FIG. 2. Note that a whisker sheet contains the two chords of the hexahedron to which it is not perpendicular; a whisker sheet can alternatively be defined by the chords it contains.

As with the chord construct, whisker sheets extend continuously through the mesh as follows: If two hexahedra share a mesh edge, then the whisker sheets through that edge are grouped together. Thus a whisker sheet represents a continuous "layer" of hexahedral elements in the mesh. FIG. 2 shows how a whisker sheet (sheet 1) passes through the two hexes of the example mesh.

c. Symbiosis of Chords and Whisker sheets

From the above definitions of chords and whisker sheets, one can see that the definitions are coupled. A chord may be defined as the intersection of two whisker sheets. Alternatively, a whisker sheet can be defined by the chords that it contains (the exact geometric embedding of the whisker sheet is not unique, but its combinatorial structure is completely specified). Hexahedra can be derived from either description: either as the intersection of three whisker sheets, or as the intersection of three chords. Considering whisker sheets or chords as the basic entities from which the other types are derived is not completely equivalent from a hexahedral mesh generation standpoint. Although an arrangement of surfaces may be quite general and still define the whisker sheets of a valid STC, an arrangement of curves in three-dimensions must be highly structured in order to be able to define them as chords and extract whisker sheets.

Taking the view that whisker sheets define chords, the position of the whisker sheets in space defines the position of the chords of intersection. In the alternate view that chords define whisker sheets, the location of the whisker sheets is defined by some smooth interpolation of the location of the chords. Hence, if a chord 40 changes position to 40' (but stays on one whisker sheet A), then the other whisker sheet B containing chord 40' must change position ("twist") to B' to match whisker sheet A'. These relationships are shown in FIG. 4. The key element is that a chord stays on both whisker sheets.

d. Surface Loop Chords

Figure 5:
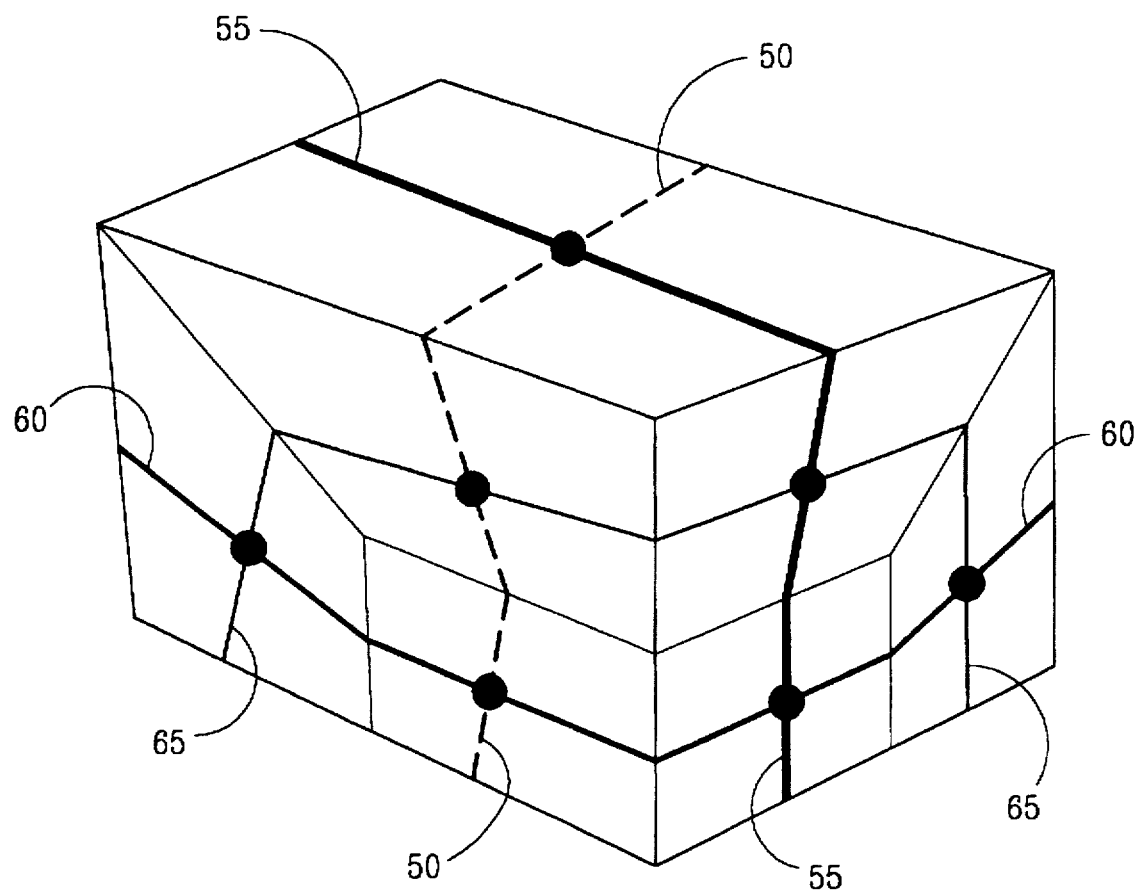
FIG. 5 illustrates surface loops for an example surface mesh.

The intersection of a whisker sheet with the boundary of the object being modeled creates a surface loop chord, which is continuous around the boundary. The loop chord differs from a three-dimensional chord since it lies on the faces of the surface and does not pass through a hexahedral centroid. A loop chord can also be thought of as a chord of the two-dimensional STC of the surface mesh. Loop chords are shown as lines 50, 55, 60, and 65 in FIG. 5. An important feature of a surface loop is that it always closes upon itself (because the object's surface is closed). There are no limitations to the number of surface loops associated with a given whisker sheet. Each connected component of the intersection of the whisker sheet with the object boundary creates a separate surface loop. A whisker sheet with no surface loops corresponds to a closed surface (e.g., a topological sphere) entirely inside the mesh. A cylindrical whisker sheet may form two surface loops, etc.

The surface loop chords play and important role in any advancing-front type of meshing technique. If a surface mesh is given, then the intersections of whisker sheets with the geometric surface are already determined. However, elements are added inside the volume; the resulting whisker sheets must coincide with the predetermined surface loops on the geometric boundary, or the surface mesh must be changed. The same principle applies to the two-dimensional surface loops that exist on any meshing front—as fronts merge, the whisker sheets must respect the loops, or the loops must be changed by modifying the mesh behind the front.

e. Connectivity Configurations

To gain some intuition about the interaction between whisker sheets within a mesh, several examples of whisker sheets constructs (or states) have been identified. The basic constructs defined here include parallelism, the orthogonal connectivity, the fold, and the corner.

Two whisker sheets are said to be (locally) parallel if they pass through hexes that share a face but do not intersect each other. The layers of hexahedra formed by parallel whisker sheets lie directly on top of each other. This parallelism may continue throughout the mesh or be disrupted by the folds and corners that are defined below.

Figure 6A:
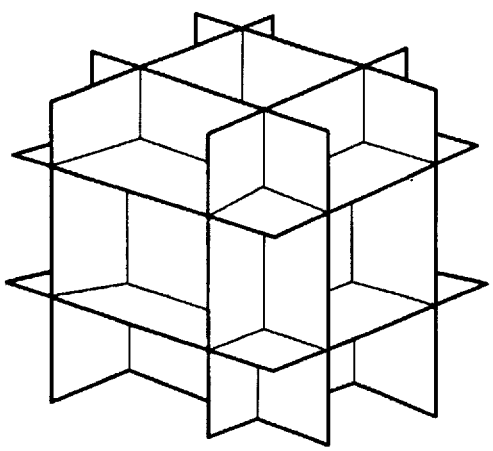
FIG. 6a illustrates the orthogonality state.
Figure 6B:
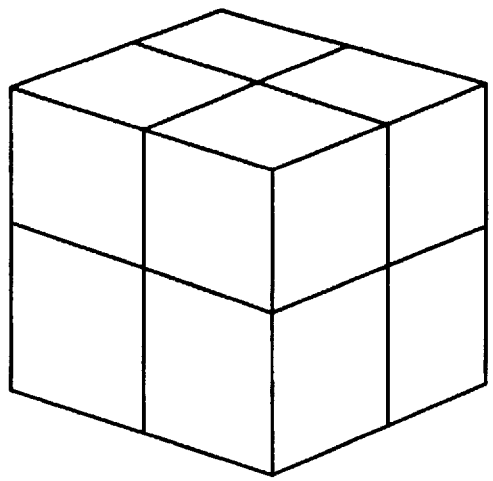
FIG. 6b illustrates the mesh defined by the orthogonality state.

The orthogonal connectivity corresponds to a regular mesh; each internal node is connected to eight elements. In this state, two nearby whisker sheets are either parallel or perpendicular to each other throughout the entire construct. For example, the orthogonality state and the three-dimensional hexagonal mesh it defines are shown in FIGS. 6a and 6b, respectively.

Figure 7A:
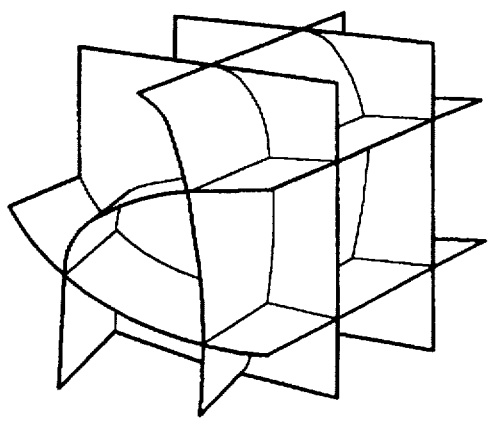
FIG. 7a illustrates the STC fold.
Figure 7B:
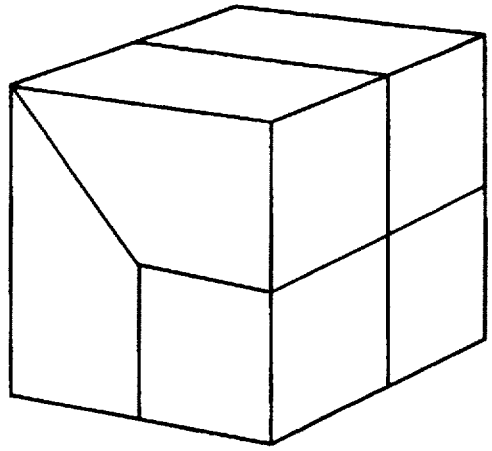
FIG. 7b illustrates the mesh defined by the STC fold.
Figure 8A:
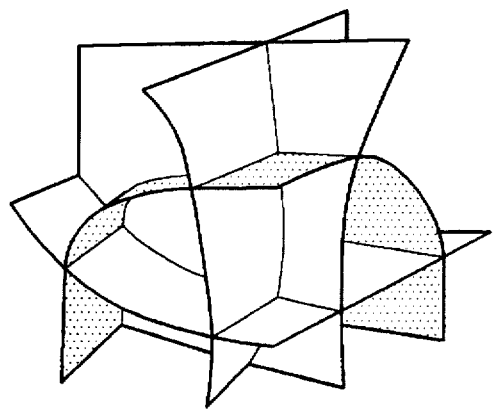
FIG. 8a illustrates the front view of a STC corner.
Figure 8B:
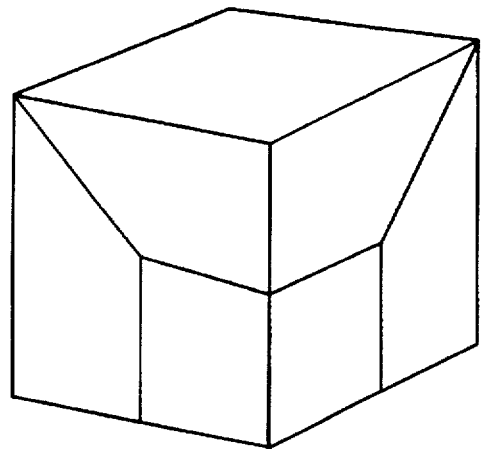
FIG. 8b illustrates the mesh it defined by the STC corner.
Figure 9A:
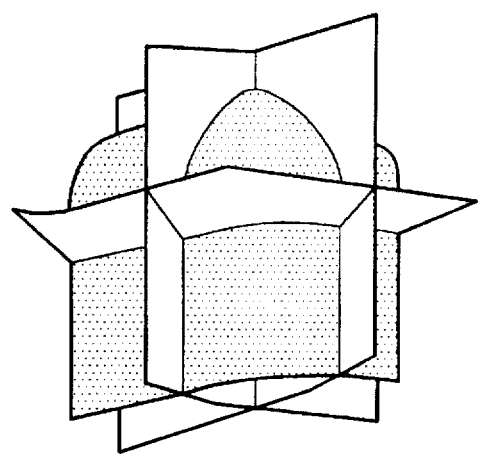
FIG. 9a illustrates the rear view of a STC corner.
Figure 9B:
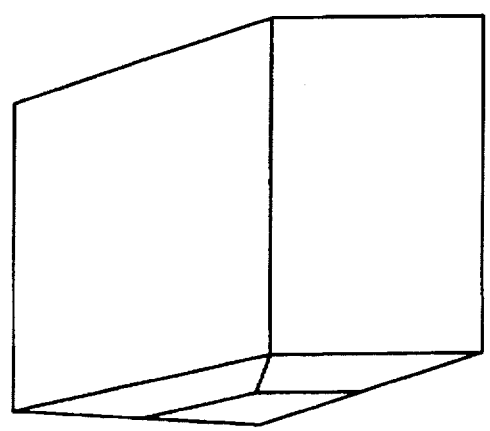
FIG. 9b illustrates the mesh defined by the STC corner.

A fold is defined when two locally parallel whisker sheets change to become perpendicular as illustrated in FIG. 7. A fold results in a triangular STC 2-cell on a whisker sheet orthogonal to the first two planes. This triangular structure extends through the mesh on other orthogonal whisker sheets, until another fold or corner is reached. A corner occurs when a folded whisker sheet folds again in a perpendicular direction. FIG. 8a illustrates the front view of an STC corner, while FIG. 8b illustrates the mesh it defines. FIG. 9a illustrates the rear view of a STC corner, while FIG. 9b illustrates the related hexahedral elements defined by the STC corner.

The method of the present invention takes the following approach. First, given an arbitrary solid, an arbitrary quadrilateral mesh of its surface is created. This quadrilateral surface mesh is then sorted into two-dimensional surface loops. Each loop contains information about which other loops it crosses on the surface. These crossings indicate the beginning/ending locations of chords on the whisker sheet containing the loop. These crossings, or "whiskers," are then extended and intersected locally (woven). Chords are also joined; a joined chord is complete in the sense that it starts and ends on the surface mesh or closes on itself. Eventually, every whisker of every loop is complete and the technique terminates with a valid three-dimensional STC. The main power of the technique is that the three-dimensional meshing problem is reduced to a series of local problems on interdependent two-dimensional sheets (whisker sheets flattened/projected into a two-dimensional space).

As shown by the interdependency of surface loops and whisker sheets, a surface mesh imposes certain global constraints on the manner in which the volume may be filled with hexahedra. Any three-dimensional hexahedral meshing technique that starts with a surface mesh must (implicitly) address these constraints, whether or not the STC is used explicitly. To date, the STC provides the most natural representation of these constraints. Note that the input geometry imposes other constraints (due to desired element shape quality) that are not addressed by the STC itself. Whisker Weaving™, however, does consider geometry to some extent.

B. Whisker Weaving™

In a preferred embodiment of the present invention, the apparatus and method of the present invention may be adapted to run on a work station programmed with an automated mesh generation program, such as CUBITS™ [See Ted D. Blacker et al., *CUBIT Mesh Generation Environment, Volume 1*: User's Manual, SAND94-1100, Sandia National Laboratories, Albuquerque, N. Mex., May 1994.] CUBIT™ is a solid-modeler based pre-processor being developed at Sandia National Laboratories that meshes surface and volume solid models for finite element analysis. The CUBIT™ mesh generation environment is a two- and three-dimensional finite element mesh generation tool that is being developed at Sandia National Laboratories to pursue the goal of robust and unattended mesh generation—effectively automating the generation of quadrilateral and hexahedral elements. With CUBIT™, the geometry of a part can be imported, created, and/or modified using an embedded solid modeling engine. The geometry can then be discretized into a finite element mesh using a combination of techniques including Paving™, mapping, sweeping, and various other techniques. CUBIT™ also features boundary layer meshing specifically designed for fluid flow problems. Boundary conditions can be applied to the mesh through the geometry and appropriate files for analysis generated. CUBIT™ is specifically designed to reduce the time required to create all-quadrilateral and all-hexahedral meshes.

Figure 10:
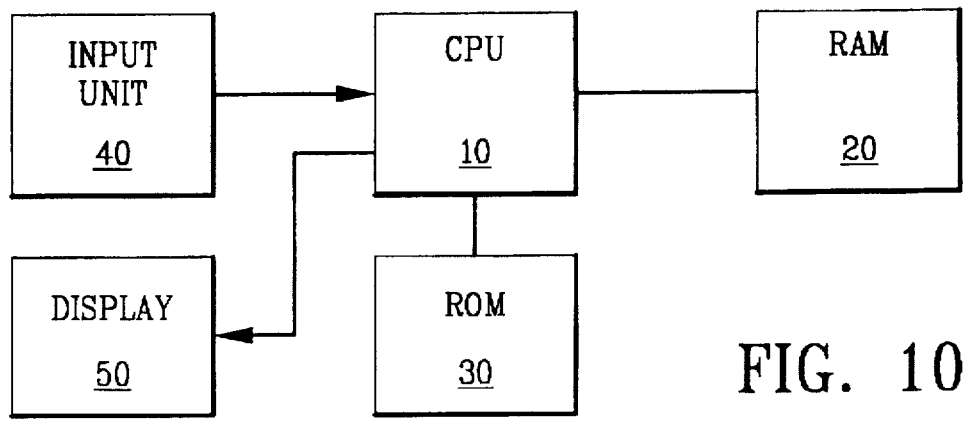
FIG. 10 illustrates the apparatus used in a preferred embodiment of the present invention.

FIG. 10 illustrates a central processing unit ("CPU") 10 connected to a random access memory ("RAM") 20 and a read only memory ("ROM") 30 for running the quadrilateral mesh generation program with the Whisker Weaving™ technique (the pseudo code of the program is shown below under Section V.E.—*Outline of the Method Steps*). An input unit 40 is connected to the CPU 10 for inputting geometric data into a data base stored in the RAM 20. The input unit 40 may be a conventional CAD/CAM input such as a VAX 11/780 in a preferred embodiment for entering geometric data of the object into the data base by drawing the geometric region on the screen of the CAD/CAM system or directly entering the data via a keyboard, mouse, digitizer, or the like for the geometric region into a data file. The data input for the geometric region may include any physical characteristic data for the geometric region such as geometric data, thermal conductivity, material strength, etc. In addition, a display 50 is connected to the CPU 10 for displaying the geometric data. A conventional display, such as a cathode ray tube ("CRT") for example, may be used as the display 50.

The intersection of a sheet with the geometric surface is referred to as a loop of quadrilateral faces, or simply, a loop. Each quadrilateral face is bisected by two loops and is the starting point of a chord. Note that a sheet may contain a plurality of loops or zero loops, but in practice, most sheets have at least a single loop. Also, a loop can intersect itself, resulting in a self-intersecting sheet. (Sheets with more than one loop or with self-intersections are discussed in more detail infra under Section V.C. Special STC Constructs.)

1. Sheet diagrams

One of the primary benefits of the STC is the reduction of a three-dimensional meshing problem to a series of interlaced two-dimensional problems, i.e., the decomposition of a three-dimensional case to a two-dimensional case. The STC arrangement, which comprises a collection of intersecting three-dimensional surfaces, i.e., sheets, in space, may be represented as a collection of two-dimensional sheet diagrams. The STC data produced by the method of the present invention is visualized in the form of sheet diagrams. Intuitively, a sheet is "flattened" so that its loop forms a polygon in the plane, and its chords are line segments inside this polygon. (Sheet diagrams for self-intersecting sheets and sheets having more than one surface are more complicated and are discussed infra under Section V.C. Special STC Constructs.)

Recall that a STC 2-cell is a polygon inside the loop on a sheet diagram and bounded by two or more STC edges (an uncompleted 2-cell is the collection of STC edges between two adjacent whiskers, inclusive). STC 2-cell correspond to mesh edges in mesh space. A STC 3-cell is a polyhedron whose surfaces are all STC 2-cell and corresponds to a mesh node. STC 3-cells are not represented directly in the present invention, and indeed, are not necessary to compute an all-hexahedral mesh. However, they must be derived from the other STC data in order to convert the STC data back into a real mesh.

A sheet is represented with its loop as a n-sided polygon, where n is the number of quadrilateral faces on the loop. The remainder of the sheet lies inside the loop. Each chord is represented by a line segment, which is referred to as a sheetchord. Because a chord is formed by the intersection of two sheets, each chord has two sheetchords—one corresponding to each sheet. Chords that pass through a quadrilateral on the geometric boundary have sheetchords that intersect the polygon. This intersection is labeled outside the polygon with the identifier number of the corresponding mesh face and inside with the "other" sheet number for that chord. Hexahedra are represented by the vertex formed by crossing two sheetchords. These hexahedra are referred to herein as "whisker hexes" instead of just hexes, because they represent only the connectivity of a normal hex element. Because each whisker hex is formed by the intersection of three sheets, it appears as a vertex on three different sheet diagrams. In an uncompleted mesh, a small dangling edge is drawn on the end of a sheetchord and represents a face on the meshing boundary; this dangling edge is sometimes referred to as a "whisker." The portion of a sheetchord lying between two vertices is referred to as an "STC edge." STC edges correspond to mesh faces in mesh space.

Figure 11:
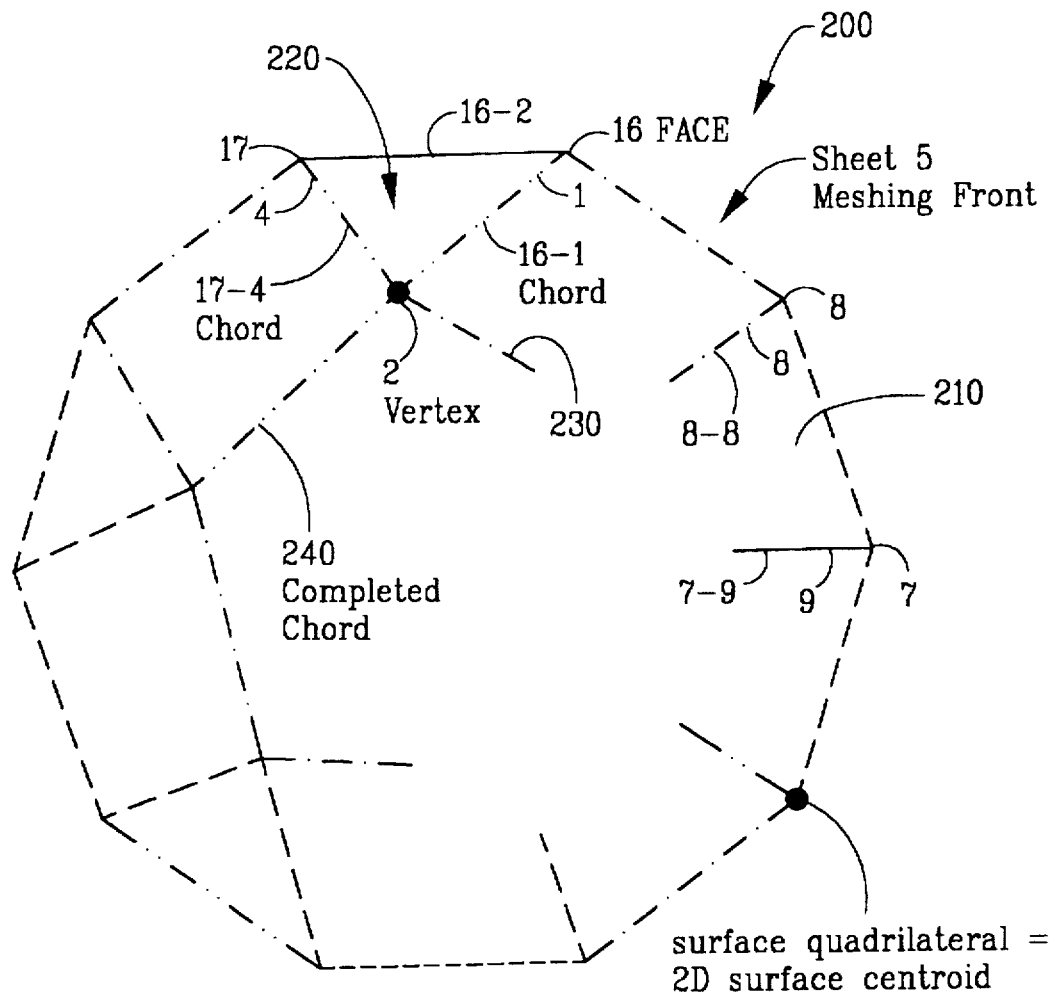
FIG. 11 illustrates a sheet diagram 200 in accordance with the present invention.

For example, referring to FIG. 11, Sheet 5 is represented with its loop as a 10-sided polygon 210 on sheet diagram 200. The chord with label 16 outside the loop and label 1 inside the loop, referred to as the 16-1 chord or sheetchord, begins at quadrilateral face number 16 and is formed by the intersection of sheets 5 and 1 (not shown). This 16-1 chord is represented by the sheetchord 16-1 on Sheet 5, and also by a 16-5 sheetchord on Sheet 1 (not shown). The first STC edge 16-2 on this sheetchord (between the loop 210 and STC vertex 2) represents face 16 in mesh space, while the first STC vertex 2 on that sheetchord 16-1 represents hex element number 2. The STC 2-cell 220 bounded by STC vertex 2 and the loop intersections of chords 16-1 and 17-4 represents the mesh edge shared by faces 16 and 17 in mesh space. In the uncompleted mesh as shown in FIG. 11, an exemplary, small dangling edge 230 is drawn on the end of the 17-4 sheetchord and represents a face on the meshing boundary; the dangling edge 230 is referred to as whisker 230. A completed chord 240 is shown on FIG. 11. Chords 8-8 and chord 7-9 are examples of adjacent chords.

The method of the present invention builds the connectivity of an all-hexahedral mesh, starting from the geometric boundaries and moving inward. In this section, Whisker Weaving™ will be described as it applies to a very simple example problem, namely, a small corner hex. Issues arising when applying the method to more complicated problems are discussed later.

2. Small Corner Hex Example

A simple, non-limiting example illustrates the steps involved in the method of the present invention. The geometry and surface mesh for this example, referred to as the "small corner hex" problem, are shown in FIGS. 12a and 12b, where FIG. 12a shows the front faces, and FIG. 12b shows a cutaway view of the back faces. There are seven quadrilateral faces shown in FIG. 12a, faces 1–6 and 12, while there are five quadrilateral faces shown in FIG. 12b, faces 7–11.

The starting point for Whisker Weaving™ is an arbitrary three-dimensional volume, whose surfaces have been meshed exclusively with quadrilateral elements. These surface meshes can be generated with any suitable technique, for example, mapping [See W. A. Cook & W. R. Oakes, *Mapping Methods for Generating Three-Dimensional Meshes*, Computers in Mechanical Engineering, August 1982, at pp. 67–72.] or Paving™ (Blacker, U.S. Pat. No. 5,315,537). The all-quadrilateral surface mesh is required by the assumption of an all-hexahedral mesh.

The method and apparatus of the present invention seek to build all-hexahedral mesh connectivity through the application of a simple set of rules that govern the formation of individual hex elements (hexes) and the resolution of local connectivity problems. An important feature of the present invention is that the set of rules is kept very simple; in particular, every effort is made to avoid special case rules that may not apply to geometries in general. First, a three-dimensional STC (arrangement of surfaces) is created and then converted to a hexahedral mesh.

In its most basic embodiment, the method of the present invention comprises crossing three chords, joining any chord pairs possible, and repeating the process until the weave is closed. Which three chords to choose for the next crossing is not a unique decision; there can be many possible combinations of chords that can cross. The method used to determine the next chords to cross determines the order in which hexes are formed; this ordering is one of the characteristics of the method of the present invention. In the case of the present invention, an advancing front method is desired. More specifically, hexes should be generated by starting at the outer boundary and working inward, which leads to boundary sensitivity, or generating well-formed hexes near the boundary, and results in more accurate finite element analyses. The method of the present invention may be summarized by the following pseudo code.

```
- form face loops and allocate whisker sheets
// start meshing
- while (state list not empty) {
    - get sheetchord off state list → sheetchord1
    - get CCW neighbor of sheetchord1 → sheetchord2
    - check to see if sheetchord1 & sheetchord2 can be crossed
    - if (they can cross)
    {
        - look for a third chord (create a blind one if none is found) →
chord3
        - check to see if chord3 can be crossed with chord1 & chord2; if it
can,
        {
            - make crossing on 3 sheets
            - check_joins(chord1, chord2, chord3)
        }
    }
}
```

At a high-level (i.e., simple) embodiment, the method of the present invention comprises four steps: (1) constructing a plurality of initial loops, sheets, chords, and sheetchords from a given surface mesh; (2) locating at least three pair-wise adjacent chords; (3) constructing a vertex (corresponding to a whisker hex) by crossing the at least three pair-wise adjacent chords; and (4) checking for invalid connectivity on all sheets involved in the whisker hex. After the first step, the next three steps are iterated to create a hex and resolve some connectivity invalidities until the entire hexahedral mesh is completed. Block-type solids with regular surface meshes can be meshed using just these four steps, while more complicated geometries require additional steps, which are discussed later. The four steps are described in more detail below.

Step 1: Construct initial loops, sheets, chords, and sheetchords

Constructing a plurality of loops is the first step of the method of the present invention. The loops for a given surface mesh can be easily generated by traversing the mesh's quadrilateral faces in an ordered fashion. Given a surface meshed with quadrilateral elements, a loop is initialized by picking any untraversed quadrilateral edge as the starting edge and traveling to the opposite quadrilateral edge. The opposite edge is shared with another quadrilateral, thus, the traversal is repeated until the starting edge is reached from the other side to form a loop. The loop stores the mesh faces on an ordered list as it traverses them.

Figure 14:
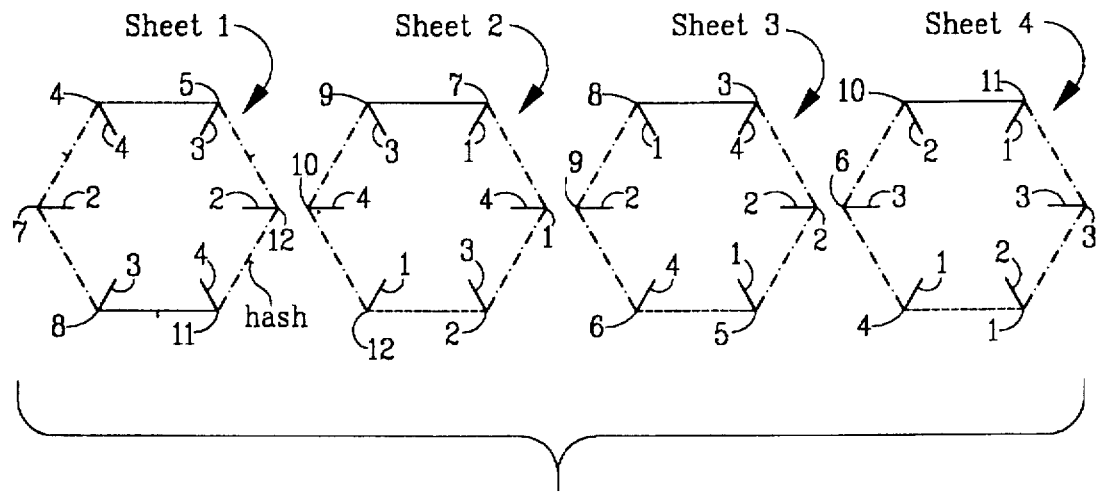
FIG. 14 illustrates whisker sheet diagrams for the small corner hex example.

All loops have been formed when all quadrilaterals have been crossed by two loops. Initially, a unique whisker sheet is defined for each loop. (Later, some sheets might be merged to form one sheet with multiple loops.) There are four loops for the small corner hex example as shown in FIGS. 13a and 13b: Loops 1, 2, 3, and 4. After the loops are constructed, a chord is constructed for each mesh face. Each chord has two sheetchords, one sheetchord corresponding to each sheet forming the chord. Now the sheet diagrams can be drawn as shown in FIG. 14, with the loops represented as a circle (or n-sided polygon) and the three-dimensional chord emanating from each loop centroid pointing toward the circle center. Because the hexahedral mesh has not yet been created at this step, each of these "chords" is simply a line segment referred to herein as a "whisker." A chord is considered completed when it has both ends on the surface mesh or closes upon itself to form a closed curve. Initially, no chord is complete.

FIG. 14 shows the four sheet diagrams for this small corner hex example. Sheet numbers (1–4) are shown in the upper right-hand corner of each of the four sheet diagrams; for each sheetchord, the loop face id is written outside the loop, and the other sheet number for the sheetchord is written inside the loop.

Step 2: Locate three pair-wise adjacent chords

In the method of the present invention, hexes are formed by crossing three chords to form three STC vertices. This is shown on sheet diagrams by the crossing of three pairs of whiskers on three sheets. In mesh space, this represents the formation of a hex using three faces that, pair-wise, share three edges. The crossing of three pair-wise adjacent chords corresponds to locating three quadrilaterals on the meshing front that pair-wise share edges. Note that this means that the quadrilaterals are connected so as to form three faces of a hexahedron that share a node. Occasionally, no such triple of chords can be located, in which case two chords that are adjacent will suffice, and the third chord is created. This third chord does not intersect the surface mesh, and is referred to herein as a "blind" chord as discussed infra. This corresponds to locating only two quadrilaterals on the meshing front that share an edge and creating a third quadrilateral that forms a hexahedron corner.

To determine the three chords that are required to form a hex, a pair of adjacent whiskers on any sheet is arbitrarily chosen and a local search of the corresponding whiskers on the two "other" sheets is conducted to determine whether a proper third chord can be found. For example, in FIG. 14, Whiskers 4-4 (Face 4, other Sheet 4) and 7-7 (Face 7, other Sheet 7) on Sheet 1 are chosen as candidates; this completely defines the three sheets used to form the next hex, i.e., Sheets 1, 2, and 4. A proper third chord must be the intersection of Sheet 2 and Sheet 4. The third chord is found by examining the adjacent whiskers on the other two sheets, Sheets 2 and 4; the present invention checks for the existence of a chord corresponding to Face *, such that Whisker *-4 is adjacent to Whisker 7-1 on Sheet 2, and Whisker *-2 is adjacent to Whisker 4-1 on Sheet 4. In FIG. 14, the chord with Whiskers 1–4 and 2-2 on Sheets 2 and 4, respectively, is chosen to be the third chord. FIG. 12a shows that this corresponds to forming a hex using Faces 4, 7, and 1; one skilled in the art would recognize from FIG. 12a that these faces pair-wise share three edges.

Sometimes there is no third chord with whiskers adjacent to those for the first two chords on the other two sheets. In hex space, this corresponds to there being no third face that shares edges with the first two faces. This special case is described infra under Section V.C.- Special STC Constructs.

Because whisker chords are formed by the intersection of two whisker sheets, they must be represented on two sheet diagrams (or twice on the same sheet diagram if the chord is the intersection of a sheet with itself). Each of the two representations is a line segment on the sheet diagram, and is called a sheetchord. The number of vertices on a sheetchord corresponds to the number of hex elements contained on the corresponding chord, and the end of the sheetchord (i.e., the "whisker") corresponds to a mesh face on the boundary between the meshed and unmeshed portion of the solid. So, the number of crossings or vertices on a sheetchord represents the distance along that sheetchord between the outer boundary and the unmeshed region. Making crossings on sheetchords with the fewest crossings on them ensures that the unmeshed region is advanced in an even manner going inward from the outer boundary of a solid. In other words, this results in an advancing front-type technique.

Each sheetchord can be "ranked" according to how many crossings it contains on the sheet diagram. A state list can be constructed which comprises pairs of sheetchords, where each pair is a potential crossing that can be made. Using a state list results in present invention being an advancing-front technique. The state of each pair is determined by the minimum number of crossings on either sheetchord. The pair with the lowest state number is given the highest priority for crossing. Since there may be many pairs of sheetchords with the same state, each state contains a queue of sheetchord pairs. This queue is first-in-first-out, so that sheetchord pairs placed on the list first are the first ones considered for crossing. Sheetchords which can be crossed must be adjacent on the sheet diagram; because of this, only one sheetchord needs to be stored on the list, from which the other sheetchord can be found. By convention, only the sheetchord that is clockwise from the other sheetchord on the sheet diagram is stored in the state list. In summary, the "state list" for whisker weaving comprises N individual lists of sheetchords. The list number determines the minimum number of crossings on a particular sheetchord on the list.

The state list is initialized at the start of whisker weaving. Because of mesh quality considerations, sheetchord pairs which surround a geometric corner on the outer boundary are inserted first into the state list. Since by definition they have no crossings on them yet, one sheetchord for each pair is stored on state list number zero (0).

The following is a preferable pseudo code for determining the next sheetchord on the state list. To get the other sheetchord in the pair, the next sheetchord of that first sheetchord in a counterclockwise direction on the whisker sheet is found.

```
- sheetchord = NULL
- for (i = lowest_state_number to highest_state_number)
  {
    - if (there are sheetchords in state list i)
    {
      - sheetchord = first sheetchord in state list i
      - break from for loop
    }
  }
- if (sheetchord = NULL)
  {
    - print info message (no sheetchord found)
    - return NULL
  }
- else
  {
    - return sheetchord
  }
```

For example, consider the whisker sheet 1 diagram shown in FIG. 14. After initialization, there are four sheetchords on State List 0: the 4-4, 8-3, 11-4, and 12-2 sheetchords. Referring to FIG. 14, on the sheet 1 diagram, sheetchord 4-4 is the sheetchord with number 4 outside the loop and number 4 inside the loop. Each one of the sheetchords is clockwise from a corner (indicated by hash marks on the outer loop, half-way between each sheetchord) and actually represents a pair of sheetchords. Thus, the first pair of sheetchords chosen for crossing are the 4-4 and 7-2 sheetchords as shown in FIG. 15, Sheet 1, which form centroid 1.

Figure 15:
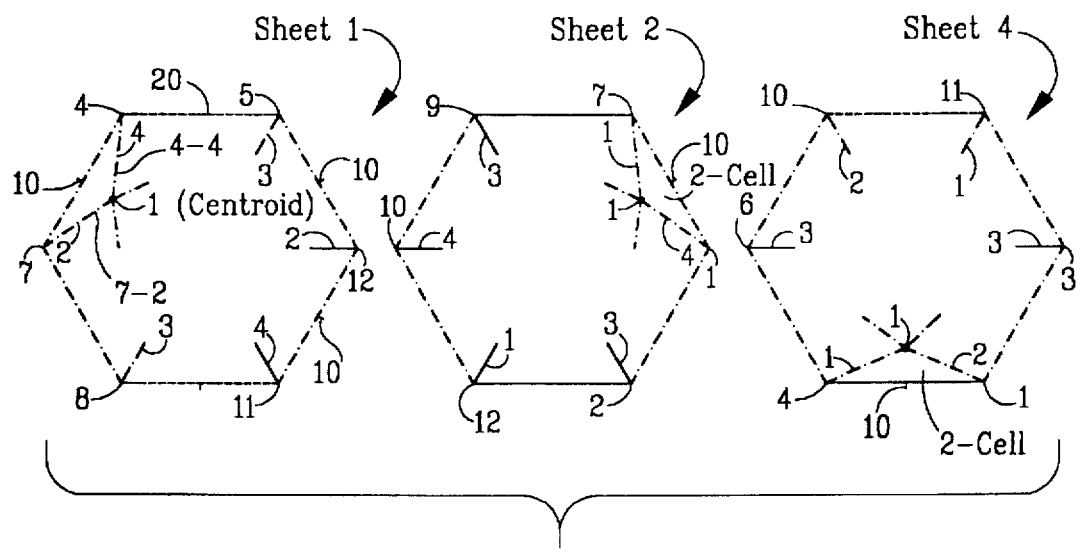
FIG. 15 illustrates whisker sheet diagrams for the small corner hex example after the formation of the first whisker hex, in accordance with the present invention.

After the first crossing is made, as shown in FIG. 15 - Sheet 1, the neighbors of the sheetchords being crossed are inserted into the state list. The state list after the first crossing is: State 0: 8-3, 11-4, 12-2, 5-3, 4-4. After the crossing is made, there are two more pairs of sheetchords that can be crossed; the two clockwise sheetchords for those pairs are the 5-3 and 4-4 sheetchords. These are inserted on the end of state list zero, because the minimum number of sheetchord crossings for each pair is zero.

Although, the discussion of the state list has been in terms of Sheet 1, the first crossing actually appears on three sheets, since a hex is formed by the crossing of three chords on three sheets. The other sheets, and their contributions to the state lists, are not discussed. Note also that there can be sheetchords on the state list which have already been completed, i.e., whose chords have been completed by joining with other chords. After removing sheetchords from the state list, the method of the present invention checks to see if the corresponding chords, and discards them if they have been completed. This is done to avoid the trouble of removing sheetchords from the state lists.

In summary of Step 2, the state of a sheetchord pair is determined by the minimum number of crossings on either sheetchord. Choosing the pair with the lowest state for the next crossing in whisker weaving results in an method that is advancing front in nature. The state list is implemented as a number of first-in-first-out queues or lists, with the list number corresponding to the state number. The state list is initialized at the start of the method of the present invention by inserting sheetchords on list number zero that are clockwise from geometric corners on the outer boundary.

Step 3: Construct a whisker hex by crossing the three pair-wise adjacent chords.

The three chords beginning at faces 4, 7, and 1 are then pair-wise crossed to form a new whisker hex 1 (vertex 1 in the figure). Recall that a chord lies on two sheets, whereas a whisker hex lies on three sheets. In the sheet diagrams, this means three pairs of whiskers are crossed to form three vertices. The three new vertices on sheets 1, 2, and 4 are labeled with the same whisker hex identifier 1. The three sheets involved in the first crossing are shown in FIG. 15. Whenever two chords are adjacent to each other on two sheet diagrams, the chords are joined. Note that both chords are necessarily the intersection of these two sheets. This double adjacency corresponds to two quadrilaterals that share two edges, and joining the chords corresponds to merging the two faces into one face.

There are some caveats as to the chords that can be chosen in Step 2. In particular, the formation of hexes with very large or very small angles between face pairs on the exterior geometry must be prevented. In terms of STC entities, this restriction is stated as follows:

Rule 1: Cross bare whiskers only around geometric corners (or, Do not cross bare whiskers except around geometric corners.).

Bare whiskers are defined as sheetchords that contain no STC vertices and correspond in hex space to faces on the surface mesh which have yet to be attached to a hex element. Therefore, crossing two bare whiskers is analogous to making a hex using two adjacent surface mesh faces. Rule 1 prevents the use of two faces in the same hex whose interior angle is not close to $\pi/2$. FIG. 15 shows that all whiskers involved in the first crossing are bare, and that there is indeed a geometric corner, indicated by a hash mark 10 on the outer loop 20, between each pair that crosses. Faces in the interior of the volume have some flexibility in their geometric embedding, so this rule is not tested for non-bare whiskers. However, there are other rules to prevent the formation of poorly-connected hexes (e.g., two hexes that share two faces). These rules are introduced later.

Figure 16:
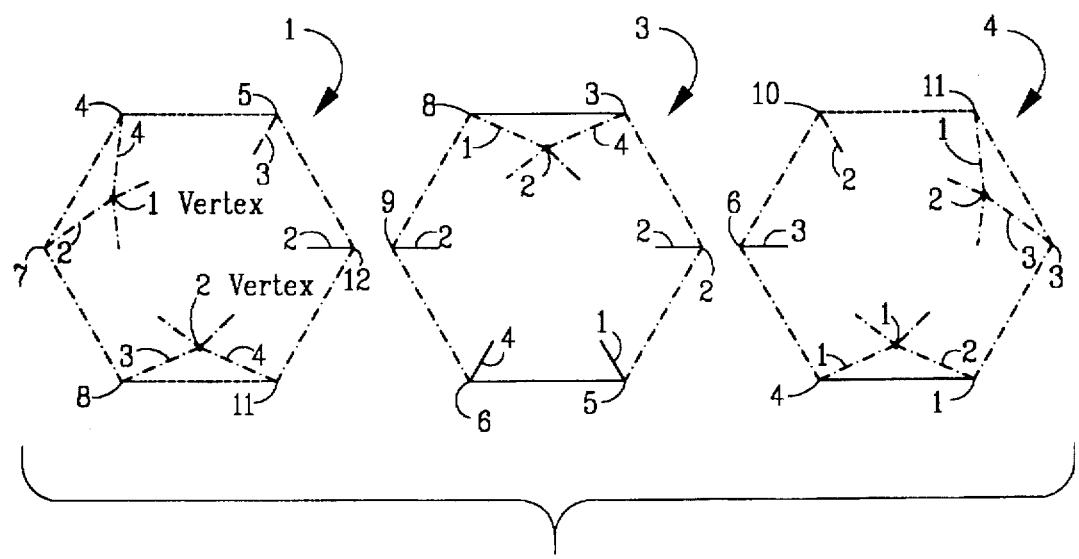
FIG. 16 illustrates whisker sheet diagrams for the small corner hex example after the formation of the second whisker hex, in accordance with the present invention.

Following the formation of the first whisker hex, a second whisker hex may be formed using Steps 2 and 3. FIG. 16 shows the sheets involved in the formation of the second whisker hex—Sheets 1, 3, and 4. A second hex (represented by vertex 2) is formed, for example, on Sheet 1 by crossing chords 8-3 and 11-4.

Step 4: Check for invalid connectivity on all sheets involved in the whisker hex just formed.

It is possible that forming a crossing introduces invalid connectivity in the mesh. For example, in FIG. 16, the whiskers of the chords beginning at faces 11 and 4 are adjacent on Sheet 1 and also on Sheet 4. It is shown infra V.D. Connectivity Resolution in Accordance with the Present Invention that this represents two mesh faces that share two edges. This is an example of invalid mesh connectivity, which can be resolved by joining the two chords. Because the dual representation of a chord is a column of hexes, in hex space, a chord join corresponds to seaming two faces together, which joins two columns of hexes so that the top faces coincide. A chord join always appears on two sheet diagrams, because chords are formed by the intersection of two sheets (or twice on one sheet diagram in the case of a self-intersecting chord).

Rule 2: Join chords whenever it is allowed.

Joining two chords removes four dangling whiskers from two sheet diagrams. Because this prevents the formation of any more hexes on those chords, chord joins tend to minimize the number of elements formed in a mesh. In most mesh generation techniques, the twin goals of small mesh size and good element shape compete. However, in this phase of the present invention, there is no geometric information, so element shape is not a consideration. Hence, the present invention simply attempts to add as few elements as possible by joining chords whenever possible. Again, the resolution of invalid connectivity in the mesh is discussed below.

Ideally, a self-intersecting chord is completed by joining it with some other self-intersecting chord on the same sheet. In practice, however, it is often the case that after some weaving, the two sheetchords for a self-intersecting chord are immediately adjacent to one another, which implies a certain type of degeneracy in the mesh that is detected and referred to as a "wedge" (discussed infra under Section V.D.4.). In order to make progress, the method of the present invention (temporarily) joins these two sheetchords and considers the chord completed, and the degeneracy is resolved in a further step.

Figure 17:
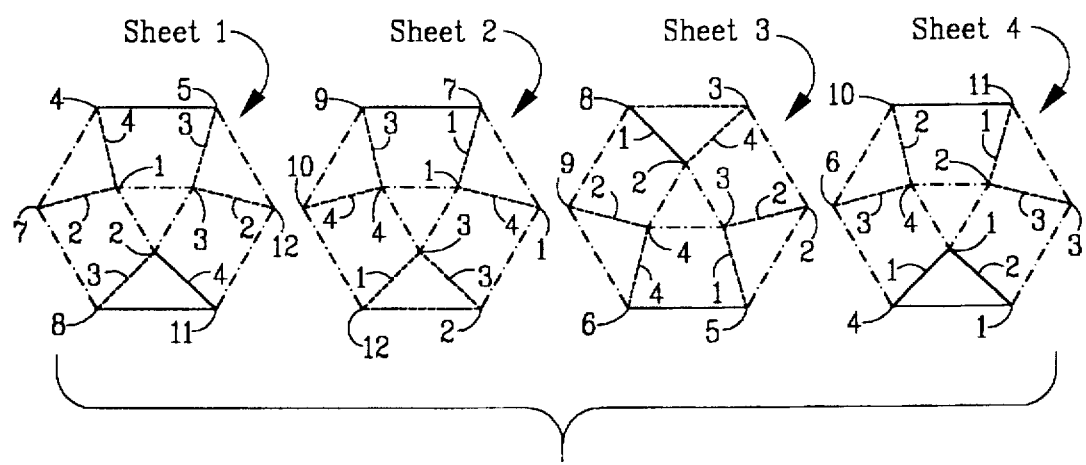
FIG. 17 illustrates the final whisker sheet diagrams for the small corner hex example, in accordance with the present invention.

By repeating Steps 2–4, the remaining parts of the small corner hex example can be meshed. The final whisker sheet diagrams for the small corner hex example are shown in FIG. 17. The completion of the weave is indicated by the absence of any dangling whiskers. A completed weave represents the entire connectivity of the all-hexahedral mesh. Note that the primal construction technique presented later does not yield any information about the geometric position of hex elements and does not determine actual element or node positions in the interior of the volume. However, given a valid connectivity, these positions can be determined in a relatively straightforward manner in a separate phase (referred to as the primal construction stage (node positions)).

C. Special STC Constructs

The following Section V.C. discusses special types of chords and sheets that arise when meshing more general geometries and surface meshes. These entities include blind chords, merged sheets, and self-intersecting loops, sheets, and chords.

1. Blind Chords

For the small corner hex example discussed supra in Section V.B.2., all whisker chords begin and end on the geometric surface. For some geometries and surface meshes, however, there are chords that never emerge on the geometric surface. These types of chords are referred to herein as "blind chords." An example of a geometry and surface mesh that contains blind chords is shown in FIG. 18 and referred to as the "macaroni" problem for obvious reasons. A natural place to start meshing this problem is to place a ring of elements around the end cap of the geometry. This ring of elements has a blind chord running through it that never emerges on the geometric surface.

A blind chord is formed when a hex is added that contains only two pre-existing faces. For example, forming a hex using faces marked a and b in FIG. 18 would form a blind chord. Because these two faces share one edge, there is one sheet common to them. The other two sheets of the hex are the other sheets of the two faces. The blind chord is an intersection of these non-shared sheets, and therefore its whiskers are included on those sheets.

Theoretically, there are only a few differences between a blind chord and the ordinary chord discussed earlier. Because a blind chord does not begin on a face of a loop, it may advance in two directions. To maintain consistency, a blind chord is represented in the present invention as two chords, each of which can advance independently. Blind chords, by definition, begin on opposite faces of the hex that caused their creation.

There are two methods in which a blind chord can be completed. It can join with itself, in which case it forms a closed curve completely inside the mesh. If the blind chord joins with an ordinary chord, it is appended to that chord and the blind chord is eliminated.

2. Merged Sheets

Recall that the first step in the present invention, after creating an STC construct, is to form loops on the surface mesh; for every loop, a unique whisker sheet is defined. In the final mesh for the small corner hex example presented supra in Section V.B.2., each sheet contained exactly one loop on the geometric surface. However, this is not always the case for more general three-dimensional meshes. In fact, whisker sheets can have two or more loops of faces on the surface mesh. For example, the macaroni problem shown in FIG. 18 contains two face loops c and d (shown with dotted lines) which are eventually merged into the same sheet. Merged sheets typically occur in annular and cylindrical solids.

At some point in the weaving process, merging two sheets together results in better-formed hexes. For example, FIG. 19 shows two hexes that share an edge 10. Two of the faces a and b containing that edge 10, one in each hex, are nearly co-planar, while the other two faces c and d (hidden from view) containing that edge 10 do not have common sheets (in FIG. 19, one face is part of sheet 2, while the other is part of sheet 10. Because the latter two faces c and d have uncommon sheets, they cannot be seamed together directly; however, if the uncommon sheets are merged into the same sheet, then the seam can take place. After this step is performed, the interior angles between the co-planar faces and the seamed face are, by definition, approximately 90 degrees, resulting in a well-formed hex.

The detection of two sheets that can be merged is based on the following criteria in hex space: (1) two hexes share an edge; (2) two of the faces containing the shared edge, one in each hex, are nearly co-planar (A pair of faces are considered co-planar if their dihedral angle is between 150 and 225 degrees.); and (3) two of the faces containing the shared edge, one in each hex, have uncommon sheets.

In STC space, two hexes share an edge if the two corresponding STC vertices are in the same 2-cell of a sheet diagram. However, angle data is only available for mesh faces on the geometric surface. Therefore, in the initial implementation, the sheet merge criteria based on STC data is limited to situations where the shared edge and two co-planar faces sharing that edge are on the geometric surface. FIG. 20 shows an example of this situation which occurs in the macaroni problem. Here, vertices 29 and 32 representing hexes 29 and 32 are located in the same 2-cell, which represents a shared mesh edge 10 (corresponding to FIG. 19), since they are adjacent on the sheet diagram. The vertices 29 and 32 representing these hexes are both directly connected to the loop by STC edges, indicating that they contain faces in hex space that are on the geometric boundary. The angle between these faces is not close to $\pi/2$, as indicated by the lack of a hash mark between the two STC edges in question. Because these faces are on the surface, their interior angle is available from the mesh data; in this case, it is in fact approximately 180 degrees, so the faces are nearly co-planar. The other two faces sharing the mesh edge 10 are indicated by the adjacent sheet chords 139-10 and 6-2 extending from hexes 29 and 32. Since these whiskers have different sheets (sheet 2 versus sheet 10), they cannot be joined directly. By the criteria listed above, sheets 2 and 10 can be merged and the two faces seamed. It is contemplated that relaxing the requirement that mesh faces be on the geometric boundary will be the object of future research on sheet merge detection in accordance with the present invention.

Figure 21:
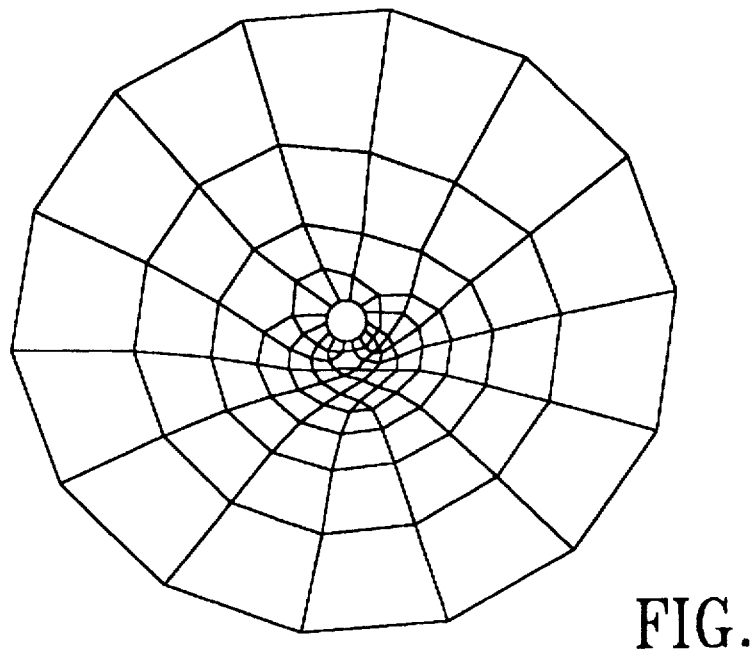
FIG. 21 illustrates the final sheet diagram for sheet 10 of the macaroni example, the merged sheet, in accordance with the present invention.

When one sheet is merged into another, the resulting sheet contains two separate face loops. These loops are joined in STC space by a single chord. This is represented graphically by drawing an inner and an outer loop, joined by the chord connecting them. Note that there is no topological distinction between the inner and outer face loops. An example showing the completed version of a merged sheet is shown in FIG. 21.

For certain geometries and surface meshes it is desirable to join more than two loops. For example, for a cylinder with a small cubical indentation (not on an endcap), it would be advantageous to join the two endcaps and the four-chord loop around the indentation. Indeed, arbitrarily many indentations could be added to the geometry, leading to arbitrarily many sheet merges. The case of a single sheet having three or more distinct face loops would be represented by more than one inner face loop.

After the sheet merge operation, the resulting sheet can be woven in the normal manner, since it retains an arrangement of whiskers that can be traversed as before. In hex space, the arrangement of adjacent whiskers corresponds to the advancing or meshing front.

3. Self-Intersections

Self-intersecting sheets and loops are a complication in the STC arising in surface meshes having significant numbers of irregular nodes (i.e., nodes with more or less than 4 edges connected to them), and makes it more difficult to completely weave the resulting sheets. However, even though these sheets are three-dimensional surfaces which self-intersect, they can be "layed out" and can be represented by two-dimensional sheet diagrams.

When a loop passes through a quadrilateral twice, crossing itself, it is referred to as a self-intersection. Self-intersections are quite common. For example, the macaroni problem shown in FIG. 18 has two loops (exemplarily, for sheets 1 and 3, shown in FIG. 61) that self-intersect a total of 20 times. Each self-intersection of a loop implies a self-intersecting chord, which implies that the sheet defined by the loop is also self-intersecting.

A chord formed by the self-intersection of a sheet has sheetchords appearing on the same sheet diagram. Since these sheetchords represent the same chord, the list of STC vertices appearing along them must be identical. Similarly, if two of the three sheets defining a vertex are the same, then that vertex appears twice on the self-intersecting sheet and once on the third sheet. If all three sheets are the same, then the vertex appears three times on the same sheet.

Self-crossing sheets are more difficult to weave than sheets that do not cross themselves. The field of Topology provides an existence proof that such sheets can be woven [See, generally, S. Smale, *Regular Curves on Riemannian Manifolds*, American Mathematical Society Transactions, Vol. 87 (1958).], but provides no guide as to the manner in which to proceed. The main theorem of S. Smale implies that as long as the sum of the number of self-intersections of a collection of loops is even, and the volume is topologically equivalent to a ball, it is theoretically possible to define a valid sheet with exactly those loops. The evenness restriction is not very strong. A consequence of Gauss's observations on closed curves is that the number of non-self-intersections for any collection of loops is even. Hence, the parity of self-intersections is the parity of all intersections. Euler's formula for the number of facets of various dimension in a cell complex implies that, regardless of self-intersections, there must be an even number of surface quadrilaterals in order for it to be possible to fill the volume with hexahedra. Hence the evenness restriction is also implied by Euler. Even simpler, the evenness restriction is also implied by the fact that a chord that enters the volume must leave it.

Therefore, in theory, any surface mesh of a topological ball, with an even number of quadrilaterals and self-intersections, can be filled with hexahedra. However, this topological theorem says nothing about how hexahedra share faces, only that the hexahedra have the proper number of sub-facets that are connected in at least the correct manner. For example, it is not known if every valid surface mesh admits a non-degenerate hexahedral mesh. Even if all such constraints are satisfied, it is unknown whether there exists a valid geometric embedding of the mesh where, for example, edges are straight and do not pierce faces.

D. Connectivity Resolution in Accordance with the Present Invention

Recall that all-hexahedral meshes are highly constrained in terms of the manner in which facets can connect to one another. A common advancing-front approach is to add a hexahedron that is of the desired general shape, but temporarily violates these constraints, and then make small, local changes to fix connectivity problems. For example, the technique known as Plastering™ generates pairs of mesh faces that share two edges. [M. B. Stephenson, S. A. Canann, Ted D. Blacker & R. J. Meyers, *Plastering Progress Report 1*, SAND89-2192, Sandia National Laboratories, Albuquerque, N. Mex., 1992.] This is then corrected by a seam operation, which merges the two faces into one face. Similar situations arise in Whisker Weaving™. The following discussion focuses upon the method used by the present invention for detecting and resolving invalid connectivity. Various strategies exist for resolving invalid mesh connectivity in Whisker Weavings™, depending on where the invalid connectivity occurs (e.g., on or below the meshing boundary). However, the detection of these invalidities can be based entirely on repeated STC edges, as described above, since they all contain one or more face pairs that share two edges. There are four general types of invalidities currently observed as a result of the method of the present invention, and their detection and resolution are summarized in the following Table 3.

TABLE 3

Four cases of invalid connectivity and their detection and resolution techniques.

| Type | Detection | Resolution |
|---|---|---|
| Seam | Repeated STC edge pair | Join two chords |
| Remove Hex Seam | Repeated STC edge pair, with one STC edge (one face) not on meshing front | Remove all hexes after embedded STC edge on that chord; seam with other chord |
| Knife/Wedge | Two STC edges representing same face adjacent | Join chord to itself; forms knife element in mesh |
| Repeated Repeated Hex | Two repeated STC edge pairs that share one STC edge, resolving one pair creates the other pair | Remove a hex which removes one pair or collapse a face to form a knife |

1. Repeated STC Edges And Mesh Invalidities

Before proceeding to the actual cases of connectivity issues arising in the method of the present invention, it is instructive to discuss the connectivity information available in the STC representation of a mesh. This information is used to detect cases of invalid connectivity.

Figure 22:
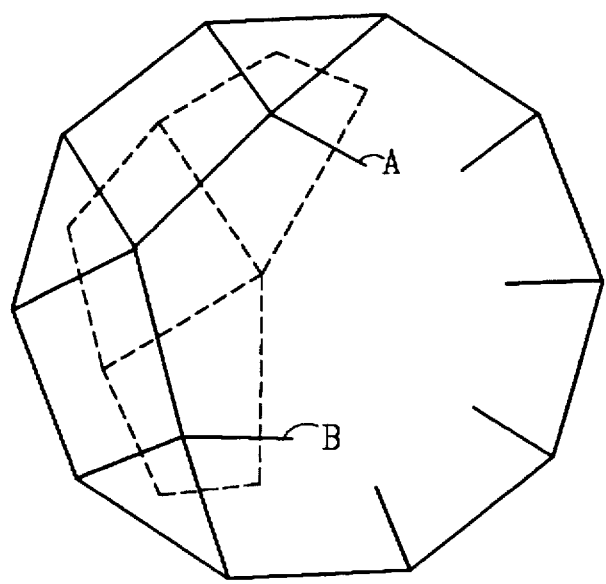
FIG. 22 is a top view of three hexes and some of the chords comprising those hexes.

An important procedure of the present invention is the traversal of consecutive STC edges on a whisker sheet. For example, this is the manner in which adjacent whiskers are found. Even before a sheet is completely woven, the STC contains valuable mesh connectivity information. To illustrate this, consider the following example. FIG. 22 shows a sheet diagram for sheet 6 with the top faces of three hexes superimposed with dotted lines. Whiskers A and B are on the current meshing boundary and bound a STC 2-cell. By duality, STC edges represent mesh faces and STC 2-cell represent mesh edges; it follows from FIG. 22 that all STC edges in the STC 2-cell between Whiskers A and B correspond to faces that share a common edge. It is also apparent that all STC vertices on that STC 2-cell represent hexes that also share the common edge. These facts are summarized in the following theorem:

Theorem 1: In a given STC 2-cell, all STC edges and STC vertices correspond to mesh faces and hexes, respectively, which share the corresponding mesh edge.

Consider now the two sheet diagrams of sheet 1 and sheet 4 shown in FIG. 16, for the small corner hex example in Section V.B.2. It was discussed earlier that this represents invalid connectivity which can be resolved by joining the two chords. The ends of the 4-4 and 11-4 sheetchords are part of the same STC 2-cell on Sheet 1, which means they share the edge represented by that 2-cell.

Figure 29A:
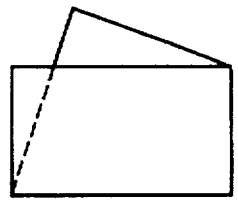
FIG. 29a and b illustrate the invalid connectivity case of two mesh faces sharing two edges.
Figure 29B:
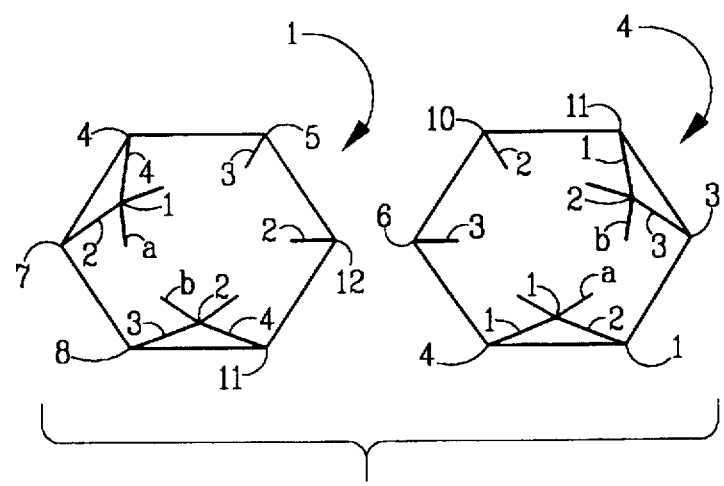
FIG. 29b is depicted in mesh space.

However, the same two chords (beginning at faces 4 and 11) are part of the same 2-cell on sheet 4, meaning that they share another edge represented by a different 2-cell. This signifies that the faces represented by the whiskers on the end of these two chords share two edges. The fact that both sheetchords for each of the chords are used implies that the two shared edges also share a node. Thus, this situation represents invalid connectivity, that of two faces sharing two edges (a simple example is shown in FIG. 29a). FIG. 16 also shows that hexes number 1 and 2 appear in the same 2-cell on sheets 1 and 4. Theorem 1 states that this represents two hexes which also share two edges. Since the two hexes are not directly connected by a STC edge, they do not share a face; this also indicates invalid connectivity.

The detection of mesh invalidities based on STC data relies on the detection of "repeated STC edges," which are defined as follows: When traversing adjacent 2-cell from two sheetchords representing the same chord, if a pair of hexes is part of two distinct 2-cell, and each is associated with a different sheetchord, then that pair of hexes shares two edges.

There will also be a pair of faces which shares two edges; one face is represented by the end of the chord from which traversal is starting, and the other STC edge is directly connected to the hex which is not on that sheetchord, downstream (i.e., "away") from the first STC edge. For example, in FIG. 16, if traversal starts from the Sheetchords 4-4 and 4-1 on Sheets 1 and 4, respectively. Hexes 1 and 2 are repeated on two distinct 2-cell. The repeated STC edges are those on the end of the 4-4 and 11-4 sheetchords on Sheet 1, and the Sheetchords 4-1 and 11-1 on Sheet 4. These two pairs STC edges represent a single pair of faces that share two edges.

There are various types of mesh invalidities formed as a natural part of the hex meshing process. In most cases, these invalidities must be detected and resolved before meshing can continue (two special cases of invalid connectivity are allowed to remain in the mesh at this time, those of a wedge/knife and doublet elements, which are discussed infra). Several of these cases are described below.

2. Simple Seam

The most common invalid connectivity problem arising in the method of the present invention is the case of two mesh faces that share two edges. One obvious solution is to "seam" the two faces into one face. In STC space, this corresponds to joining two chords together. For example, in FIG. 16, the chords beginning at faces 4 and 11 would be joined together into a single chord. Note that after one chord join is performed, the adjacent chords should also be checked for possible joins.

3. Removed Hex Seam

Theorem 1 and the discussion following Theorem 1 showed that two pairs of STC edges that appear in two distinct 2-cell represent two faces sharing two edges. In the previous simple seam example, the two pairs of STC edges were on the ends of chords and could be joined together directly. In mesh space, the two faces sharing two edges were both part of the meshing front. While this is the case often observed in the method of the present invention, there are times when in fact one of the invalid faces is not on the meshing front. This case is referred to as a "removed hex seam" case, and is named for the operation which must be performed to resolve the invalid connectivity.

Figure 23A:
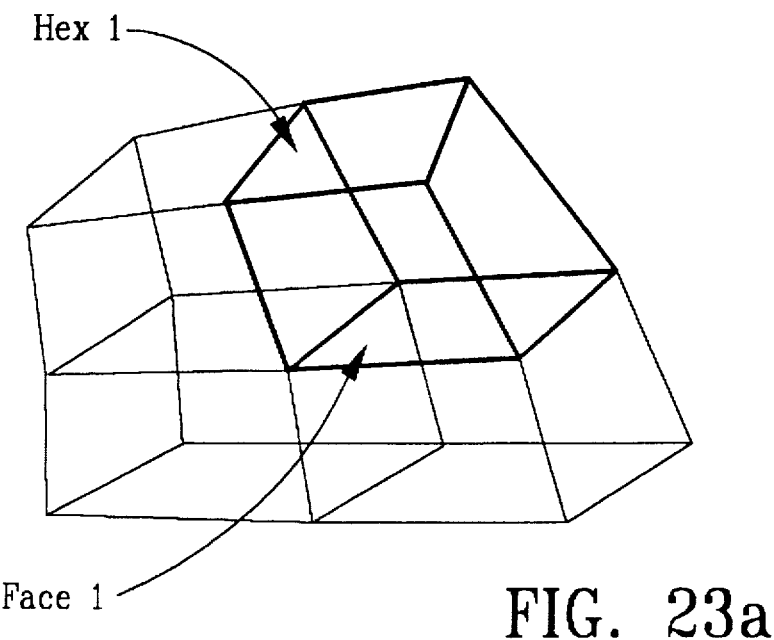
FIGS. 23a and b illustrate the formation of a removed hex seam case.
Figure 23B:
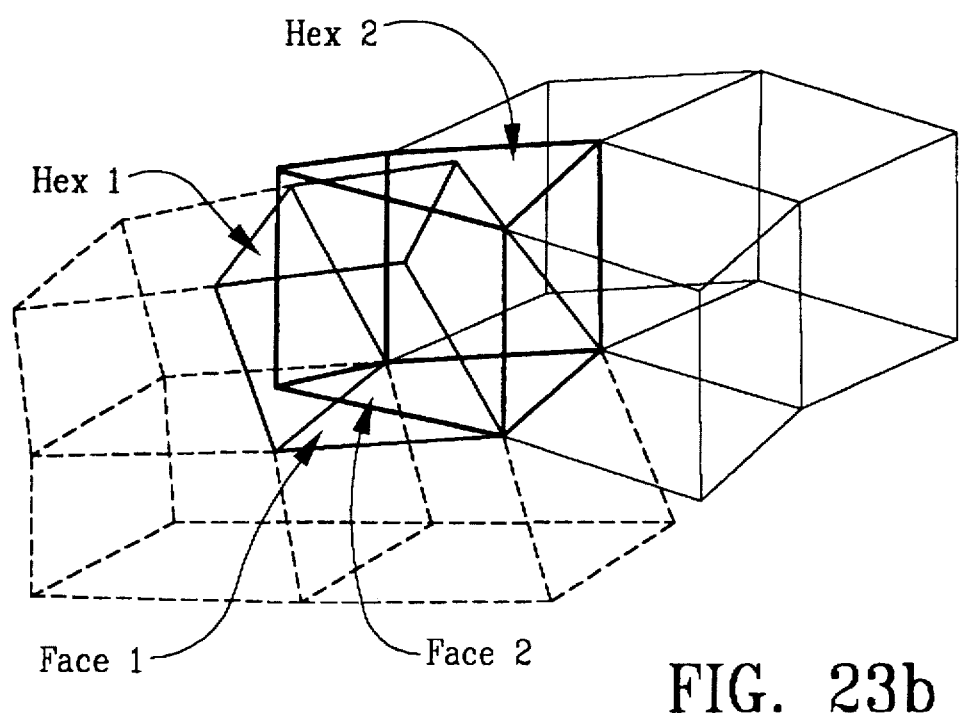
FIG. 23b illustrates the second hex formed, which results in two faces sharing two edges.

In a removed hex seam case, there is a crossing on both sides of one of the repeated STC edges; this is in contrast to the simple seam case, where both STC edges contained only one crossing. In hex space, this means that another hex has been put on top of one of the invalid faces. FIGS. 23a and 23b show an example in hex space of the manner in which Whisker Weaving™ creates the invalid connectivity resulting in a removed hex seam case. FIG. 23a shows the first hex after it is formed; FIG. 23b shows the second hex which, when formed, produces a face which shares two edges with Face 1. Before a seam can take place, the first hex must be removed. Thus, the removed hex seam case is so named because a hex must be removed before the seam can take place. In fact, it is possible that a situation could occur requiring more than one hex to be removed.

Figure 24A:
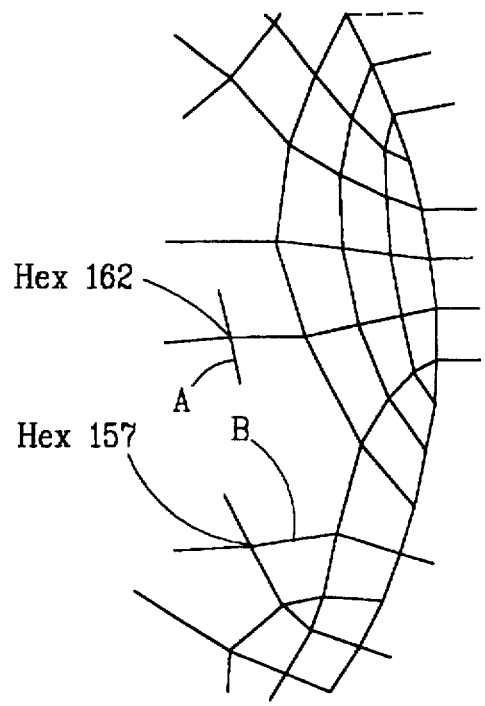
FIGS. 24a and 24b illustrate sheet diagrams showing a remove hex seam case for sheets 3 and 5 of the macaroni example.
Figure 24B:
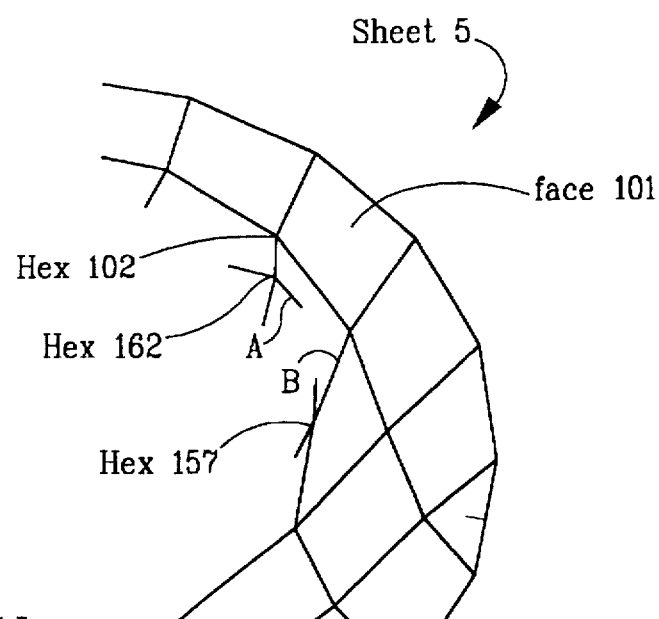

Referring to FIG. 24a, on Sheet 5, traversing from the lower blind whisker A through hex 162 and going clockwise. Hexes 162 and 96 fall on the same STC 2-cell. Referring now to FIG. 24b, on the other sheet (Sheet 3), traversing from the same blind chord A and going clockwise, hexes 162 and 96 again fall on the same STC 2-cell (the 2-cell that is clockwise from whisker A). Because hexes 96 and 162 are not directly connected, they include two distinct faces that share two edges. The chords that must be joined (representing a face seam) are the blind chord beginning at hex 162 and the chord beginning at face 101. The joining cannot be accomplished, however, until hex 157 is removed.

Another way of deducing that there is invalid connectivity in the mesh represented in FIG. 24a is to remove hex 157. That leaves two chords beginning at face 101 and beginning at hex 162 that are adjacent on two sheets 5 and 3, which indicates invalid connectivity (two faces sharing two edges). In any valid mesh, it should not be possible to remove a hex and uncover invalid connectivity.

The operation that introduces the invalid connectivity in FIG. 24a is not the construction of hex 157, but that of hex 162. It is instructive to investigate the reason hex 162 was formed in the first place. In FIGS. 23a and 24a, hex 157 corresponds to Hex 1; in FIGS. 23b and 24b, hex 162 corresponds to Hex 2. The formation of hex 162 is motivated by Sheet 1, since it contains the two "regular" (i.e., non-blind) chords of that hex (in the current implementation, blind chords are never crossed with other chords; new blind chords are created and then joined with eligible neighboring chords, which may be blind themselves). In the formation of hex 162 (Hex 2 in FIG. 23b), Face 2 shares two edges with Face 1. Sheet 1 alone has no information showing that hex 162 produces an invalid face. After the removal of hex 157, the chord beginning at face 101 in FIG. 26a can be joined with the neighboring blind chord, resulting in less dangling whiskers on Sheet 3 and 5 as shown in FIG. 24b.

4. "Broken Chord" Removed Hex Seam

Recall that a removed hex seam operation requires that a hex be removed from the end of one chord before a seaming operation can be performed; this removal is necessary because one of the repeated STC edges, or one of the invalid mesh faces, does not lie on the meshing front. Removing the covering hex puts the invalid face on the meshing front. In some cases, the covering hex cannot be simply removed, because it contains a chord which has been completed. Most often, the completed chord goes through the invalid face which is covered. In order to put the invalid face on the meshing front, a completed chord must be broken. After this operation is done, a simple seam operation can take place.

After a broken chord remove hex seam operation, there remains a whisker, or dangling STC edge, which was formerly joined as part of the completed chord. In some cases, this STC edge is part of another repeated STC edge pair, and the other STC edge in that pair is the one just seamed. This will cause the chord just completed as part of the seam to be broken, and after the next seam is done, the original chord (existing before the original broken chord removed hex seam operation) remains, along with the original repeated STC edge pair. This will cause an oscillation between the two invalid states, which if allowed to continue, will result in an infinite loop in the implementation of the method of the present invention. This situation is referred to herein as a "repeated repeated hex," whereas "repeated hexes" are used to detect repeated STC edges.

To prevent a repeated repeated hex situation from happening, a limit is placed on the number of times a particular repeated hex can be used to motivate a broken chord removed hex seam in one call to the connectivity resolution function. After the limit is reached (in an exemplary embodiment, the limit is four times), the sheetchords motivating the detection of the repeated hex are removed from the check list, one of the repeated hexes is removed and checking is continued for any remaining sheetchords.

In review, the repeated repeated hex case appears as two pairs of repeated STC edges, where the pairs share an STC edge. Joining two of the STC edges resolves one pair, but the resolution of the other pair requires breaking the chord just joined and joining one of the pieces with the third STC edge. This arrangement in hex space, shown in FIGS. 25a, b, and c, corresponds to two faces which share two edges, with one face (face abcd) on the meshing front and one face (face abcd) not on the front. This case is distinct from the removed hex seam case in that the chord going through face abcd is completed.

Figure 26:
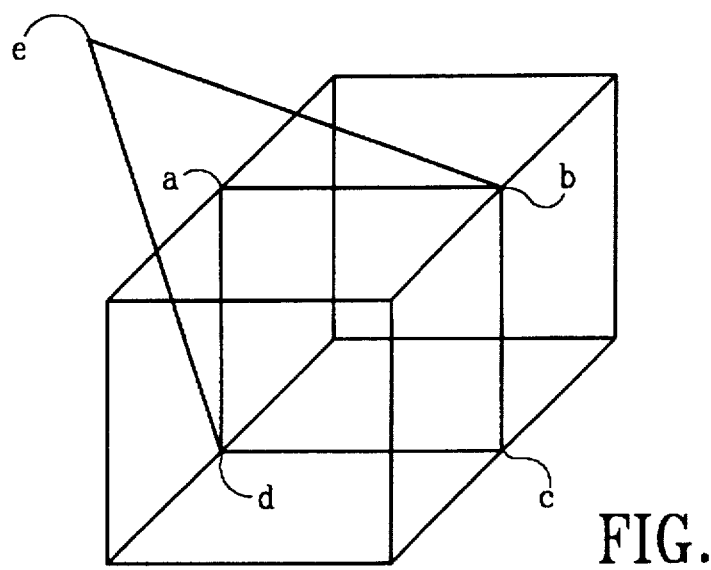
FIG. 26 illustrates a repeated repeated hex case in hex space.

Rather than removing one of the hexes, this problem can be resolved by closing the face on the meshing front by joining nodes a and e of face abcd in FIG. 26. Since this face is part of a hex element on one side, this hex element becomes a knife element. Also, in general, the two sheets passing through this face are not the same. Since knife elements must by definition contain self-intersecting sheets, this results in the merging of the two sheets passing through the collapsed face. Following the merge operation, the merged sheet has two face loops, which are represented as inner and outer loops on the sheet diagram. In the case of a repeated repeated hex case motivating the sheet merge, the only chord joining the inner and outer loops after the merge is the chord which terminates in a knife element.

Figure 25A:
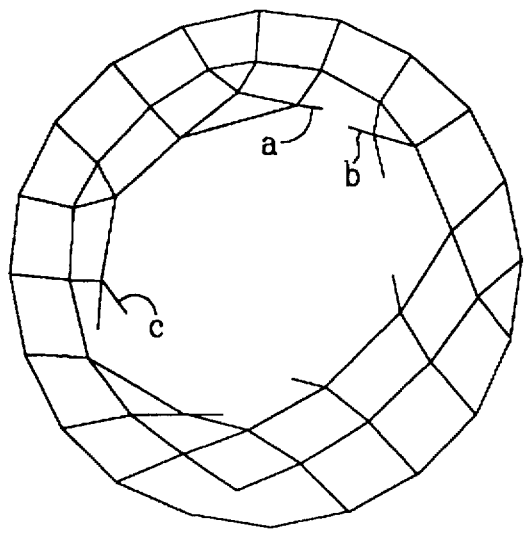
FIGS. 25a–c illustrate an example of repeated repeated hex case and resolution by collapsing a face.
Figure 25B:
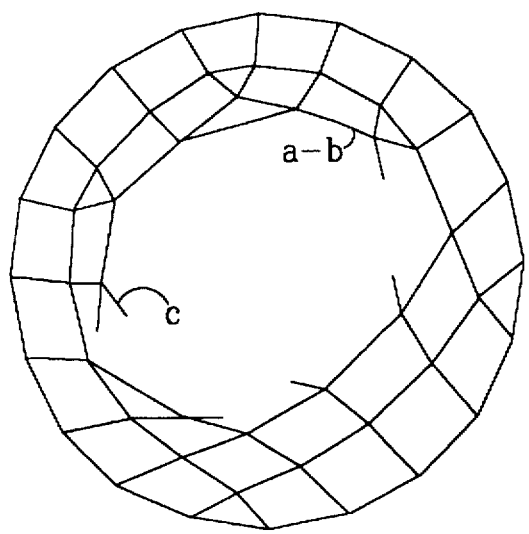
Figure 25C:
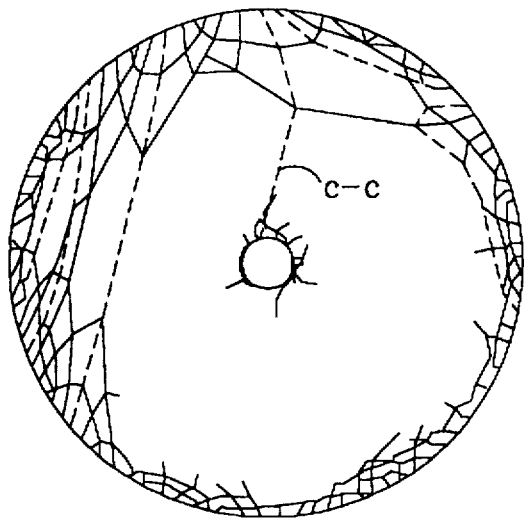

An example of a repeated repeated hex case, before and after resolution by collapsing a face, is shown in FIG. 25a–c. Note that the knife element formed is represented in FIG. 25c by the chord joining the inner and outer loops on the sheet diagram (labeled c-c). This example, from the macaroni problem (discussed infra), is subsequently closed by Whisker Weaving™. The resulting mesh contains more knife elements and fewer doublets than were produced with the old resolution technique for the repeated repeated hex case. This technique for resolving repeated repeated hex cases will be investigated in greater detail to ascertain whether there are real benefits to performing this operation.

The repeated STC edge detection approach is used to detect all invalidities in the method of the present invention, including simple seams. The pseudo code for the detection and resolution of invalid connectivity is preferably as follows:

For each sheetchord with a repeated STC edge:
    If simple seam, join chords
    Else if any hexes can be removed up to repeated STC edge, remove, and
        If a repeated repeated hex, remove all instances of sheetchord from join check list
        Else put sheetchord on join check list
    Else remove one of the repeated hexes and put sheetchord on join check list or, alternatively, For each sheetchord on a sheetchord list:
    If a simple join can be performed, perform it
    Else if embedded repeated STC edge,
        Remove hexes after repeated STC edge on the associated chord
        If repeated repeated hex case, resolve by collapsing a face
        Else append this sheetchord to the sheetchord list
    Else remove one repeated STC edge by removing a hex 5. Primal Construction Technique The output of the method and apparatus of the present invention is a specification of all-hexahedral mesh connectivity in the form of STC data. In particular, connectivity information for hex elements, mesh faces and mesh edges is provided (the dual counterparts to these entities are constructed in the STC data as part of the present invention). However, the nodal connectivity is not represented directly in the STC data. This information must be extracted from the STC data before the mesh primal, consisting of nodes and hex elements, can be constructed.

The primal construction technique is based on gathering all the edges and hexes that include a node and then allocating that node. A rough description of the technique is provided in this section. The double fold example in FIGS. 27 and 28 (and discussed infra under Section V.F.1. Non-limiting Examples) will be used to illustrate the steps of the technique. In the example, 2-cell are identified by a sequence of STC vertex identifiers. For example, the "h1-f6-f5-h2" 2-cell on sheet 1 denotes the 2-cell bounded by hex 1, face 6, face 5, and hex 2 (see Sheet 1 of FIG. 28 corresponding to Sheet 1 of FIG. 30a).

Step 1. Construct all the whisker cells.

In STC data, the STC 2-cell are unique; that is, they provide a one-to-one matching between STC entities (STC 2-cell) and mesh entities (mesh edges). This is in contrast to three STC vertices representing a hex, and to two STC edges representing a face. Since the 2-cells are not constructed explicitly during Whisker Weaving™, they must be constructed here. During this step each hex is given a list of 2-cell on which it appears (which corresponds to the 12 edges contained by that hex).

Step 2. Choose a first 2-cell (cell A).

Cell A corresponds to a mesh edge which has not yet been "wrapped" (i.e., it has a node whose connectivity has not yet been determined). For example, in FIG. 30a (corresponding to Sheet 1 in FIG. 28), the h1-h2-h3-h4 2-cell is chosen and denoted as reference A.

Step 3. Find a second cell (cell B) which shares a node with the cell A.

The 2-cell A and B correspond to two mesh edges which share a node. In FIG. 30b (corresponding to Sheet 5 in FIG. 28), Cell B is found by choosing a hex in the first cell, choosing one of the mesh faces (STC edges) coming from that hex on that cell, and choosing one of the two other cells containing the other STC edge corresponding to that face.

Figure 30A:
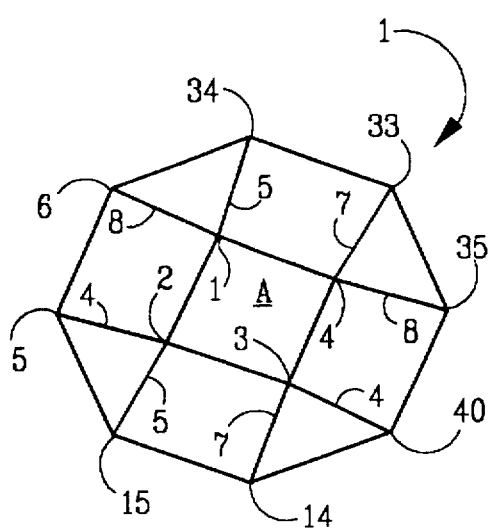
FIGS. 30a and b illustrate a second STC edge representing face h1–f6.
Figure 30B:
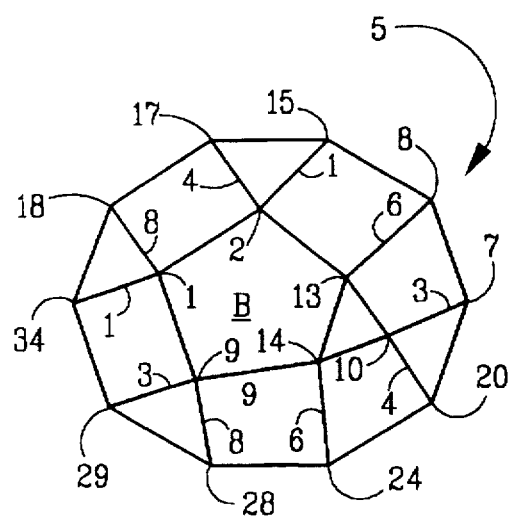

For example, in Sheet 1 of FIG. 30a, the first hex chosen in the 2-cell A is hex 1, represented by vertex h1a. One of the STC edges in that cell is chosen arbitrarily, say the h1-h2 edge (using a similar specification to the 2-cell specification). This STC edge represents a mesh face, which is represented by exactly one other STC edge on another sheet. The other STC edge is found using the whisker cell list that is kept for each whisker hex; this edge must not contain point h1a but must contain vertices corresponding to hexes 1 and 2. FIG. 30b show the other STC edge (h1-h2), which is on sheet 5.

The second 2-cell is chosen from one of the two on either side of the second STC edge. In mesh space, choosing a second 2-cell corresponds to finding a second edge that is part of a given face and that shares a node with the first mesh edge chosen. The choice between 2 2-cell corresponds to choosing one of two opposite edges on a face which shares a node with one of the other edges on that face. In this example, the h1-h9-h14-h13-h2 2-cell is chosen (see FIG. 30b).

Cells A and B now define a node that has not yet been allocated, unless that node lies on the surface (more on that later). The cells are put on a new list of whisker cells. This list is used in the next step to keep track of all 2-cell (mesh edges) sharing the node being wrapped.

Step 4. Wrap the node.

A node is "wrapped" by finding all the mesh edges and hexes which contain that node. This is done using a "gift-wrapping" technique, where a traversal from hex to hex is performed, picking up all hexes and edges sharing that node along the way.

The starting point for the wrapping operation is three whisker cells (mesh edges) and at least one hex, all of which contain the wrapped node. Given two edges which share a node in an all-hex mesh, this defines a face. If that face is on the interior (i.e., if one or two of the edges is interior), there are exactly two hexes which share that face, otherwise one hex contains that face. These hexes can be derived from the data produced by Whisker Weaving™ in a straightforward manner. By testing all combinations of edge pairs, adding new edges to the end of the list as they are found, all the hexes and edges around a given node can be found.

Figure 31:
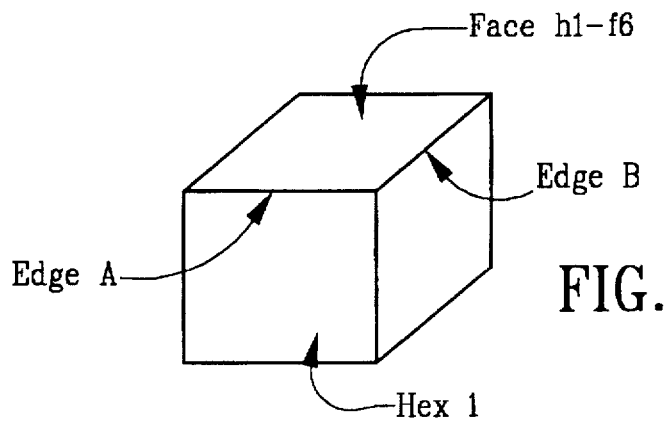
FIG. 31 illustrates mesh space entities represented by 2-cells A and B, hex 1 and face h1–f6.
Figure 32:
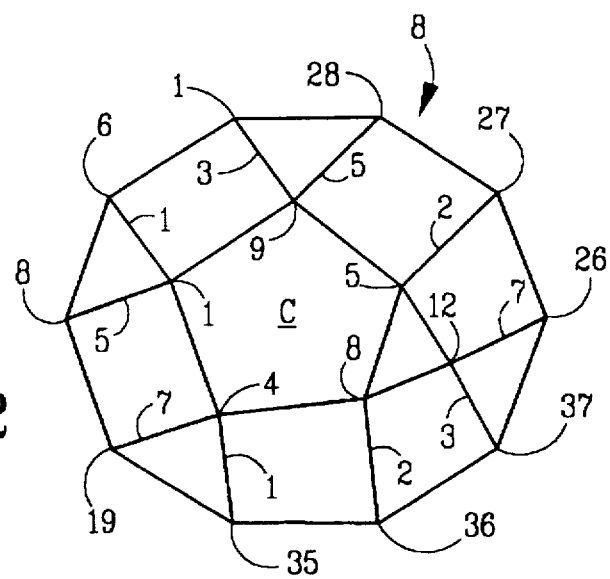
FIG. 32 illustrates a sheet 8 containing third cell (cell C).

In our example, there are two 2-cell (A and B) on the list. Given these two 2-cell, a third 2-cell can be found which shares the shared node. This is done in the following manner. A hex common to both 2-cell is found; in this case, 2-cell A and B share hex 1. A common face (that is, a pair of STC edges representing the same face) can also be found using the procedure described in step 3. In this example, the h1-h2 face is chosen. The information now comprises a hex element, and a face and two edges in that element. The two edges share a node, which is contained in that face and hex. This is depicted in mesh space in FIG. 31. The third 2-cell corresponds to the third edge in the chosen hex which shares the node being wrapped. FIG. 31 shows that that third edge is shared by two faces, each of which shares an edge (edge A or edge B) with face h1-h2. The two faces are represented in STC space by the STC edges connected to hex 1 on cells A and B on the other side of edge h1-h2. So, from FIGS. 30a and 30b, the two faces are h1-h4 on cell A and h1-h9 on cell B, respectively. Since these faces share an edge, they should be part of the same 2-cell somewhere else. Because this third edge is orthogonal to the other two (in a hex principal direction sense), the third 2-cell contains the third STC vertex representing hex 1. The third STC vertex for hex 1 occurs on sheet 8, shown in FIG. 32. There are four STC 2-cell which contain hex 1; the third cell must contain faces h1-h4 and h1-h9. Thus, the third 2-cell is the h1-h4-h8-h5-h9 2-cell. If this third 2-cell does not yet appear on the list of 2-cell, it is added at this time.

Figure 33:
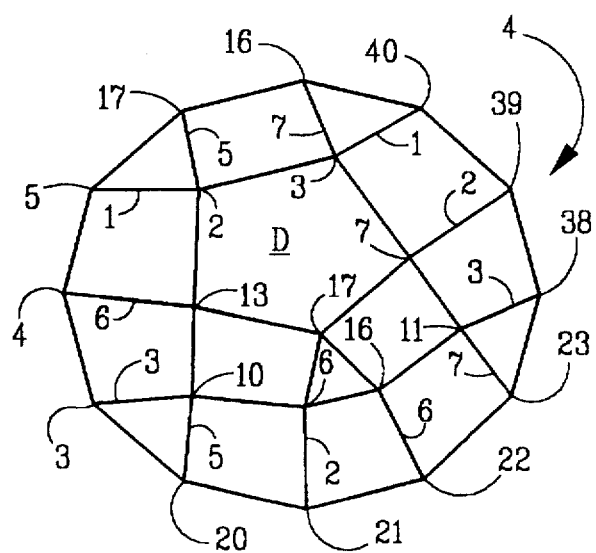
FIG. 33 illustrates a sheet 4 containing fourth cell (cell D).

If the common face is in the interior of the mesh, there is a second hex that shares that face. That hex is represented by the other hex on the chosen STC edge. In our example, the hex opposite hex 1 that shares face h1-h2 is obviously hex 2. Using the same procedure described in the previous paragraphs, a third 2-cell (edge) is found which shares a node with edges represented by 2-cell A and B and which is contained in hex 2. The reader can verify that this 2-cell is cell h2-h13-h17-h7-h3 (cell D) shown in FIG. 33. If this 2-cell is not yet on the list of 2-cell, it is added. Also, if hex 2 is not on the hex list, it is added.

In review, given two STC 2-cell (mesh edges), a common STC edge (face) can be found, and at least one common STC vertex (hex), or two hexes if the face is on the interior, can be found. From the two hexes and the two edges, two additional edges can be found which share the node being wrapped.

To find all the edges and hexes sharing a given node, all permutations of 2-cell (edge) pairs on the list are tested. This is guaranteed to find all the hexes and edges sharing a node, because in a non-degenerate hexahedral mesh, you can traverse between any two hexes that share a node by traveling through faces which also share that node.

Step 5. Allocate and distribute the node.

The cell list and hex list now contain all the edges and hexes which share a node, respectively. If any of the edges lies on the surface (i.e., both of its nodes are defined), the node in question has already been allocated. (An interior edge can have both of its nodes defined too, but since this technique finds all instances of edges connected to an interior node, one would not get this edge after all of its interior nodes were defined.) If not, allocate a node. Put the node on all the connected edges, and add the node to each hex's node list. If the node was allocated, compute the position based on the connected whisker hex's physical position (acceptable if that position has not yet been computed—the result will just be the origin).

Step 6. Repeat steps 3–5 for the first cell so that both nodes for the edge are defined.

Step 7. Repeat steps 2–6 for all cells.

After this is done, all nodes have been allocated and defined.

Step 8. Compute whisker hex node ordering.

Figure 34:
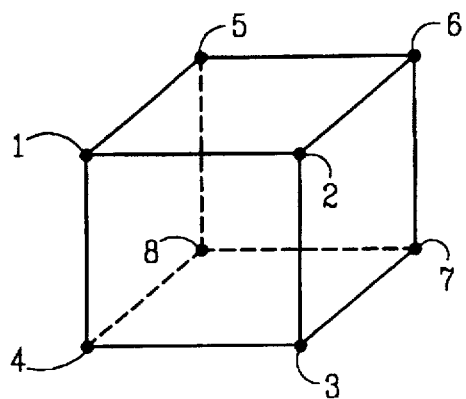
FIG. 34 illustrates hexahedral element node ordering (available through Exodus program).

The node ordering in a hexahedral element is significant since it is used to compute the Jacobian and other metrics for the element. The ordering of nodes is specified by the EXODUS™ database standard [See Larry A. Schoof & Victor R. Yarberry, *EXODUS II: A Finite Element Data Model*, SAND92-2137, Sandia National Laboratories, Albuquerque, N. Mex. (September 1994); Gregory D. Sjaardema, *NUMBERS: A Collection of Utilities for Pre-and Post-processing Two-and Three-Dimensional EXODUS Finite Element Models*, SAND88-0737, Sandia National Laboratories, Albuquerque, N. Mex. (March 1989).], and is shown in FIG. 34. Node ordering is computed by finding four nodes which form a face and the other four nodes connected to the first four nodes and that are not on the face. These nodes are then ordered according to the Exodus specification. These nodes are passed in to the constructor for a NodeHex, a class inside CUBIT™ [See Ted D. Blacker et al., *CUBIT Mesh Generation Environment, Volume 1: User's Manual*, SAND94-1100, Sandia National Laboratories, Albuquerque, N. Mex. (May 1994).], which represents hexahedral elements consisting only of nodes.

Step 9. Smooth the mesh.

The smoothing scheme selected for the volume being meshed is used. Empirical evidence shows that a length-weighted Laplacian smoothing scheme tends to work best, although this has received limited testing.

Note that this step computes the physical positions of the nodes. In most cases, when the interior nodes were allocated, they were positioned at the origin. This initial position may be changed in the future to ensure that initially the nodes are inside the volume being meshed (this position should be available from the solid modeler). This method places demands on the smoothing techniques available, but one could argue that these techniques must be robust anyway.

Step 10. Check the hexes for inversion.

The connectivity inside a hex element can be inverted such that the hex has negative volume, according to the Exodus definition of a hex. For example, in FIG. 34, nodes 1 and 3 can be exchanged and the same can be done with nodes 5 and 7. The resulting hex element is identical to the valid hex in terms of connectivity, but will have a negative volume as computed by an analysis code. The node ordering for each hex is currently inferred by tracing chords in from the surface mesh, under the assumption that the surface mesh face ordering is correct.

Step 11. Check the resulting mesh for incomplete edges (edges with less than two nodes defined).

6. Knife Formation

Figure 35:
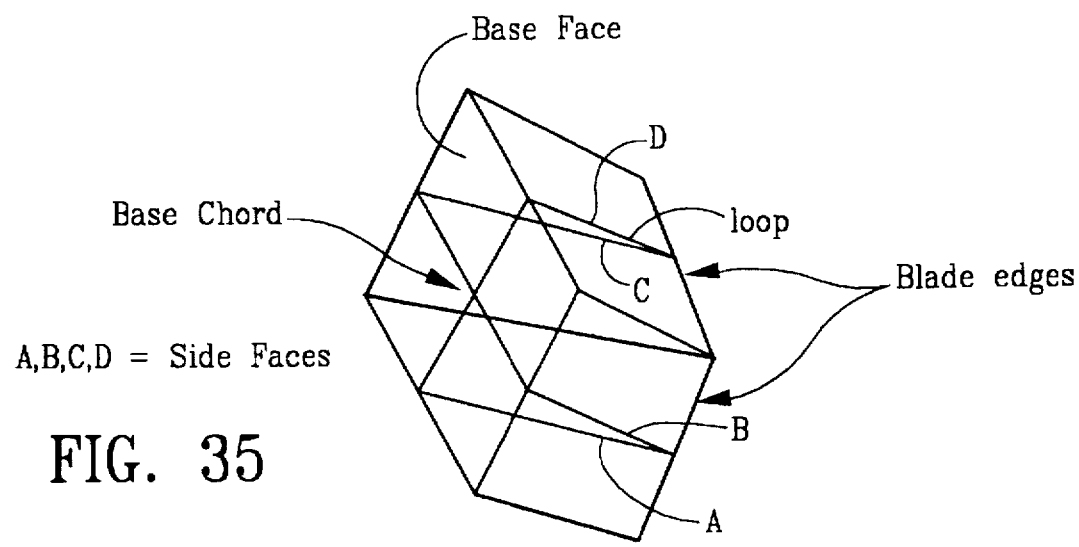
FIG. 35 illustrates a wedge formed by a hexahedron, with the base chord of the wedge shown as self-intersecting, as indicated by the loop drawn over the quadrilateral faces.
Figures 35A, 35B:
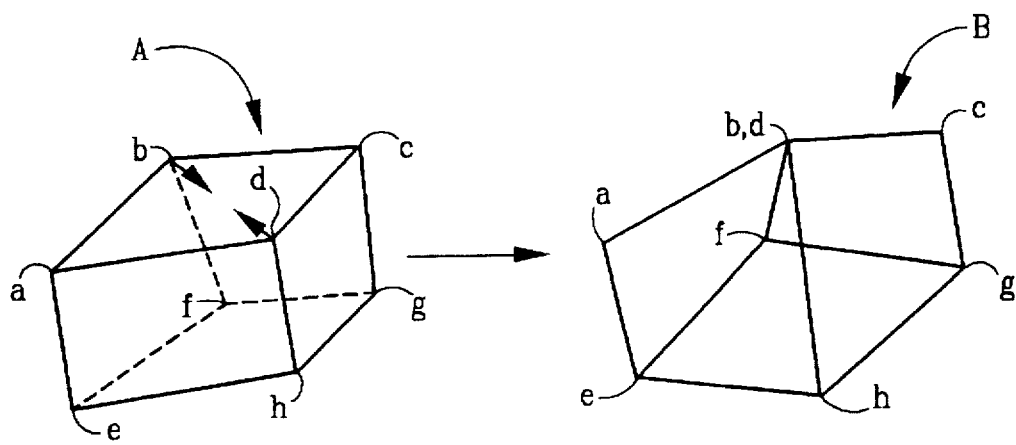
FIG. 35a illustrates a hexahedron before a wedge element is formed.
FIG. 35b illustrates a hexahedron after a wedge element B is formed by collapsing a face abcd.

A knife is a hex-space object that was first introduced in connection with Plastering™ [M. B. Stephenson, S. A. Canann, Ted D. Blacker & R. J. Meyers, *Plastering Progress Report 1*, SAND89-2192, Sandia National Laboratories, Albuquerque, N. Mex., 1992.]. It has the connectivity of a hexahedron that has had one collapsed face abcd as a result of joining two opposite vertices b and d as shown in FIG. 35a. The face efgh opposite the collapsed face abcd is referred to as the base face of the knife B (shown in FIG. 35b), and the other four faces abfe, abhe, cdhg, and cbfg are referred to as side faces. The collapsed face's remaining pair of edges is referred to as the blade of the knife B.

In STC space, the chord going through the base face is referred to as the base chord. An important property of knives is that the base chord is formed by a self-intersecting sheet; this can be shown by drawing the loops on the surface of a knife as if it were the entire geometry (see FIG. 35). This sheet is referred to as the base sheet; the other sheet through the side faces is referred to as the side sheet.

A knife is indicated in STC space by a self-intersecting chord whose two sheetchords are adjacent and, therefore, are part of the same STC 2-cell. The implication of this, by Theorem 1, is that the face represented by the end of the base chord shares two edges with itself. In other words, two of the edges on that face have been merged into one edge. If these sheetchords are the only two whiskers remaining on a sheet, they have two 2-cell in common, one on either side. In either case, there is a hex element which has had one of its faces collapsed; this element, which is the knife element, is represented by the last STC vertex on the base chord.

The detection of the formation of a knife is based simply on two sheetchords of a self-intersecting chord being adjacent. If this situation occurs, the two sheetchords are joined together in STC space and the knife is left in place. This join operation is not the same as a normal chord join, as the self-intersecting (base) chord propagates into the volume but never comes out; rather, it terminates inside the knife element. After the two sheetchords are joined together, the whisker sheet diagram appears like a normal sheet, and weaving on that sheet can continue. This is true because although a hex element is degenerate, it is composed entirely of quadrilaterals, and meshing can continue as before.

Figure 36:
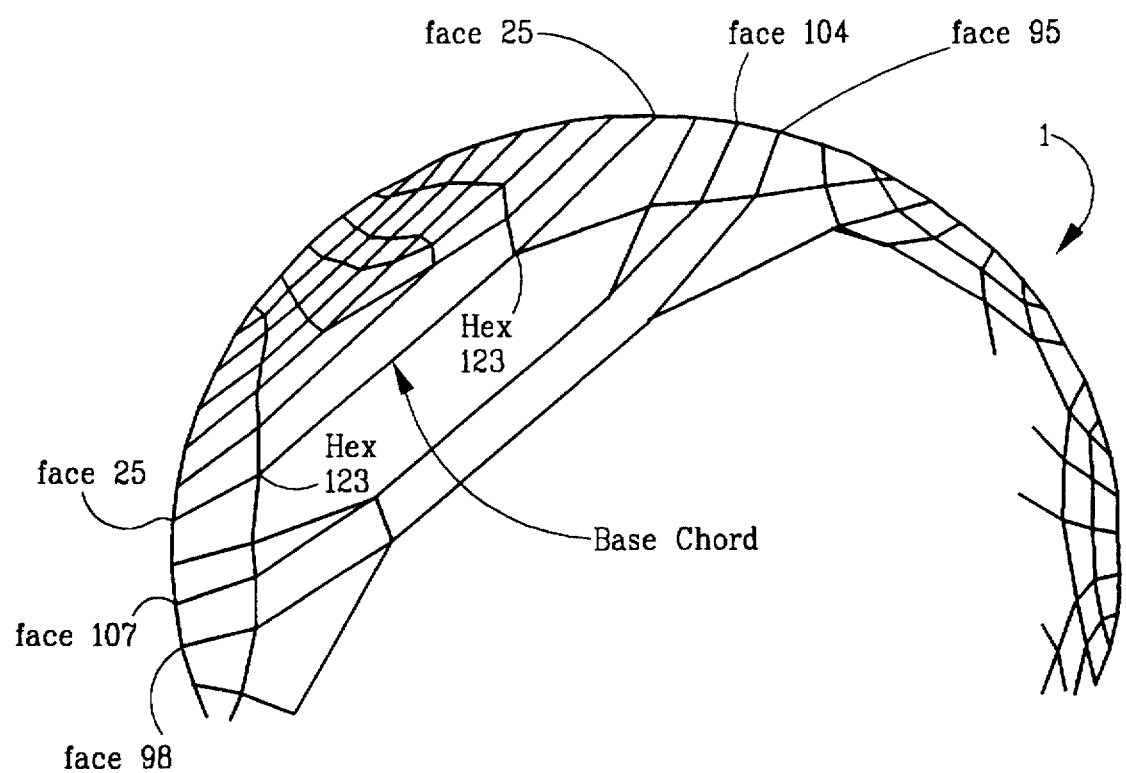
FIG. 36 illustrates a wedge formed in sheet 1 of the macaroni example during the method of the present invention, indicated by the joining of two whiskers beginning at face 25.

An example of a knife that has been formed during Whisker Weaving™ is hex number 123 in the sheet diagram in FIG. 36. The base chord for this knife begins at face 25; this chord beginning at face 25 (shown in two instances) terminates within the solid, as indicated by the identical beginning face numbers on both intersections with the outer loop. The knife element shown in FIG. 35 as hex 123 (in two instances) contains two pairs of faces which share two edges. Although not shown here, this situation is indicated, as expected, by the existence of repeated STC edges on the base and side sheets.

FIG. 36 shows that two chord joins have occurred after the formation of the knife represented by hex 123—joining the chords that begin at faces 104 and 107 and faces 95 and 98. This demonstrates the manner in which the method of the present invention is able to proceed, deferring the knife resolution to a separate phase, after all sheets are completely woven. Waiting until the STC is completely woven can also result in better knife resolution, since more information is available.

The mesh resulting from the method of the present invention described above can contain invalid elements referred to as knives, but is otherwise valid. Methods for resolving knives in an all-hex mesh have been developed and implemented in the present invention. The resolution comprises methods for driving or pulling knives based only on data produced by the method of the present invention and is described immediately following this paragraph. The important thing to realize is that resolving knives in an otherwise valid all-hex mesh is straightforward from a theoretical point of view. Therefore, the resolution of knives appearing in a closed mesh connectivity derived by the method of the present invention is not a serious issue in deriving a completely valid mesh connectivity.

a. Knife Resolution

Figure 37:
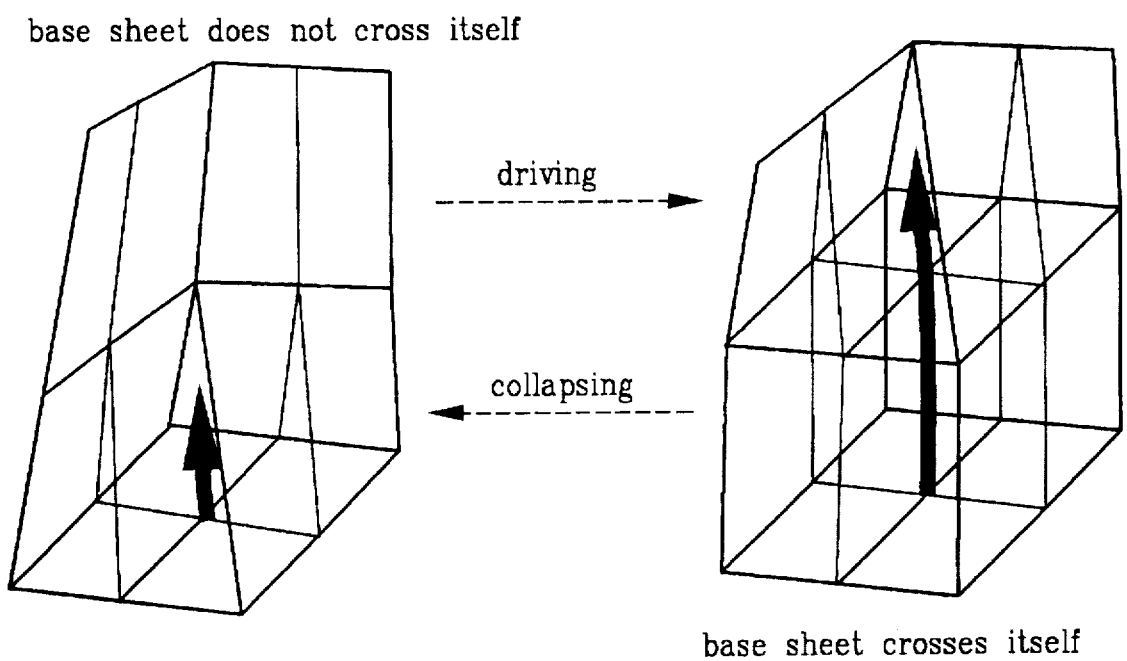
FIG. 37 illustrates the process of collapsing/driving a wedge. (Faded lines show how the base sheet intersects the mesh. The chord in the center is the base chord, with the singularity at the arrow tip.)

The method of the present invention resolves knives in a separate pass, after the mesh is otherwise completely woven. A knife can be "moved" by one of two operations, either collapsing or driving. [Ted D. Blacker and R. J. Meyers, *Seams and Wedges in Plastering: A 3-D Hexahedral Mesh Generation Algorithm*, Engineering with Computers, 9:83–93 (1993).] Moving a knife destroys it, and generally, causes a new one to be created next to it. Either collapsing or driving must be repeated until the geometric boundary is reached, where no new knife is formed, and the knife is said to be resolved. In very rare circumstances, it is also possible to resolve a knife by driving it into the blade edges of another knife. Collapsing moves the knife backwards by collapsing the base face. Driving moves the knife forward by opening the blade edges into a new face. FIG. 37 shows how a knife moves as it is collapsed or driven. Note that there is often some flexibility about which direction a knife can be driven, but a collapsed knife must follow its base chord.

When successful, driving tends to produce elements that are better shaped than collapsing. However, a knife can only be driven in a fairly regular mesh; there must be two faces that share an edge, each of which contains one of the blade edges. Collapsing, and then fixing up the poor elements, promises to be much more robust.

A pre-processing step to resolve a knife is to "unjoin" the base sheetchords.

1. Collapsing a Knife

Figure 38:
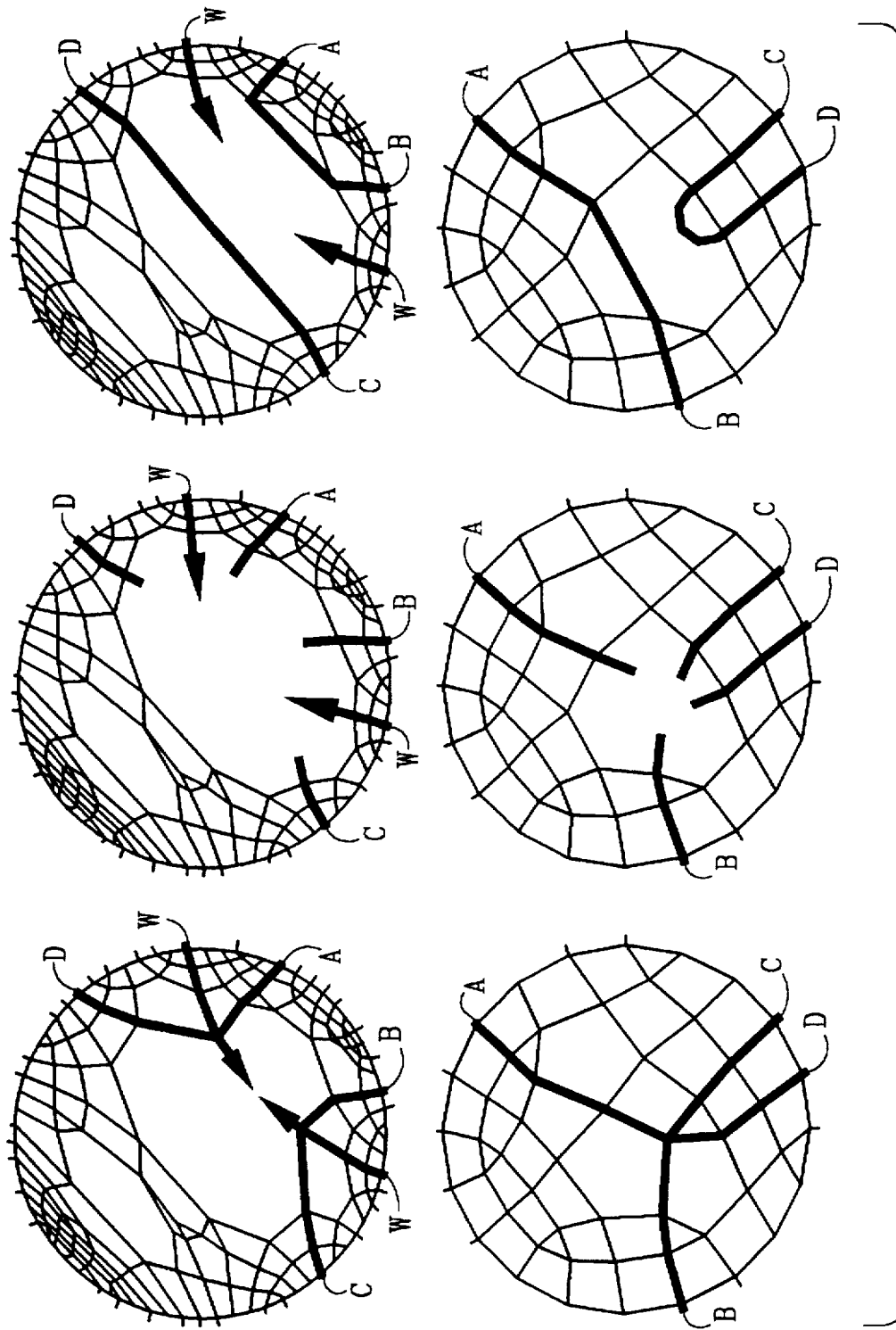
FIG. 38 illustrates the process of collapsing a wedge. The left figure shows the base sheet (top) and side sheet (bottom) of the wedge before collapsing: Chords A–D, B–C, and W cross at the wedge. The center figure shows the breaking of chords by the removal of the wedge centroid vertices from the base sheet (top) and side sheet (bottom): Two whisker are left for each of A, B, C, D, and W. The left figure shows the new way of joining side chords as the side faces are merged: A is joined with B, and C is joined with D. Note A–B and C–D do not cross.

To collapse a knife in the STC:

(1) The three vertices representing the knife are removed from the base sheet and side sheet diagrams; see FIG. 38 (center).

(2) The side chords are rejoined in a new way as the base face is collapsed and the side faces are merged; see FIG. 38 (left).

FIG. 38 illustrates the process of collapsing a knife. FIG. 38 (left) shows the base sheet (top) and side sheet (bottom) of the knife before collapsing: Chords A-D, B-C, and W cross at the knife. FIG. 38 (center) shows the breaking of chords by the removal of the knife centroid vertices from the base sheet (top) and side sheet (bottom). Two whisker are left for each of A, B, C, D, and W. FIG. 38 (left) shows the new way of joining side chords as the side faces are merged: A is joined with B, and C is joined with D. Note chords A-B and C-D do not cross.

Figure 39:
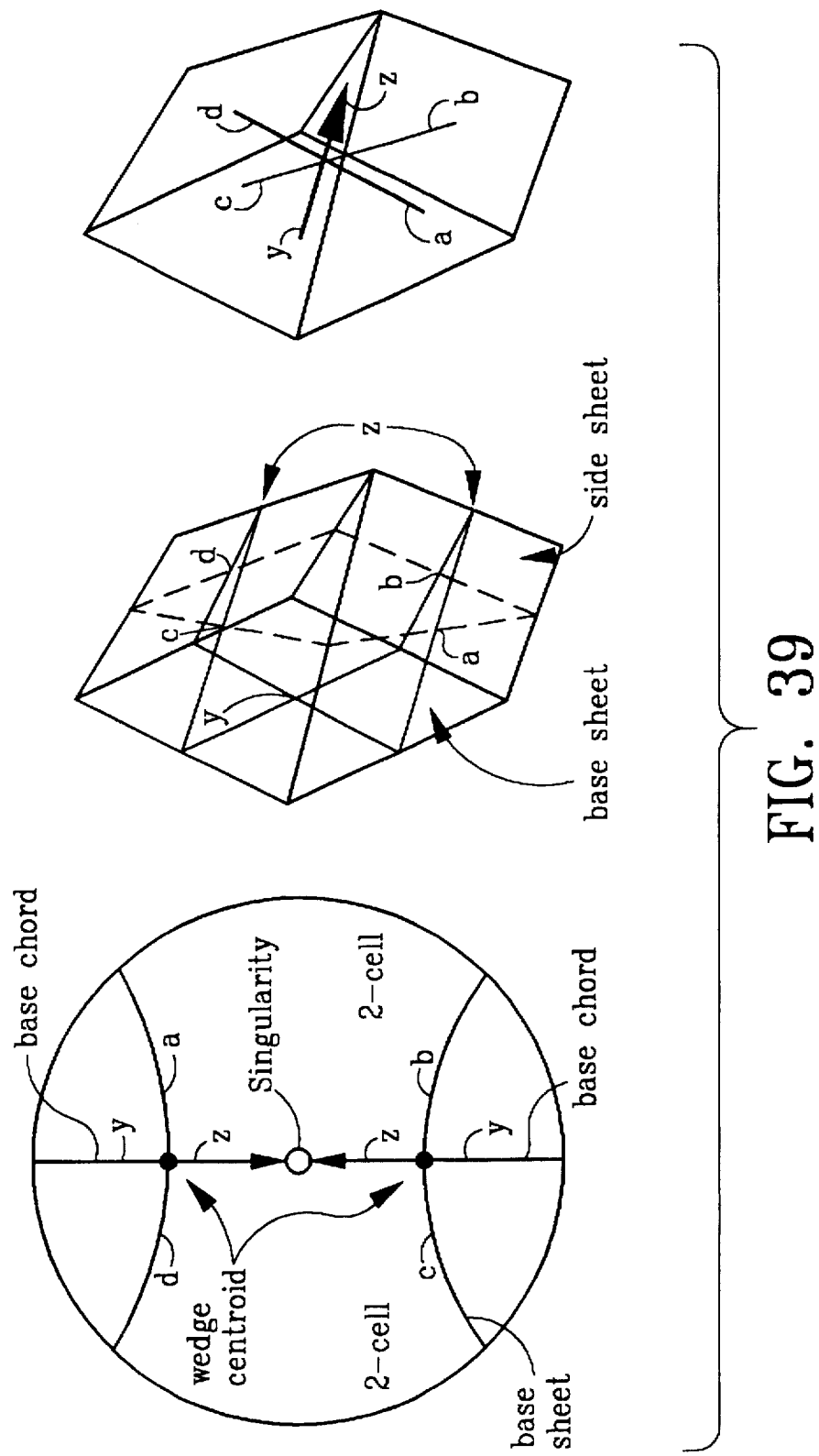
FIG. 39 illustrates a wedge in the STC space (left) and in the mesh space (center and right). Lower case letters denote faces, where z is a degenerate face.

Originally, side chords connect opposite side faces of the knife as shown in FIG. 39. Removing the knife vertices breaks each of the side chords into two, leaving four dangling whiskers on each of the sheets. The whiskers corresponding to side faces that share a blade edge are adjacent to each other on the base sheet diagram; see FIG. 38 (center top). As the side faces sharing a blade edge are merged into one, the whiskers corresponding to those faces are joined.

Removing the knife vertices shortens the base chord by one hex. The last hex of the base chord becomes the new knife; see FIG. 38 (left top). The old base face of the knife gets collapsed and becomes the blade edges for the new knife; see FIG. 37. Note that FIG. 38 (left top) bears a certain symmetry to FIG. 38 (right top): the knife has moved and is now ready to be collapsed again. These two steps are repeated until the object's boundary is reached.

2. Driving a Knife

Figure 40:
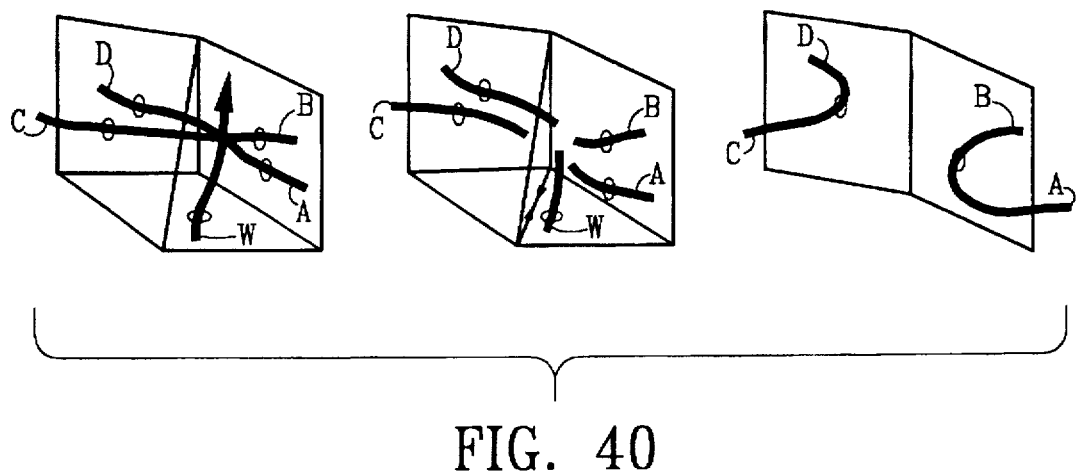
FIG. 40 illustrates the changes in the side chords as a wedge is collapsed.

When a knife is driven its blade opens into a face and the knife becomes a hexahedron; see FIG. 37. The STC changes are the reverse of what happens when a knife is collapsed; first, one STC edge in each of the 2-cell containing the whiskers of the base chord is broken to form side whiskers. Second, the side whiskers adjacent to a base whisker are joined. This crosses two chords on the side sheet, and the base whisker is extended to cross the joined chords on the base sheet. The new vertices of crossing are the new knife. For an example, simply read FIGS. 38 and 40 from right to left.

Figure 41:
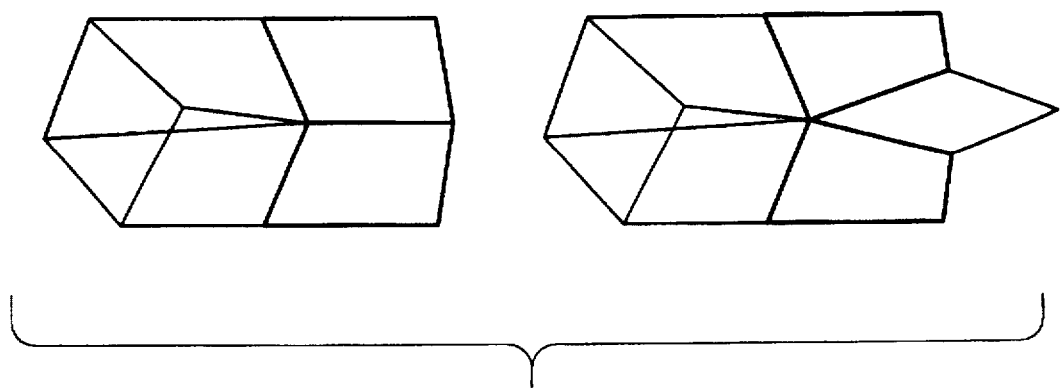
FIG. 41 illustrates shows the necessary steps to drive a wedge wherein two faces must share an edge and each contain a blade edge (left). The right figure illustrates that it is often not possible to drive a wedge.

When driving a knife, the segments of the side chords that are broken correspond to mesh faces. This pair of faces each contain a blade edge and also share an edge in common. There is often some choice as to which face pair to use. For example, in a completely regular mesh, there are three choices (left, right, or straight). However, in an irregular mesh, often the point is reached where no pair of faces meet these criteria and it is impossible to drive as shown in FIG. 41.

3. Reaching the Surface

Figure 42:
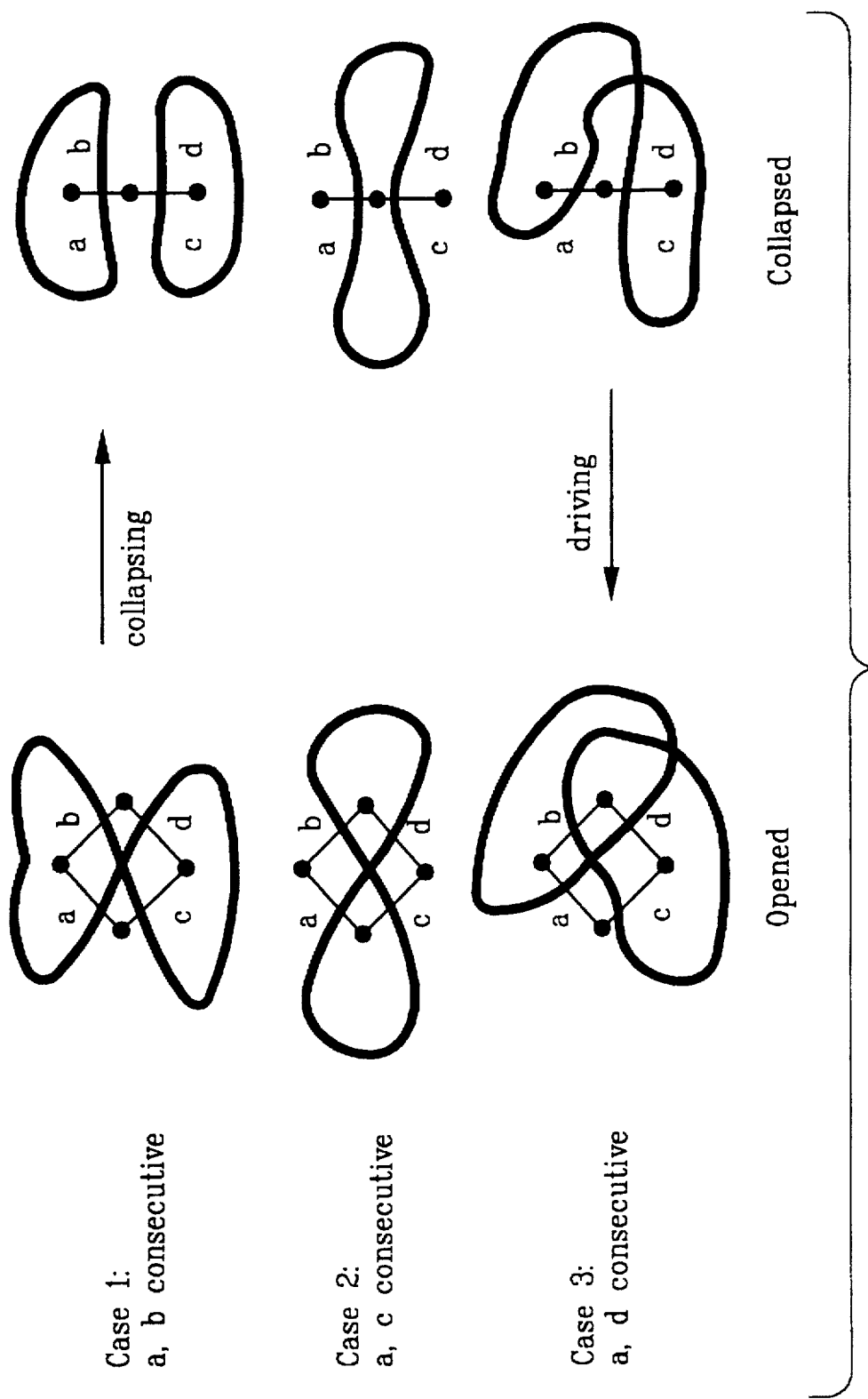
FIG. 42 illustrates three different cases showing splicing loops as a face is collapsed or opened.

Recall that when a knife is collapsed or driven, the side chords are broken and rejoined in a new way. The analogous changes happen to loops when a knife eventually reaches the surface mesh. Consider collapsing a knife whose base face lies on the surface mesh. Suppose mesh edges a, b, c, and d define the base face as shown in FIG. 42. Also assume that in collapsing the knife, edge a is merged with edge b, and likewise edge c is merged with edge d. There are three cases of what happens to the loop(s) when a surface face is collapsed, depending on the order in which edges a, b, c, and d are traversed by the loop(s). These cases are illustrated in FIG. 42.

Case 1: a, b consecutive
Case 2: a, c consecutive
Case 3: a, d consecutive

Consider driving a knife whose blade edges lie on the surface mesh. This corresponds to opening a face on the surface. There are three cases, which are just the reverse of the three cases for collapsing faces in FIG. 42.

Figure 43:
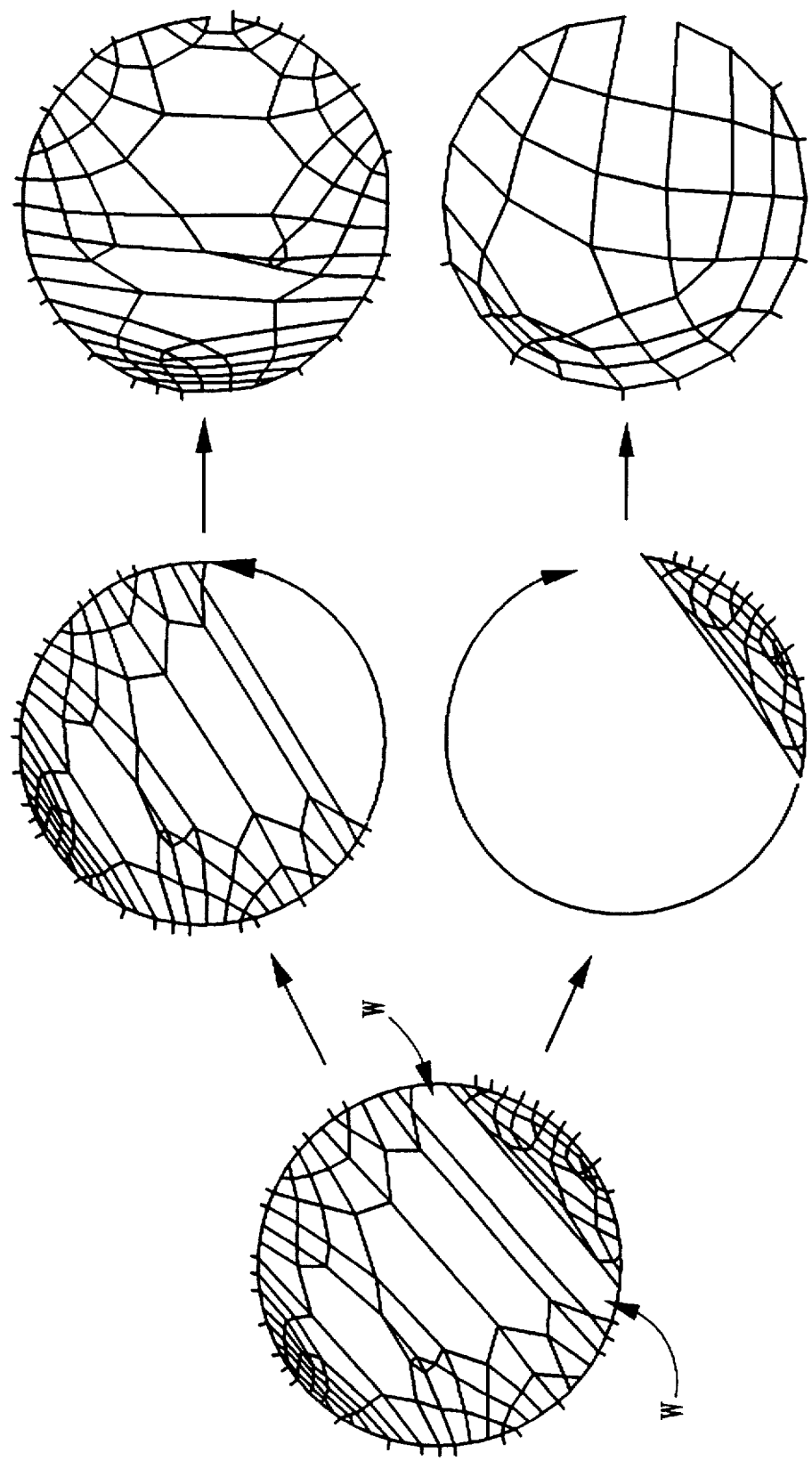
FIG. 43 illustrates that, eventually, a collapsing wedge reaches the object surface and its loop and sheet are broken into two. The sheet diagrams are angularly scaled and smoothed so that they resemble disks. The "broken" gap on each loop is next filled with a loop edge.
Figure 44:
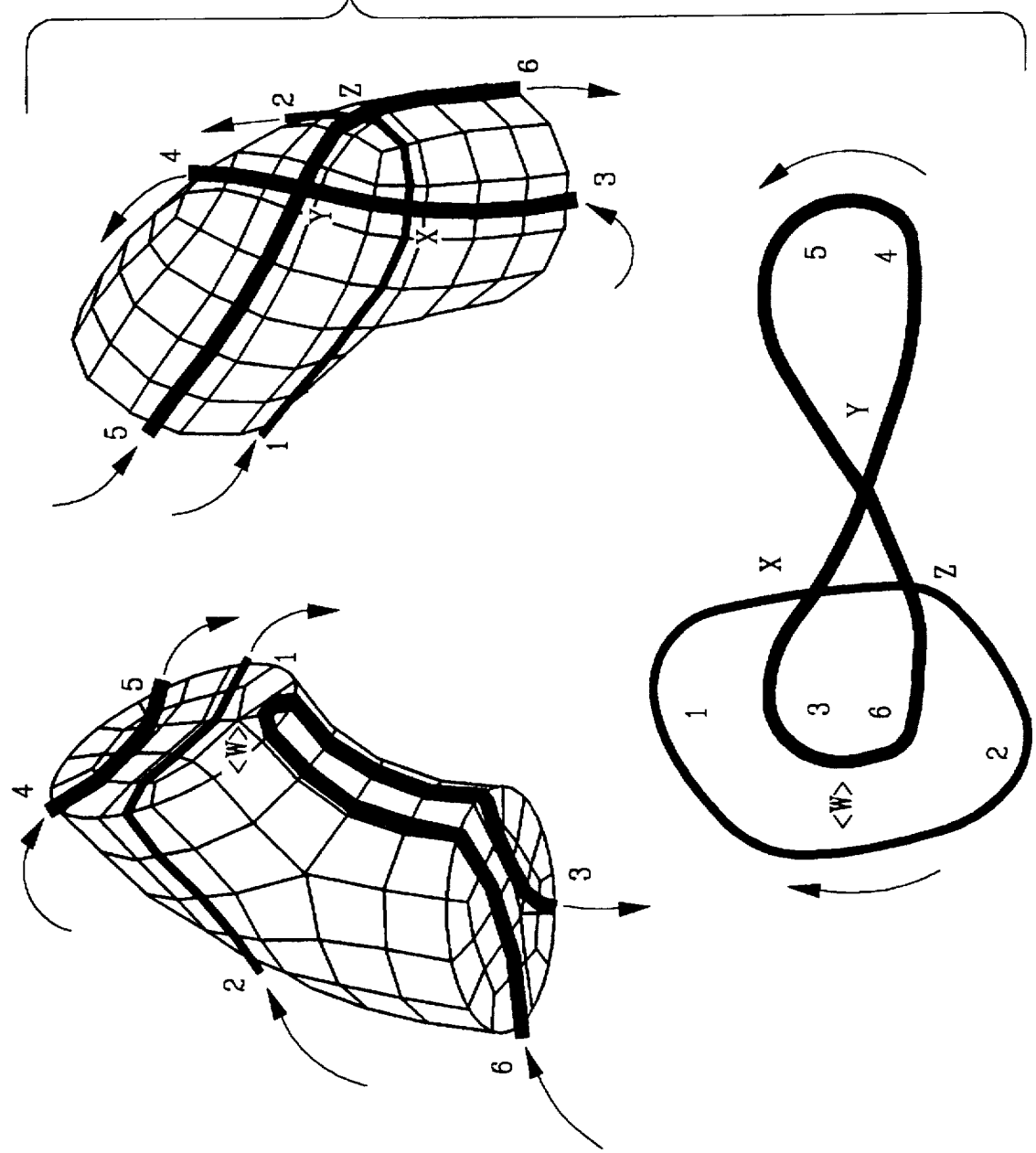
FIG. 44 illustrates the surface mesh after collapsing self-intersecting chord W. The loop containing W was split into two and degenerate faces formed near where W collapsed. Two surface quadrilaterals share two edges and resemble triangles.

Collapsing a knife after performing the weaving in accordance with the method of the present invention always leads to Case 1 of FIG. 42 for the following reasons. In Whisker Weaving, the base chord of a knife always starts from a surface face where a loop self-intersects. Hence, Case 3 does not occur. Furthermore, when collapsing a knife, side chords A and B are joined and chords C and D are joined. When the surface mesh is reached, this breaks the sheet into two as shown in FIG. 43. Hence the loop breaks into two, which is Case 1. The alternative of consistently joining A with C and B with D leads to Case 2, but also always leaves a complicated degeneracy at the original knife blade. Thus, the knife resolution method of the present invention avoids collapsing knives in that way. FIG. 43 shows the base sheet, and FIG. 44 shows the surface mesh when base chord W is collapsed all the way to the surface of the "macaroni."

4. Knives for Refinement

In addition to finishing a mesh of a volume, a knife may also be used to refine a completed mesh. To coarsen a mesh, a surface face is collapsed, forming a knife which is then resolved by collapsing. This can always be done, but element quality may suffer. To make a mesh more fine, two surface edges that share a vertex are opened into a face, forming a knife which is then driven. In mapping techniques, refinement is usually propagated along all three principle directions. However, knives only propagate in one direction. In the case of driving through a fairly regular mesh, the direction of propagation may curve according to the desires of an analyst. However, if the mesh is irregular, the knife may become stuck in the middle of the mesh with nowhere to drive.

Figure 46:
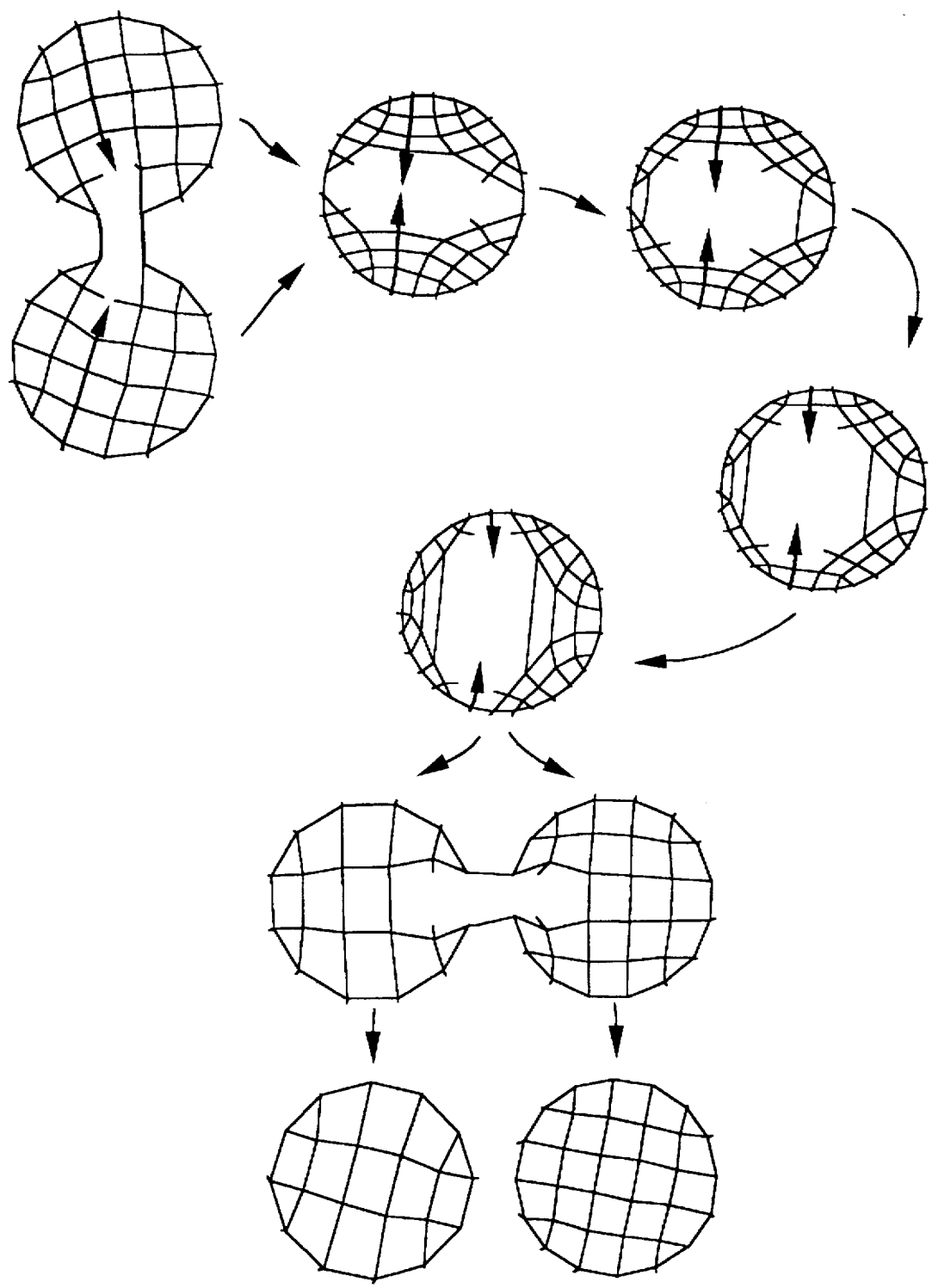
FIG. 46 illustrates the process and results as a surface face is collapsed, splicing two loops into one loop and creating a wedge.
Figure 45:
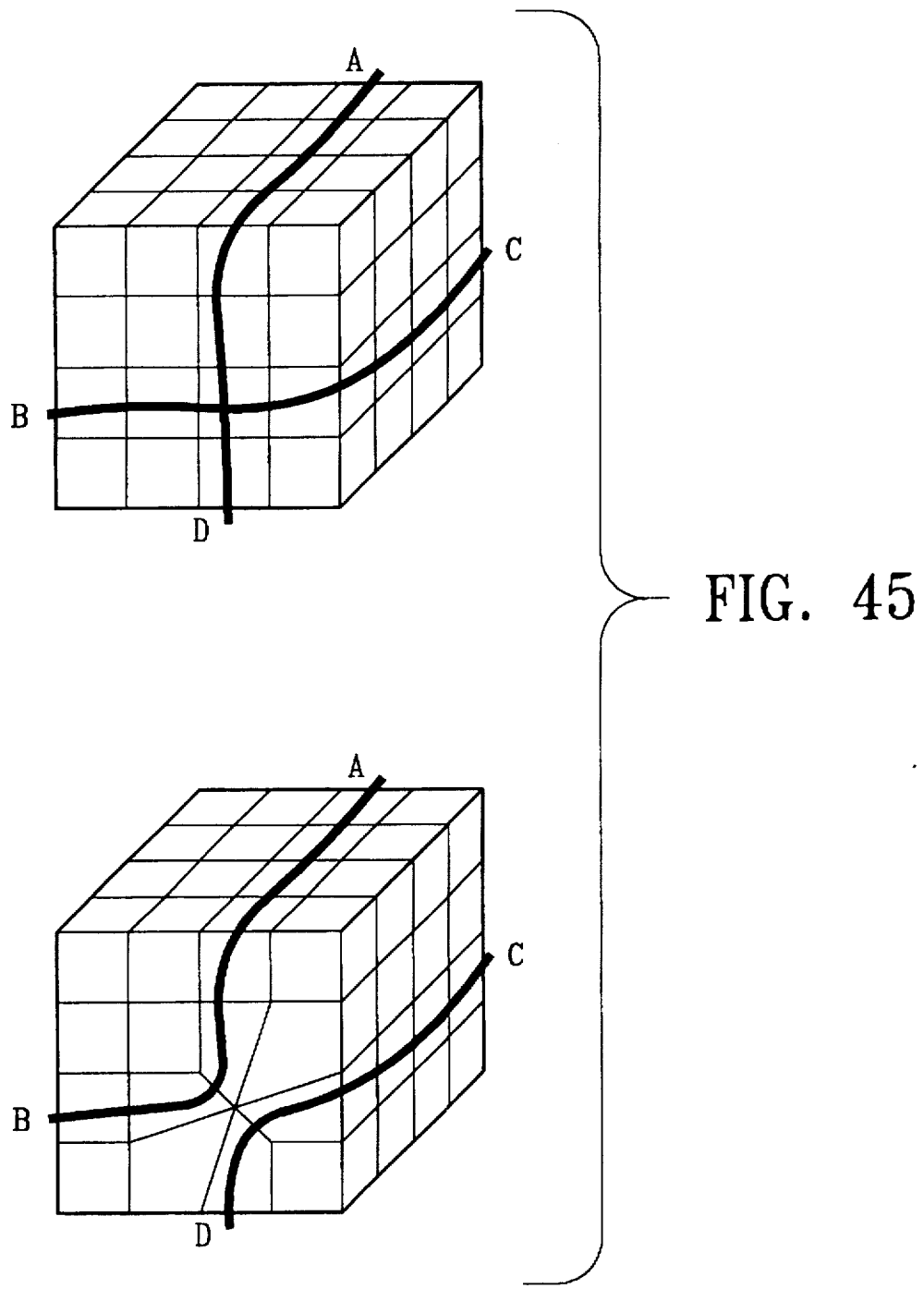
FIG. 45 illustrates the procedure of splicing two sheets by a face collapse (Case 3 in FIG. 42).

Any surface face may be collapsed: its chord need not be, and usually is not, the self-intersection of a loop. This is Case 3 from left to right, which was forbidden for weaving. However, once the face is collapsed, the loops join, splicing the sheets into one. Thus the knife still exists on a self-intersecting sheet. The base chord of the knife is necessarily a chord of some other intersection of the loops. When the chord is completely collapsed, the sheet breaks into two again (by Case 1). FIGS. 45 and 46 illustrate this sequence for a simple 4×4×4 mesh of a cube. In FIG. 45, originally A connects to D, and B connects to C on the far side of the cube. After the knife collapses, the loops split back into two; on the far side, A connects to B, and C connects to D. FIG. 46 illustrates the process and results as a surface face is collapsed, splicing two loops into one loop and creating a knife. The knife is then collapsed until the surface mesh is reached again and the loop breaks into two again. Note that each final sheet contains pieces of both of the original sheets.

Note that a non-surface face of a completed mesh may also be collapsed, which creates two knives. In this case, each base chord need not start at the self intersection of a loop. However, the base chords are the self-intersection of a sheet: The sheets for the two loops are joined smoothly between the two knife singularities, but intersect each other along the base chords.

Figure 47:
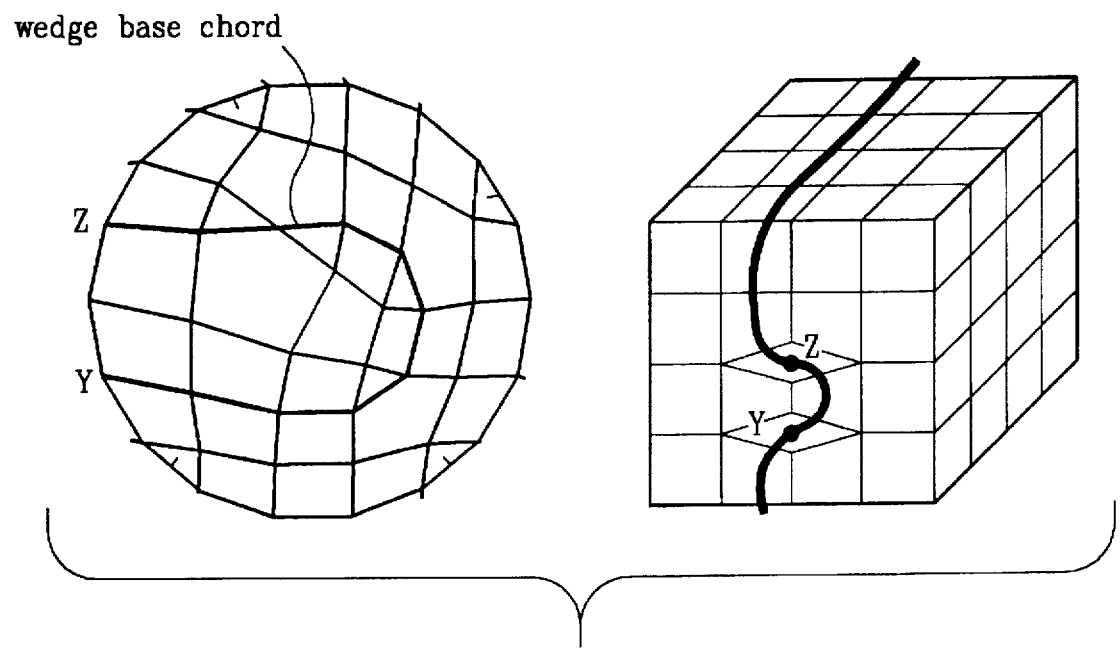
FIG. 47 illustrates a regular mesh with a wedge driven through it.

Similarly, any surface edge pair that shares a node and are contained in two internal faces that share an internal edge may be opened into the base face of a knife. Any one of the three cases is possible. Most likely, a pair of loops will be spliced into one by Case 1, then split back into two by Case 3 when the knife is resolved. FIG. 47 illustrates a knife that is opened at Y, then driven in and curved back near its starting point to Z. Note that the areas of the sheet inside and outside of the thick base chord were originally on separate sheets that were spliced together. There is also another sheet with the same basic structure passing perpendicularly through faces Y and Z. The intersection of these two sheets forms the thick base chord in FIG. 47.

7. Doublets

Figure 48:
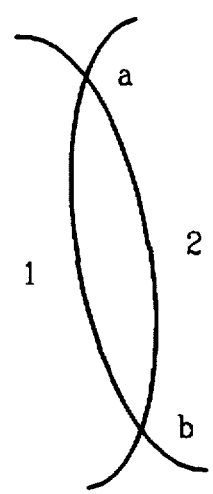
FIG. 48 illustrates a degree-2 2-cell, where a and b are STC vertices representing hex elements, and 1 and 2 are STC edges representing mesh faces.

As studies were performed with the present invention, the macaroni shape, for example (described infra Section V.F.2.), exhibited a tendency to form degree-2 2-cell. That is, there is a STC 2-cell that is a polygon of only two edges, which corresponds to two hexahedra sharing two quadrilaterals. These types of 2-cell represent invalid connectivity, for the following reason. Consider the 2-cell shown in FIG. 48; a and b represent hex elements, and these hexes share the faces represented by STC edges 1 and 2. The two hexes clearly share two faces, which represents invalid connectivity (because of the poor angles in the two hexes that are forced by this connectivity).

A pair of hexes that share two faces is referred to herein as a "doublet," which is a "special" invalid element produced by the method of the present invention. It is believed that doublets are a natural result of complications in the surface mesh, analogous to knives resulting from self-intersecting loops on the surface.

The method of the present invention may deliberately allow the doublets to remain in the weave, and converts these to real hex elements during the primal construction steps. Afterwards, the doublets are resolved into valid hex elements. It is contemplated that one of ordinary skill in the art may desire to remove the doublets from weave in a manner consistent with the present invention. Accordingly, the following discussion describes a robust scheme for refining a hexahedral or quadrilateral mesh to separate such faces, so that any two faces share at most one edge. Note that this also ensures that two hexahedra share at most one face in the three-dimensional case. The technique has been implemented in accordance with the present invention and incorporated into the CUBIT™ mesh generation environment developed at Sandia National Laboratories.

In a quadrilateral or hexahedral mesh, a doublet is defined as two quadrilateral faces that share two edges. When this occurs in a mesh, there is something fundamentally wrong with the local connectivity. In any geometric embedding of these faces, at least one face will have poor quality. In order to remove the doublet and obtain good element quality, it is necessary to change the local connectivity of the mesh through refinement.

Figure 49:
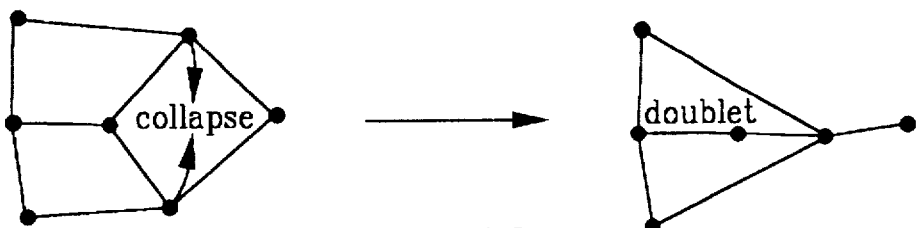
FIG. 49 illustrates the creation of a doublet sometimes resulting from collapsing a face in an already coarse mesh.
Figure 50:
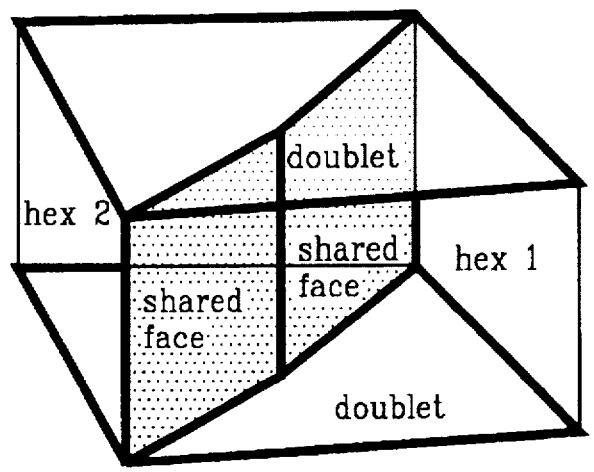
FIG. 50 illustrates the phenomena that two hexahedra sharing two faces implies two doublets.

Doublets occasionally arise during the weaving stages of the method of the present invention and also when knives are collapsed (as discussed above). [See Ted D. Blacker and R. J. Meyers, *Seams and Wedges in Plastering: A 3-D Hexahedral Mesh Generation Algorithm*, Engineering with Computers, 9:83–93 (1993).] Plastering [M. B. Stephenson, S. A. Canann, Ted D. Blacker & R. J. Meyers, *Plastering Progress Report 1*, SAND89-2192, Sandia National Laboratories, Albuquerque, N. Mex. (1992).] and Whisker Weaving™ both collapse knives in their final stages, and collapsing knives can be used to locally coarsen a mesh. FIG. 49 shows that when a mesh is already fairly coarse, collapsing a face (e.g., via a knife) can create a doublet. Another type of poor connectivity that arises is two hexahedra sharing two faces. However, this implies that there is a doublet in the mesh, as seen in FIG. 50. Thus, ensuring that no doublets exist also ensures that two hexahedra share at most one face.

Figure 51A:
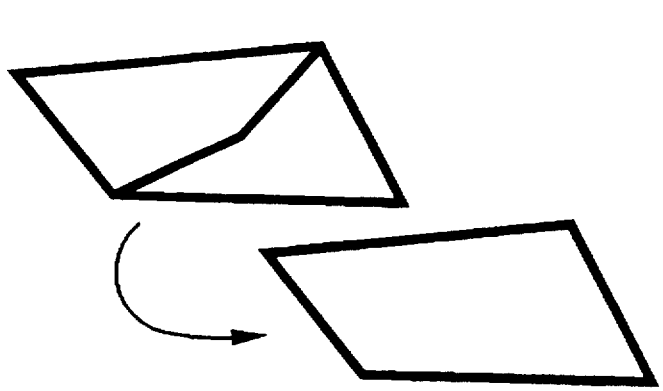
FIG. 51a illustrates, in a quadrilateral mesh, a doublet may be removed by removing the shared edges and merging the doublet faces into one face.
Figure 51B:
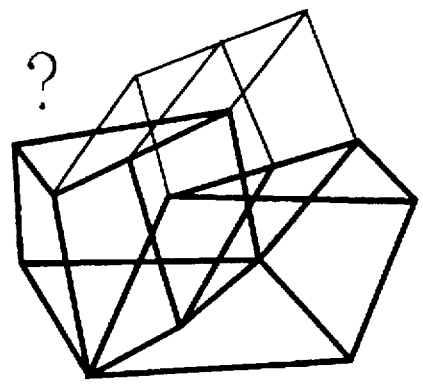
FIG. 51b illustrates, in a hexahedral mesh, the removal of the doublet is not always possible because the hexahedra containing the doublet faces cannot be combined in general.

In a quadrilateral mesh, there is a simpler alternative to the method proposed: Doublets may be removed by simply deleting the two shared edges, forming one big quadrilateral out of the two doublet faces. However, this simple scheme is not possible in a hexahedral mesh, in general, as there is no guarantee that the hexahedra containing the doublet faces are connected in such a way that they can be combined, which is illustrated in FIGS. 51 a and b. FIG. 51a illustrates, in a quadrilateral mesh, a doublet may be removed by removing the shared edges and merging the doublet faces into one face; FIG. 51b illustrates, in a hexahedral mesh, the removal of the doublet is not always possible because the hexahedra containing the doublet faces cannot be combined in general.

The following discussion describes a robust scheme for eliminating doublets, so that any two faces share at most one edge. This idea works in both two and three dimensions, and it is contemplated that it could be extended to higher-dimensional meshes as well. The basic approach is to refine the mesh in such a way that the connectivity of the doublet node is increased. The technique has three main steps, which are repeated for every face that shares two edges with another face. First, a shrink set is located, a group of elements containing one, but not both, of the faces that share two edges. Second, the shrink set elements are disconnected from the elements on its boundary and the size of the shrink set is geometrically reduced. Third, the shrink set is connected to its old boundary with a layer of elements. These steps are presented in FIG. 52. In three dimensions, the connecting layer often resembles a spherical pillow, hence the name "pillowing doublets." Performing these three steps is referred to as "pillowing a doublet face." Performing these three steps for both faces of the doublet is referred to as "pillowing a doublet." If the input mesh has doublets that are very close together, then the output of the technique is dependent on the order in which the doublet faces are pillowed. At the end of these operations, the mesh is smoothed.

The technique also has an easy explanation in terms of the Spatial Twist Continuum ("STC"). In the STC, a doublet comprises two vertices connected by two edges, see FIG. 53, which is also called a degree-2 2-cell as discussed earlier. In three dimensions, pillowing the doublet comprises inserting a whisker sheet that cuts across these two edges. Choosing the shrink set is equivalent to choosing the set of STC vertices that are on one side of the whisker sheet (i.e., inside the whisker sheet if it is a sphere).

Figure 53:
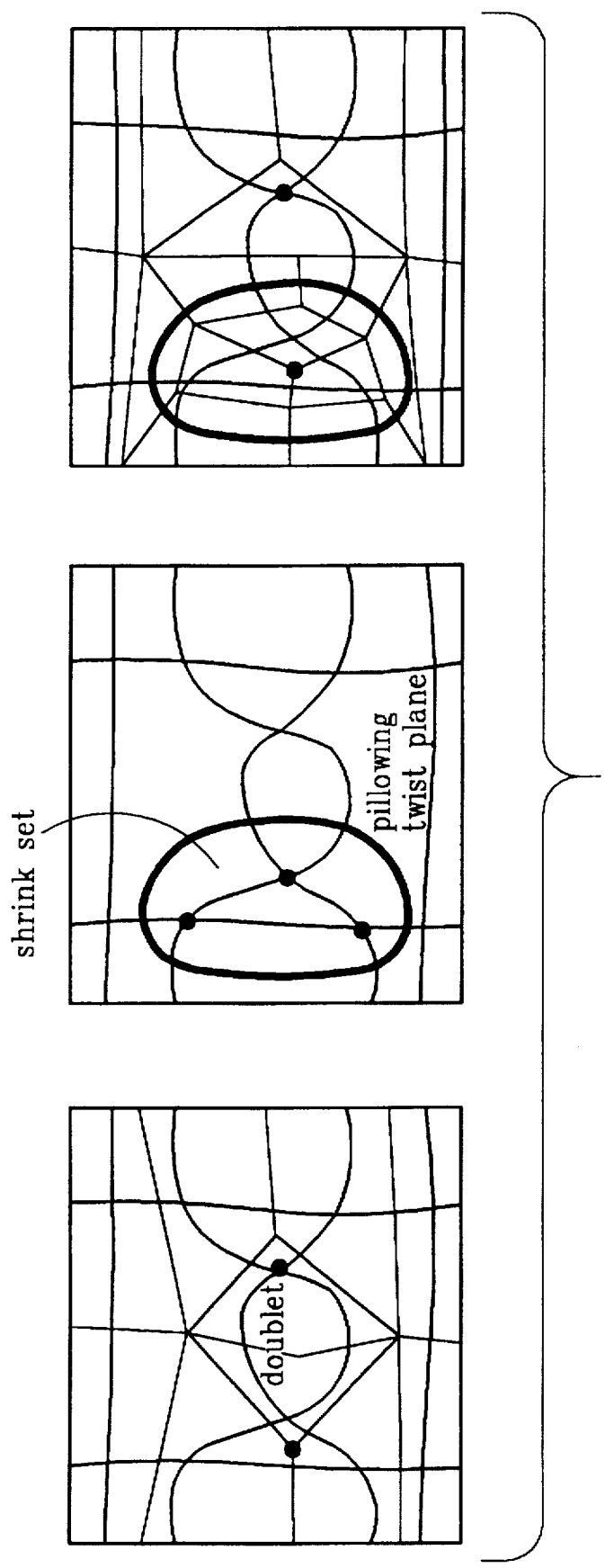
FIG. 53 illustrates the STC interpretation of pillowing doublets.

Referring to FIG. 53, a whisker sheet that resembles a pillow is inserted so that it surrounds the STC 2- or 3-cell that contains the primal star node. Pillowing whisker sheets that pass through a common 2- or 3-cell are merged in an amoeba-like fashion into one big pillowing whisker sheet. In FIG. 53, another pillowing whisker sheet will eventually be added around the other star node to pillow the other doublet face.

a. Building a shrink set

A doublet is two faces that share exactly two edges. The node common to those edges is called the doublet node. In each of the two faces, the node opposite the doublet node is a star node. In this section, a technique for constructing the shrink set for a given star node is described. This is the first step in pillowing a given doublet.

Actually, there are many options for constructing a shrink set that will lead to removal of the doublet. In two dimensions, any set of elements that contains one doublet face but not the other is sufficient. The reason this is sufficient will be evident in Section V.D. 7.d. *Connecting with a Layer of Elements*. In three dimensions, any set of elements that contains all hexahedra containing one doublet face but not all hexahedra containing the other is sufficient. In addition, in order to perform the second step of disconnecting and shrinking the shrink set, for every point in the shrink set, the presence of a small neighborhood is required, open relative to the meshed object, whose intersection with the shrink set is homeomorphic to a ball or half-ball. Based on experience, large sets without sharp angles on their boundary tend to lead to better quality elements.

The basic scheme used is to add all of the elements containing the star node into the set. When star nodes for different doublet nodes are close together, the shrink set is made larger to contain multiple star nodes: if the shrink set contains another star node, then all of the elements containing that star node into the set are recursively added as well. This heuristic gives big, roundish shrink sets, which results in good mesh quality. However, to satisfy our sufficient condition, care is taken that the two star nodes for a given doublet node are never in the same shrink set: If one is in the shrink set, the other is marked as forbidden. Only the elements containing a star node are added if these elements do not contain a forbidden node.

Figure 54:
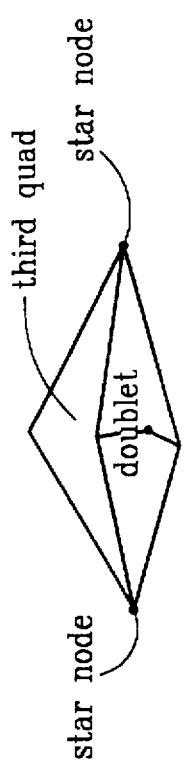
FIG. 54 illustrates how the shrink set building technique fails when an element contains both star nodes of a doublet.

The pseudo code for building a shrink set is preferably as follows:

Build_shrink_set(given star_node, return shrink_set)
shrink set:=empty
star_node list:=given star node
do
   star_node=pop star_node_list
   elements=elements containing star_node
   if (elements do not contain a forbidden star node)
     shrink_set+= elements
     star_node_list+= new star_nodes in elements while star_node_list is not empty Note that it is possible that this technique returns an empty shrink set. In two dimensions, this may occur when a third face shares an edge with both faces of a doublet, as shown in FIG. 54. FIG. 54 illustrates how the shrink set building technique fails when an element contains both star nodes of a doublet. The technique is retried after progress is made elsewhere in the mesh. In any event, the technique can be made robust by merely taking a smaller shrink set.

A robust solution is to take the shrink set to be the single doublet face containing the star node. Certainly this meets the sufficient condition that the shrink set contains one doublet face but not the other: After pillowing, the doublet edges are contained in two different quadrilaterals of the pillow layer, which removes the doublet. Angles would be bounded away from 180 degrees and the local connectivity would appear acceptable, but in fact element quality would still not be very good, as seen in FIG. 55 (top). FIG. 55 illustrates that these shrink sets are always possible and always lead to the removal of the doublet, but element quality could be better by taking larger, rounder shrink sets such as those shown in FIG. 52.

In three dimensions, if the doublet face containing the star node is in the interior of the meshed object, it is always possible to take the shrink set to be the two hexahedra h1 and h2 containing that doublet face as in FIG. 55 (bottom). The sufficient condition is satisfied by noting that the shrink set cannot contain all hexahedra containing the other doublet face: If it did, then at least one of h1 and h2 contains both doublet faces. That hexahedra has only two edges (the shared doublet edges) at the doublet node, but a hexahedron has three edges at every node, a contradiction. Similarly, if the doublet face is on the boundary of the meshed object, it is always possible to take the shrink set to be the single hexahedron containing it. As in two dimensions, while this solution is robust, it is not ideal from an element quality standpoint. Element quality would be particularly poor if this solution was used for many doublets that are near one another. In practice, the resolution of that star node is deferred until all other star nodes are resolved. This heuristic works well in practice: The technique initially fails when the mesh is very coarse near the star node usually meaning that other doublets are close by. After some of these close by doublets are pillowed the local mesh is often changed enough so that re-running the technique returns a good shrink set for the first star node.

b. Disconnect and Shrink

The method for disconnecting the shrink set from the remaining mesh and reducing the geometric size of the shrink set is described. This is the second step of pillowing a doublet face.

Given the hexahedra of the shrink set, it is straightforward to determine if a facet is on the boundary of the shrink set (the exception is when a facet lies on the boundary of the meshed object; see below). A copy of each facet on the shrink set boundary is created: one copy remains with the shrink set, and the other remains with the remainder of the mesh. The condition that every point in the shrink set has a small neighborhood whose intersection with the shrink set is homeomorphic to a ball or half-ball ensures that a facet has only one copy that needs to stay with the shrink set. If a star node is on the boundary of the shrink set, but has not yet been pillowed, then the copy that remains with the remainder of the mesh is a star node, but the copy that remains with the shrink set is not.

A complication arises when, in two dimensions, the shrink set contains edges on the boundary of the meshed object, which makes it difficult to determine whether such an edge is on the boundary of the shrink set, or in its interior. FIG. 56 shows the difference between the two answers. A similar question arises in three dimensions. FIG. 56 illustrates a consideration on whether edges on the boundary of the object be considered to be in the interior of the shrink set (center), or on its boundary (right). In three dimensions, if a doublet face lies on the boundary of the meshed object, then we must consider it to be in the interior of the shrink set.

In order for the technique to remove a doublet face, the doublet face must be considered to be in the interior of the shrink set. Hence, in three dimensions, when a doublet face lies on the object boundary it must be considered to be in the interior of the set. Additionally, some care is necessary to determine if a boundary facet or its copy stays on an input surface, curve or vertex.

However, a mesh that contains "surface doublets" is presented. In two dimensions, a surface doublet is a single face, two of whose edges are constrained to lie on a straight or near-straight curve bounding the meshed object. In three dimensions, the edges may also lie on a flat or near-flat bounding surface. In order to pillow such doublets, it is necessary to consider the facets of the shrink set lying on the meshed object's boundary to be on the boundary of the shrink set, as in FIG. 57. FIG. 57 illustrates the process of pillowing a "surface doublet." Here, the edges on the boundary of the meshed object must be considered to be on the boundary of the shrink set.

A solution to this dilemma in three dimensions is to consider an object surface face to be on the interior of the shrink set if and only if it contains a star node of the shrink set that is on the object surface. In addition to handling the above two cases, this has the additional advantage that the surface mesh is only modified when necessary. Unfortunately, this can create surface doublets some rare instances. Our solution is to find and pillow surface doublets in a separate pass, after all non-surface doublets have been pillowed.

Geometrically shrinking the set is straightforward. The exact positions are not important, since the entire mesh will be smoothed later. The following step, however, is included to make the description of the technique more intuitive, and the method easier to implement.

c. Connecting with a layer of elements

An edge is placed between each node on the boundary of the shrink set B and its copy on the remainder of the mesh C. Similarly, a face is placed between each edge on B and its copy on C. In three dimensions, a hexahedron is placed between each face on B and its copy on C. The layer of elements often resembles a ring in the two-dimensional case, and a spherical pillow in the three dimensional case. However, this is not necessary. Because large shrink sets without sharp angles result in the best element quality, in three dimensions, layers are built that can resemble cylinders, tori, or any other type of orientable manifold.

If doublet face f is in the shrink set, and its shared edges are on the boundary of the shrink set, then each shared edge will be split into two and a face inserted between the two copies. By construction, all other doublet faces sharing those edges with f are outside the shrink set. Hence, f now shares only one edge with any other face, and the doublet has been removed.

d. Output Size and Running Time

Let n be the number of nodes, edges, faces, and hexahedra in the input mesh, and d the number of doublet nodes. In this section it is shown that pillowing doublets produces $\gamma=O(d)$ new elements and can be performed in time proportional to $\gamma$ after an $O(n)$ pre-processing step to find the doublets.

It is assumed that given a facet f of some dimension, the list of m facets can be obtained containing f, or contained by f, in time $O(m)$. It is further assumed that, on average, m can be considered to be a small constant compared to the size of the mesh. By stepping through the mesh faces, and visiting faces that share an edge with the current face, all doublets can thus be found in time $O(n)$.

Similarly, by starting with a star node and visiting containing elements, each shrink set can be found in time proportional to the size of the shrink set, times an average connectivity constant. A star node's list of other star nodes for the same doublet, used to keep shrink sets from getting too large, is also a small connectivity constant.

Each shrink set, regardless of whether nearby shrink sets have been previously inserted, is proportional to the number of star nodes it contains times a connectivity constant. The number of original star nodes is at most 2d. The number of surface doublets created by pillowing the original star nodes is smaller than the number of original star nodes.

Disconnecting, copying, and inserting the layer of elements can all be done in time proportional to the size of the shrink set.

One of ordinary skill in the art may have noticed that both star nodes for a doublet are pillowed, while in actuality pillowing one of the star nodes of a doublet is sufficient to ensure that the doublet is removed. Both doublets are pillowed as this results in better element quality. Pillowing a star node increases the edge degree of every node on its boundary by one. In particular, in the two dimensional case, the doublet node had edge degree four after pillowing both star nodes.

Thus, with the robust technique presented above, refining a hexahedral or quadrilateral mesh so that no doublets are present is made possible. i.e., so that any two faces share at most one edge. In three dimensions, the surface mesh of the object is only modified if doublet faces are present on the surface mesh. The technique for resolving doublets is very general, and may be modified by several heuristics for making larger shrink sets in order to get better element quality in a manner that may become obvious to one of ordinary skill in the art. The number of new elements created is on the order of the number of doublets in the original mesh, times a connectivity constant. The running time is proportional to the number of new elements created, plus time proportional to the size of the original mesh to initially find the doublets.

E. Outline of the Method Steps

An outline of the method steps of the present invention may be expressed in pseudo code as follows:

```
whisker_weaver ( )
{
// create loops on outer surface mesh
- while (face exists with < 2 loops) {
    - allocate new sheet
    - start at edge on face with no loop defined
    - while (not at starting face) {
        - add face to sheet face list
        - get next face sharing edge with previous face
    }
}
// start meshing
- while (sheetchords exist) {
    - get two sheetchords
    - check to see if two sheetchords can be crossed
    - if (they can cross)
    {
        - look for a third chord (create a blind one if none is found)
```

43
-continued

```
    - check to see if third chord can be crossed with other 2; if it can,
    {
        - make crossing on 3 sheets
        - check_joins (3 chords just crossed)
    }
    }
}
// construct actual nodes and hexes
- construct_primal ( )
// resolve knives and doublets
- resolve_invalid_elements ( )
}
check_joins (3 chords just crossed)
{
- put 3 chords on join check list
- while (join check list not empty)
    {
        - get next chord to check
        - check for repeated hex
        - if (repeated STC edge)
        {
            - if (this chord and adjacent chord can be joined)
            {
                - put chords adjacent to pair on join check list
                - join them
            }
            - else if (repeated STC edge below meshing boundary)
            {
                - remove hexes to put repeated STC edge on meshing boundary
                - add this sheetchord back on join check list
            }
            - else
            {
                - remove repeated hex
                - put chord on join check list
            }
        }
    }
}
construct_primal ( )
{
- allocate 2-cells (mesh edges) on all whisker sheets
- while (mesh edge exists with < 2 nodes defined)
    {
        - get the edge → edge1
        - choose a mesh face containing edge1 → face1
        - choose another edge on face1 that shares a node with edge1 →
edge2
        - choose a hex containing face1 → hex1
        - get third edge contained in hex1 sharing a node with edge1,
edge2 → edge3
        - add edge1, edge2, edge3 to list
        - for (all 2-edge combinations on list which share a node)
        {
            - take 2 edges → edge1, edge2
            - get a face, hex sharing those edges → face1, hex1
            - find 3rd edge in hex1 sharing that node → edge3
            - find hex opposite hex1 that shares face1 → hex2
            - find 3rd edge in hex2 sharing that node → edge4
            - add edge3, edge4 to edge list if not there already
        }
    }
- compute proper node ordering for every hex
- initialize interior nodal positions to origin
- smooth nodes to get interior nodal positions
}
resolve_invalid_elements ( )
{
- resolve_doublets by refining into valid hexes (doublet pillowing)
- resolve knives (wedges) by driving or collapsing
}
```

F. Non-limiting Examples

The particular values and configurations discussed in the following non-limiting examples can be varied and are cited merely to illustrate a exemplary embodiments of the present invention, and are not intended to limit the scope of the invention. In the following examples of these preferred embodiments, the present invention was implemented by a computer program embodied in a tangible medium, i.e., a computer's hard disk drive, and subsequently loaded into the computer's RAM, and executed for processing by the computer's microprocessor. Any computer program storage device readable by a machine, tangibly embodying a program of instructions executable by the machine to perform the method for producing an all-hexahedral mesh will suffice.

The methods of the present invention described above have been implemented inside the CUBIT™ mesh generation environment. [See Ted D. Blacker et al., *CUBIT Mesh Generation Environment, Volume 1: User's Manual,* SAND94-1100, Sandia National Laboratories, Albuquerque, N. Mex., May 1994.] This environment is suitable for testing new meshing techniques because it provides many of the support functions that would otherwise need to be developed; some of these functions include, but are not limited to: (1) geometry import capability; (2) limited geometry creation, transformation and Boolean operations; (3) various surface meshing techniques including Paving™ and mapping; (4) graphics support for mesh and geometry visualization; and (5) mesh export capability. The starting point for the method of the present invention is a geometry and an all-quadrilateral surface mesh; CUBIT™ provides the capabilities to arrive at this starting point.

The small corner hex example was used to demonstrate the basic method of the present invention earlier in Section V.B.2. In the following section, two additional non-limiting examples are provided, which demonstrate the method of the present invention: (1) the double-fold example and (2) the macaroni example (a ¼ torus).

1. Double Fold Example

Figure 27:
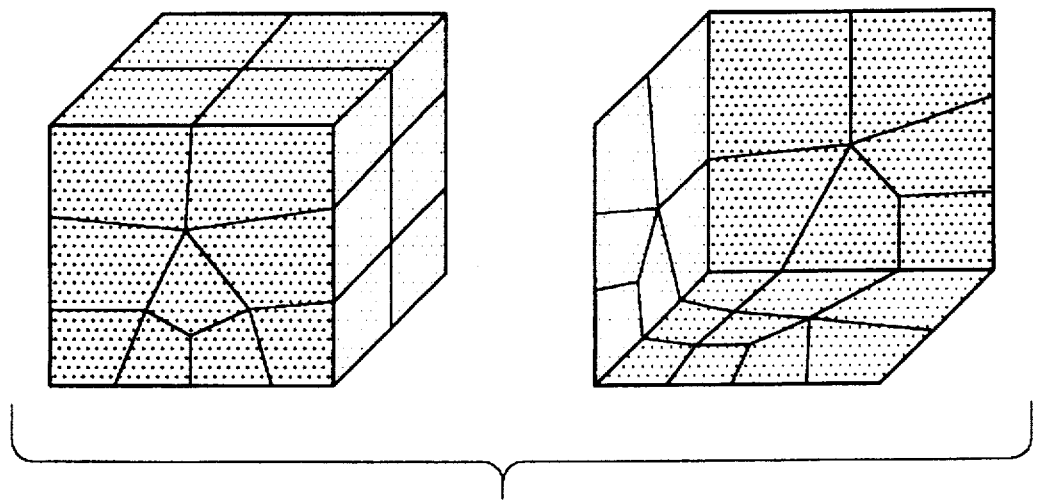
FIG. 27 illustrates the geometry the geometry and surface mesh for the double fold example, in accordance with the present invention.

The double fold example has been used to study STC folds and corners, which are STC entities arising from irregular nodes in a surface mesh (i.e., nodes which are connected to other than four mesh edges). This example also has a simple cube-type geometry, but a more complicated surface mesh as shown in FIG. 27.

Figure 28:
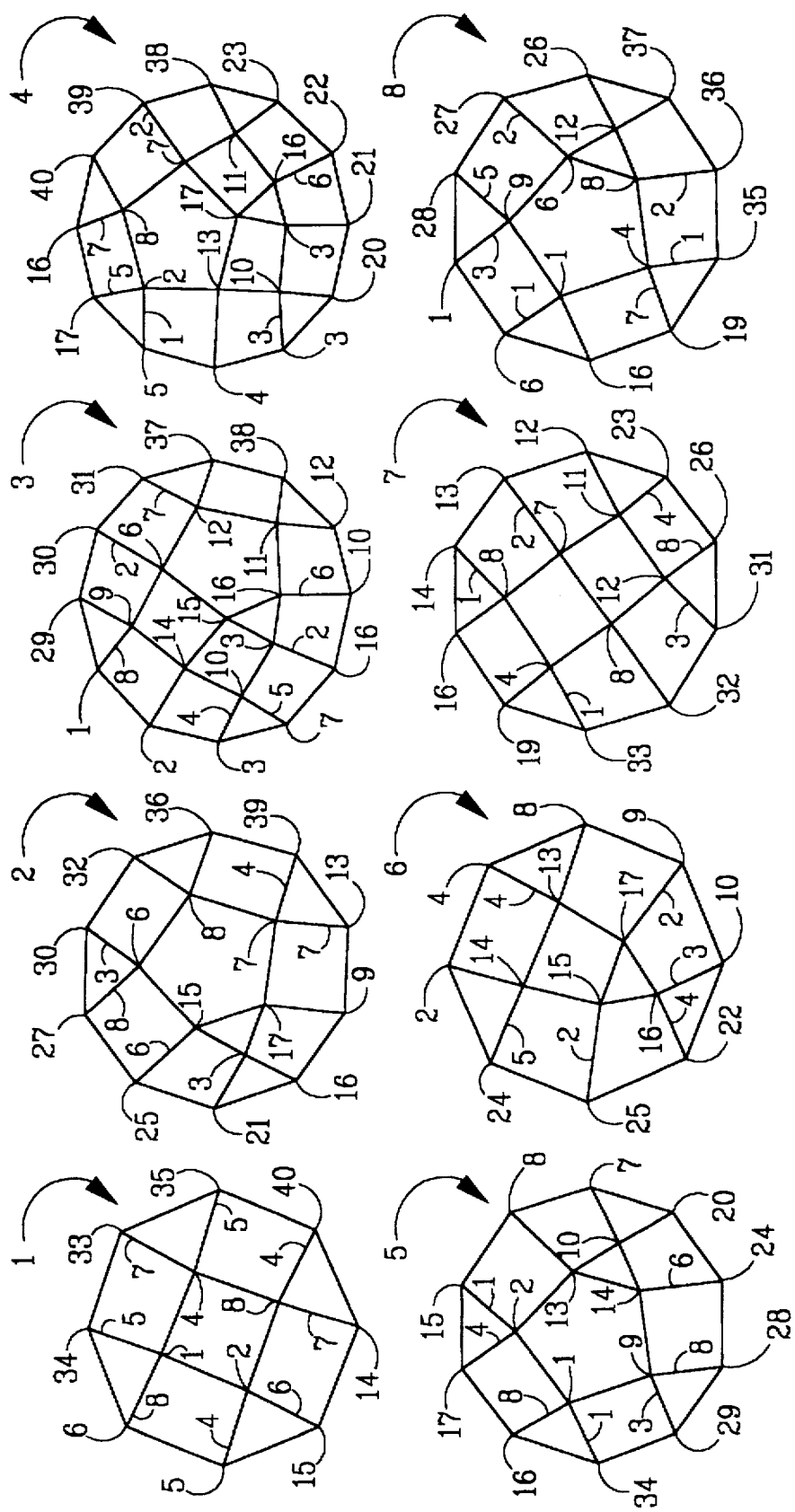
FIG. 28 illustrates the final sheets for the double fold example, in accordance with the present invention.

The mesh resulting from weaving this volume contains 17 hex elements. The sheet diagrams are shown in FIG. 28. Note that there are several 5-sided and 3-sided STC 2-cells, for example on sheets 2 and 3; these higher and lower degree STC 2-cell are also referred to as folds. These cells propagate through the mesh until they either emerge on the surface or meet inside the mesh with other higher or lower degree STC 2-cell; these meeting points are referred to as corners. Although folds and corners contain theoretical properties which are interesting, they do not inhibit the ability of the method of the present invention to weave a mesh containing them.

2. Macaroni Example

Perhaps, one of the most difficult geometry and surface mesh that has been completely woven, or closed, with Whisker Weaving™ is the macaroni example. This example comprises a ¼ torus geometry, where the inner radius is much smaller than the outer radius. The geometry and surface mesh for the macaroni example are shown in FIG. 58.

Meshing the surface with a relatively constant mesh size results in many irregular nodes, which makes this macaroni more difficult to mesh because of the large difference in inner and outer radii. In terms of STC entities, the irregular nodes and the quad faces surrounding them tend to "redirect" the sheet loops, producing more self intersections. When the surface mesh shown in FIG. 58 is looped, 20 self-intersecting faces are produced, four on one sheet and sixteen on another. These are the sheets that prove the most complicated to mesh.

The method of the present invention begins to mesh the macaroni by producing a hex on one end cap of the geometry. One skilled in the art may recognize from FIGS. 18 and 58 that this requires the formation of a blind chord, which runs below the surface all the way around the end cap. Sheet 4, whose loop is on the side of the geometry, looping all the way around the end cap, is shown in FIG. 59, with the first whisker hex and blind chord shown. FIG. 59 illustrates loop and sheet diagrams for sheet 4 of the macaroni example.

The macaroni example contains two sheets that eventually merge into one; these sheets were used to illustrate a sheet merge operation in Section V.C. Special STC Constructs. The merge operation occurs after the formation of hex 32, when two hexes meet on the curved surface of the geometry. The final sheet diagram for the merged sheet 10 is shown in FIG. 60. Note that after the merge operation the merged sheet contains an inner loop and a meshing boundary, indicated in STC space by a continuous loop of whiskers. This sheet can continue to be woven as before because of this regular meshing boundary.

The first removed hex resulting from a removed hex seam case occurs at hex 145. The details will not be given here, but they are very similar to those given in the description of the removed hex seam case discussed earlier in Section V.D. Connectivity Resolution in Accordance with the Present Invention. In fact, the second removed hex seam operation occurs after the formation of hex 162, and is the one used to illustrate the removed hex seam case in FIGS. 24a and 24b.

The present invention closed or completely wove the macaroni example, with the following metrics: 170 hexes; 6 knives (left in place); and 3 doublets.

Of the nine sheets remaining after the completion of the weave (and after merging two of the initial sheets into one), four of them (sheets 4, 7, 8, and 9) correspond to disks of elements on the two end caps of the geometry. Sheets 5 and 6 are referred to as "stirrup" sheets, because of the topology of their surface loops. FIG. 62 illustrates sheet diagrams for sheets 4–6 (top) and 7–9 (bottom) for the macaroni example. Note the similarity between sheets 4, 7, 8, and 9, and between sheets 5 and 6. These similarities can be attributed to similarities in the surface loops and in the crossing sheets.

The final sheet diagram for the merged sheet 10, shown in FIG. 60, is interesting for several reasons. First, the weave is very asymmetric. Since this sheet crosses all the side hex elements in the first layer, this lack of symmetry is clearly a direct result of the irregular surface mesh. Second, there are some chords which connect the inner and outer loops, while there are others which begin and end on the inner loop. The inner loop happens to be on the same end cap as that crossed by the loops of sheets 5 and 6, which do not cross the opposite end cap.

The most interesting sheets for this example are sheets 1 and 3, which contain all the self intersections (see FIG. 61). FIG. 61 illustrates the final sheet diagram for sheets 1 and 3 of the macaroni example. Sheet 1 contains four self intersections on the face loop. Two of the chords corresponding to these faces join up into a single chord; this chord begins at face 104 and ends at face 107 as shown in FIG. 61. The other two chords beginning at self intersecting faces terminate in knives inside the mesh. The chord beginning at face 25 ends in a knife element, which is indicated as vertex 123, while the chord beginning at face 17 ends in a knife element at vertex 179. These knives are currently left in the mesh. Recall though that in the simplest case these knives could be pulled out, closing a mesh face on the surface.

Sheet 3 in FIG. 61 has 12 self-intersecting chords which pair-wise join, forming six final self-intersecting chords which begin and end on the surface mesh. Four self-intersecting chords are terminated in the mesh in knife elements. These chords begin at faces 23, 99, 120, and 123. Note that two of these base chords intersect each other. If the corresponding knives are pulled, this has the effect of redirecting the knife along a self-intersecting chord that is currently valid. Pulling all the knives represented in sheet 3 would result in four additional sheets, all much smaller than the original sheet 3, which has 110 faces in its face loop.

Other variations and modifications of the present invention will be apparent to those of ordinary skill in the art, and it is the intent of the appended claims that such variations and modifications be covered. For example, it is contemplated that research will continue in an effort to convert the invalid elements discussed, namely, knives and doublets, to valid hexahedral elements. The particular values and configurations discussed above can be varied and are cited merely to illustrate a particular embodiment of the present invention and are not intended to limit the scope of the invention. It is contemplated that the use of the present invention may involve components having different characteristics as long as the principle, the presentation of a connectivity-based method and apparatus for constructing all-hexahedral meshes, is followed. It is intended that the scope of the present invention be defined by the claims appended hereto.

REFERENCES CITED

The entire disclosures of all references—patents and publications—cited herein are hereby incorporated by reference. The following patents and publications have been cited herein (not necessarily in the order of appearance):

1. W. A. Cook & W. R. Oakes, *Mapping Methods for Generating Three-Dimensional Meshes*, Computers in Mechanical Engineering, at pp. 67–72 (August 1982).
2. M. B. Stephenson & T. D. Blacker, *Using Conjoint Meshing Primitives to Generate Quadrilateral and Hexahedral Elements in Irregular Regions*, Proc. ASME Computations in Engineering Conference (1989).
3. T. K. H. Tam & C. G. Armstrong, *Finite Element Mesh Control by Integer Programming*, Int. J. Numer. Methods Eng., 36:2581–2605 (1993).
4. Ted D. Blacker, M. B. Stephenson, J. L. Mitchner, L. R. Philips, & Y. T. Lin, *Automated Quadrilateral Mesh Generation: A Knowledge-Based System Approach*, ASME Paper No. 88-WA/CIE-4 (1988).
5. A. P. Gilkey & Gregory D. Sjaardema, *GEN3D: A GENESIS Database 2D to 3D Transformation Program*, SAND89-0485, Sandia National Laboratories, Albuquerque, N. Mex. (March 1989).
6. T. K. H. Tam & C. G. Armstrong, *2D Finite Element Mesh Generation by Medial Axis Subdivision*, Advances in Eng. Soft., Vol. 13, 5/6, at pp. 312–324 (September/November 1991).
7. PDA Engineering, *PATRAN Plus Users' Manual*, Release 2.4, January 1990.
8. Ted D. Blacker, *Automated Quadrilateral Surface Discretization Method and Apparatus Usable to Generate Mesh in a Finite Element Analysis System*, U.S. Pat. No. 5,315,537.
9. Ted D. Blacker & M. B. Stephenson, *Paving: A New Approach to Automated Quadrilateral Mesh Generation*, International Journal for Numerical Methods in Engineering, 32:811–847 (1991).
10. M. S. Shephard & M. K. Georges, *Automatic Three-Dimensional Mesh Generation by the Finite Octree*

*Technique*, International Journal for Numerical Methods in Engineering, 32:709–749 (1991).

11. M. B. Stephenson, S. A. Canann, Ted D. Blacker & R. J. Meyers, *Plastering Progress Report I*, SAND89-2192, Sandia National Laboratories, Albuquerque, N. Mex. (1992).

12. F. P. Preparata & M. I. Shamos, *Computational Geometry an Introduction*, Springer-Verlag, New York, 1985, at pp. 24–26 (1985).

13. Peter Murdoch, Ph. D. Dissertation, *The Spatial Twist Continuum: A Dual Representation of the All-Hexahedral Finite Element Mesh*, Brigham Young University (1995) (defended on Jun. 28, 1995, at Brigham Young University).

14. Ted D. Blacker and R. J. Meyers, *Seams and Wedges in Plastering: A 3-D Hexahedral Mesh Generation Algorithm*, Engineering with Computers, 9:83–93 (1993).

15. S. Smale, *Regular Curves on Riemannian Manifolds*, American Mathematical Society Transactions, Vol. 87 (1958).

16. Ted D. Blacker et al., *CUBIT Mesh Generation Environment, Volume 1: User's Manual*, SAND94-1100, Sandia National Laboratories, Albuquerque, N. Mex. (May 1994).

17. Larry A. Schoof & Victor R. Yarberry, *EXODUS II. A Finite Element Data Model*, SAND92-2137, Sandia National Laboratories, Albuquerque, N. Mex. (September 1994).

18. Gregory D. Sjaardema, *NUMBERS: A Collection of Utilities for Pre-and Post-processing Two-and Three-Dimensional EXODUS Finite Element Models*, SAND88-0737, Sandia National Laboratories, Albuquerque, N. Mex. (March 1989).

We claim:

1. An automated system for hexahedral volume discretization of a geometric object having interior and exterior boundaries, means for representing a three-dimensional arrangement of surfaces and converting the arrangement to a two-dimensional hexahedral mesh;

means for constructing a plurality of initial loops, sheets, chords, and sheetchords; and processing means for iteratively locating at least three pair-wise adjacent chords; for iteratively constructing a whisker hex by crossing the at least three pair-wise adjacent chords; and for iteratively checking for invalid connectivity on all sheets involved in the whisker hex to form a mesh of hexahedral elements defining the geometric object.

2. The automated system of claim 1, wherein said mesh of the hexahedral elements is boundary sensitive.

3. The automated system of claim 1, wherein said mesh of the hexahedral elements is orientation insensitive.

4. In a finite element analysis comprising generating a mesh of quadrilateral elements defining a geometric object to be analyzed, introducing a stimulus responsive to an input by an operator to which the response of the geometric object is to be modeled, performing finite element analysis on the geometric region in response to the stimulus to produce analysis data, and using the resulting analysis data, a method of automatically generating a mesh of hexahedral elements comprising the steps of:

grouping the dual of a quadrilateral surface mesh into a plurality of logical loops, wherein said grouping results in an arrangement of a plurality of sheets, the arrangement of sheets defining chords formed by the intersection of said plurality of logical sheets;

representing said plurality of sheets in two dimensional topological structure;

locating at least two pair-wise adjacent chords on said plurality of logical sheets;

crossing the at least two pair-wise adjacent chords to construct a logical hexahedron; and checking for invalid connectivity on all of said plurality of logical sheets involved in the logical hexahedron after iteratively crossing the at least two pair-wise adjacent chords until an all-hexahedral mesh is completed.

5. The method of claim 4, wherein a complete mesh is indicated by all the plurality of chords intersecting the quadrilateral surface mesh.

6. The method of claim 4, wherein a complete mesh is indicated by forming a closed curve within the geometric object.

7. The method of claim 4, further comprising the steps of iteratively locating at least two pair-wise adjacent chords on said plurality of logical sheets; iteratively crossing the at least two pair-wise adjacent chords to construct a logical hexahedron; and iteratively checking for invalid connectivity on all of said plurality of logical sheets involved in the logical hexahedron after iteratively crossing the at least two pair-wise adjacent chords.

* * * * *